US010586660B2

(12) United States Patent
Kaner et al.

(10) Patent No.: US 10,586,660 B2
(45) Date of Patent: Mar. 10, 2020

(54) HIGH-VOLTAGE DEVICES

(71) Applicant: The Regents of the University of California, Oakland, CA (US)

(72) Inventors: Richard Barry Kaner, Pacific Palisades, CA (US); Maher F. El-Kady, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 15/410,404

(22) Filed: Jan. 19, 2017

(65) Prior Publication Data
US 2017/0213657 A1   Jul. 27, 2017

Related U.S. Application Data

(60) Provisional application No. 62/286,126, filed on Jan. 22, 2016.

(51) Int. Cl.
*H01G 11/60*  (2013.01)
*H01G 11/68*  (2013.01)
(Continued)

(52) U.S. Cl.
CPC ............ *H01G 11/60* (2013.01); *H01G 11/26* (2013.01); *H01G 11/28* (2013.01); *H01G 11/30* (2013.01);
(Continued)

(58) Field of Classification Search
CPC ........ H01G 11/60; H01G 11/26; H01G 11/28; H01G 11/30; H01G 11/68; H01G 11/70; H01G 11/86; Y02E 60/13
(Continued)

(56) References Cited

U.S. PATENT DOCUMENTS 2,800,616 A   7/1957   Becker
3,288,641 A   11/1966  Rightmire
(Continued)

FOREIGN PATENT DOCUMENTS

CN   100372035 C   2/2008
CN   101723310 A   6/2010
(Continued)

OTHER PUBLICATIONS

Final Office Action for U.S. Appl. No. 13/725,073, dated Apr. 6, 2018, 37 pages.
(Continued)

*Primary Examiner* — Michael P McFadden
(74) *Attorney, Agent, or Firm* — Withrow & Terranova, P.L.L.C.

(57) ABSTRACT

The present disclosure provides supercapacitors that may avoid the shortcomings of current energy storage technology. Provided herein are supercapacitor devices, and methods of fabrication thereof comprising the manufacture or synthesis of an active material on a current collector and/or the manufacture of supercapacitor electrodes to form planar and stacked arrays of supercapacitor electrodes and devices. Prototype supercapacitors disclosed herein may exhibit improved performance compared to commercial supercapacitors. Additionally, the present disclosure provides a simple, yet versatile technique for the fabrication of supercapacitors through masking and etching.

31 Claims, 17 Drawing Sheets

(51) Int. Cl.
   *H01G 11/30* (2013.01)
   *H01G 11/28* (2013.01)
   *H01G 11/26* (2013.01)
   *H01G 11/86* (2013.01)
   *H01G 11/70* (2013.01)

(52) U.S. Cl.
   CPC ............ *H01G 11/68* (2013.01); *H01G 11/70* (2013.01); *H01G 11/86* (2013.01); *Y02E 60/13* (2013.01)

(58) Field of Classification Search
   USPC .......................................................... 361/502
   See application file for complete search history.

(56) References Cited

U.S. PATENT DOCUMENTS

| | | | |
|---|---|---|---|
| 3,536,963 | A | 10/1970 | Boos |
| 3,652,902 | A | 3/1972 | Hart et al. |
| 5,225,296 | A | 7/1993 | Ohsawa et al. |
| 5,442,197 | A | 8/1995 | Andrieu et al. |
| 6,043,630 | A | 3/2000 | Koenck et al. |
| 6,117,585 | A | 9/2000 | Anani et al. |
| 6,451,074 | B2 | 9/2002 | Bluvstein et al. |
| 6,510,043 | B1 | 1/2003 | Shiue et al. |
| 6,522,522 | B2 | 2/2003 | Yu et al. |
| 6,982,517 | B2 | 1/2006 | Reineke et al. |
| 7,623,340 | B1 | 11/2009 | Song et al. |
| 7,875,219 | B2 | 1/2011 | Zhamu et al. |
| 8,315,039 | B2 | 11/2012 | Zhamu et al. |
| 8,503,161 | B1 | 8/2013 | Chang et al. |
| 8,593,714 | B2 | 11/2013 | Agrawal et al. |
| 8,753,772 | B2 | 6/2014 | Liu et al. |
| 8,771,630 | B2 | 7/2014 | Wu et al. |
| 8,828,608 | B2 | 9/2014 | Sun et al. |
| 8,906,495 | B2 | 12/2014 | Chen |
| 8,951,675 | B2 | 2/2015 | Bhardwaj et al. |
| 9,118,078 | B2 | 8/2015 | Huang et al. |
| 9,295,537 | B2 | 3/2016 | Cao |
| 9,437,372 | B1 | 9/2016 | Zhamu et al. |
| 2002/0136881 | A1 | 9/2002 | Yanagisawa et al. |
| 2003/0169560 | A1 | 9/2003 | Welsch et al. |
| 2004/0090736 | A1* | 5/2004 | Bendale ............... H01G 9/155 361/502 |
| 2005/0153130 | A1 | 7/2005 | Long et al. |
| 2006/0121342 | A1 | 6/2006 | Sano et al. |
| 2006/0201801 | A1 | 9/2006 | Bartlett et al. |
| 2006/0207878 | A1 | 9/2006 | Myung et al. |
| 2006/0269834 | A1 | 11/2006 | West et al. |
| 2007/0172739 | A1 | 7/2007 | Visco et al. |
| 2007/0204447 | A1 | 9/2007 | Bernstein et al. |
| 2008/0090141 | A1 | 4/2008 | Meitav et al. |
| 2008/0158778 | A1 | 7/2008 | Lipka et al. |
| 2008/0180883 | A1 | 7/2008 | Palusinski et al. |
| 2008/0199737 | A1 | 8/2008 | Kazaryan et al. |
| 2008/0220293 | A1 | 9/2008 | Marmaropoulos et al. |
| 2009/0059474 | A1* | 3/2009 | Zhamu ............... H01G 11/46 361/503 |
| 2009/0117467 | A1 | 5/2009 | Zhamu et al. |
| 2009/0289328 | A1 | 11/2009 | Tanioku |
| 2010/0159346 | A1 | 6/2010 | Hinago et al. |
| 2010/0159366 | A1 | 6/2010 | Shao-Horn et al. |
| 2010/0195269 | A1 | 8/2010 | Kim et al. |
| 2010/0203362 | A1 | 8/2010 | Lam et al. |
| 2010/0221508 | A1 | 9/2010 | Huang et al. |
| 2010/0226066 | A1 | 9/2010 | Sweeney et al. |
| 2010/0237296 | A1 | 9/2010 | Gilje |
| 2010/0266964 | A1 | 10/2010 | Gilje |
| 2010/0273051 | A1 | 10/2010 | Choi et al. |
| 2010/0317790 | A1 | 12/2010 | Jang et al. |
| 2011/0026189 | A1 | 2/2011 | Wei et al. |
| 2011/0111283 | A1 | 5/2011 | Rust, III et al. |
| 2011/0111299 | A1 | 5/2011 | Liu et al. |
| 2011/0143101 | A1 | 6/2011 | Sandhu |
| 2011/0159372 | A1 | 6/2011 | Zhamu et al. |
| 2011/0163274 | A1 | 7/2011 | Plee et al. |
| 2011/0163699 | A1 | 7/2011 | Elder et al. |
| 2011/0183180 | A1 | 7/2011 | Yu et al. |
| 2011/0227000 | A1 | 9/2011 | Ruoff et al. |
| 2011/0256454 | A1 | 10/2011 | Nicolas et al. |
| 2011/0318257 | A1 | 12/2011 | Sokolov et al. |
| 2012/0111730 | A1 | 5/2012 | Choi et al. |
| 2012/0129736 | A1 | 5/2012 | Tour et al. |
| 2012/0134072 | A1 | 5/2012 | Bae et al. |
| 2012/0145234 | A1 | 6/2012 | Roy-Mayhew et al. |
| 2012/0313591 | A1 | 12/2012 | Brambilla et al. |
| 2013/0026409 | A1 | 1/2013 | Baker et al. |
| 2013/0048949 | A1 | 2/2013 | Xia et al. |
| 2013/0056346 | A1 | 3/2013 | Sundara et al. |
| 2013/0056703 | A1 | 3/2013 | Elian et al. |
| 2013/0100581 | A1 | 4/2013 | Jung et al. |
| 2013/0161570 | A1 | 6/2013 | Hwang et al. |
| 2013/0168611 | A1 | 7/2013 | Zhou et al. |
| 2013/0180912 | A1 | 7/2013 | Li |
| 2013/0182373 | A1 | 7/2013 | Yu et al. |
| 2013/0189602 | A1 | 7/2013 | Lahiri et al. |
| 2013/0217289 | A1 | 8/2013 | Nayfeh et al. |
| 2013/0264041 | A1 | 10/2013 | Zhamu et al. |
| 2013/0266858 | A1 | 10/2013 | Inoue et al. |
| 2013/0280601 | A1 | 10/2013 | Geramita et al. |
| 2013/0314844 | A1 | 11/2013 | Chen et al. |
| 2013/0330617 | A1 | 12/2013 | Yoshimura et al. |
| 2014/0029161 | A1 | 1/2014 | Beidaghi et al. |
| 2014/0030590 | A1 | 1/2014 | Wang et al. |
| 2014/0045058 | A1 | 2/2014 | Zhao et al. |
| 2014/0065447 | A1 | 3/2014 | Liu et al. |
| 2014/0120453 | A1 | 5/2014 | Ajayan et al. |
| 2014/0154164 | A1 | 6/2014 | Chen et al. |
| 2014/0178763 | A1 | 6/2014 | Mettan |
| 2014/0205841 | A1 | 7/2014 | Qui et al. |
| 2014/0255776 | A1 | 9/2014 | Song et al. |
| 2014/0287308 | A1 | 9/2014 | Okada et al. |
| 2014/0313636 | A1 | 10/2014 | Tour et al. |
| 2014/0323596 | A1 | 10/2014 | Jeong et al. |
| 2015/0098167 | A1 | 4/2015 | El-Kady et al. |
| 2015/0103469 | A1* | 4/2015 | Lee ............... C01B 31/0446 361/502 |
| 2015/0111449 | A1 | 4/2015 | Cruz-Silva et al. |
| 2015/0218002 | A1 | 8/2015 | Plomb et al. |
| 2015/0235776 | A1* | 8/2015 | Miller ............... H01G 11/36 361/502 |
| 2015/0259212 | A1 | 9/2015 | Li et al. |
| 2015/0287544 | A1 | 10/2015 | Irazoqui et al. |
| 2015/0332868 | A1 | 11/2015 | Jung et al. |
| 2015/0364738 | A1 | 12/2015 | Pope et al. |
| 2015/0364755 | A1 | 12/2015 | Liu et al. |
| 2016/0035498 | A1 | 2/2016 | Honma et al. |
| 2016/0055983 | A1 | 2/2016 | Kurungot et al. |
| 2016/0077074 | A1 | 3/2016 | Strong et al. |
| 2016/0099116 | A1* | 4/2016 | Yang ............... H01G 11/86 264/406 |
| 2016/0133396 | A1 | 5/2016 | Hsieh |
| 2016/0148759 | A1 | 5/2016 | El-Kady et al. |
| 2017/0338472 | A1 | 11/2017 | Zhamu et al. |

FOREIGN PATENT DOCUMENTS

| | | |
|---|---|---|
| CN | 101894679 A | 11/2010 |
| CN | 102543293 A | 7/2012 |
| CN | 102923698 A | 2/2013 |
| CN | 103723715 A | 4/2014 |
| CN | 203631326 U | 6/2014 |
| CN | 203839212 U | 9/2014 |
| CN | 104299794 A | 1/2015 |
| CN | 104355306 A | 2/2015 |
| CN | 104617300 A | 5/2015 |
| EP | 1843362 A1 | 10/2007 |
| EP | 2088637 A2 | 8/2009 |
| JP | S61010855 A | 1/1986 |
| JP | S62287568 A | 12/1987 |
| JP | 2002063894 A | 2/2002 |
| JP | 2003217575 A | 7/2003 |
| JP | 2004039491 A | 2/2004 |
| JP | 2004055541 A | 2/2004 |

(56) References Cited

FOREIGN PATENT DOCUMENTS

| | | | |
|---|---|---|---|
| JP | 2004063297 A | 2/2004 |
| JP | 2005138204 A | 6/2005 |
| JP | 20050317902 A | 11/2005 |
| JP | 2006252902 A | 9/2006 |
| JP | 2009525247 A | 7/2009 |
| JP | 2010222245 A | 10/2010 |
| JP | 2011026153 A | 2/2011 |
| JP | 2011165680 A | 8/2011 |
| JP | 2012169576 A | 9/2012 |
| JP | 2013534686 A | 9/2013 |
| JP | 2014053209 A | 3/2014 |
| KR | 20070083691 A | 8/2007 |
| KR | 10-2009-0107498 A | 10/2009 |
| KR | 1020100114827 B1 | 4/2017 |
| WO | 9632618 A1 | 10/1996 |
| WO | 2011019431 A1 | 2/2011 |
| WO | 2011021982 A1 | 2/2011 |
| WO | 2011072213 A2 | 6/2011 |
| WO | 2012006657 A | 1/2012 |
| WO | 2012138302 A1 | 10/2012 |
| WO | 2013024727 A1 | 2/2013 |
| WO | 2013040636 A1 | 3/2013 |
| WO | 2013066474 A2 | 5/2013 |
| WO | 2013070989 A1 | 5/2013 |
| WO | 2013128082 A1 | 9/2013 |
| WO | 2013155276 A1 | 10/2013 |
| WO | 2014011722 A2 | 1/2014 |
| WO | 2014062133 A1 | 4/2014 |
| WO | 2014072877 A2 | 5/2014 |
| WO | 2014134663 A1 | 9/2014 |
| WO | 2015023974 A1 | 2/2015 |
| WO | 2015069332 A1 | 5/2015 |
| WO | 2015153895 A1 | 10/2015 |
| WO | 2015195700 A1 | 12/2015 |
| WO | 2016094551 A1 | 6/2016 |

OTHER PUBLICATIONS

Notice of Allowance for U.S. Appl. No. 15/612,405, dated May 16, 2018, 8 pages.
Third Office Action and Search Report for Chinese Patent Application No. 201380023699.7, dated Mar. 9, 2018, 16 pages.
Wang, Xu et al., "Manganese Oxide Micro-Supercapacitors with Ultra-high Areal Capacitance," Electronic Supplementary Material (ESI) for Nanoscale, vol. 5, Mar. 21, 2013, The Royal Society of Chemistry, 6 pages.
Wang, Xuebin et al., "Three-dimensional strutted graphene grown by substrate-free sugar blowing for high-power-density supercapacitors," Nature Communications, vol. 4, Issue 2905, Dec. 16, 2013, Macmillan Publishers Limited, pp. 1-8.
Wassei, Jonathan K. et al., "Oh the Places You'll Go with Graphene", Accounts of Chemical Research, Dec. 20, 2012, Vers. 9, 11 pages.
Weng, Zhe et al., "Graphene-Cellulose Paper Flexible Supercapacitors," Advanced Energy Materials, vol. 1, Issue 5, Aug. 10, 2011, WILEY-VCH Verlag GmbH & Co., pp. 917-922.
Wu, Zhong-Shuai et al., "Graphene Anchored with $Co_3O_4$ Nanoparticles as Anode of Lithium Ion Batteries with Enhanced Reversible Capacity and Cyclic Performance," ACS Nano, vol. 4, Issue 6, May 10, 2010, American Chemical Society, pp. 3187-3194.
Xie, Guoxin, "Direct Electrochemical Synthesis of Reduced Graphene Oxide (rGO)/Copper Composite Films and Their Electrical/Electroactive Properties," Applied Materials & Interfaces, vol. 6, Issue 10, May 1, 2014, American Chemical Society, pp. 7444-7455.
Xu, Bin et al., "Sustainable nitrogen-doped porous carbon with high surface areas prepared from gelatin for supercapacitors," Journal of Materials Chemistry, vol. 22, Issue 36, Jul. 25, 2012, The Royal Society of Chemistry, pp. 19088-19093.
Xu, Jing et al., "Flexible Asymmetric Supercapacitors Based upon $Co_9S_8$ Nanorod//$Co_3O_4$@$RuO_2$ Nanosheet Arrays on Carbon Cloth," ACS Nano, vol. 7, Issue 6, May 6, 2013, American Chemical Society, pp. 5453-5462.
Xu, Yuxi et al., "Flexible Solid-State Supercapacitors Based on Three-Dimensional Graphene Hydrogel Films," ACS Nano, vol. 7, Issue 5, Apr. 4, 2013, American Chemical Society, 8 pages.
Xu, Zhanwei et al., "Electrochemical Supercapacitor Electrodes from Sponge-like Graphene Nanoarchitectures with Ultrahigh Power Density," The Journal of Physical Chemistry Letters, vol. 3, Issue 20, Sep. 25, 2012, American Chemical Society, pp. 2928-2933.
Yan, Jun et al., "Fast and reversible surface redox reaction of graphene-MnO2composites as supercapacitor electrodes," Carbon, vol. 48, Issue 13, Jun. 25, 2010, Elsevier Ltd., pp. 3825-3833.
Yan, Jun et al., "Recent Advances in Design and Fabrication of Electrochemical Supercapacitors with High Energy Densities," Advanced Energy Materials, vol. 4, Issue 4, 1300816, Dec. 23, 2013, WILEY-VCH Verlag GmbH & Co., pp. 1-43.
Yang, Xiaowei et al, "Bioinspired Effective Prevention of Restacking in Multilayered Graphene Films: Towards the Next Generation of High-Performance Supercapacitors," Advanced Materials, vol. 23, Issue 25, May 10, 2011, WILEY-VCH Verlag GmbH & Co., pp. 2833-2838.
Yang, Peihua et al., "Low-Cost High-Performance Solid-State Asymmetric Supercapacitors Based on $MnO_2$ Nanowires and $Fe_2O_3$ Nanotubes," Nano Letters, vol. 14, Issue 2, Jan. 1, 2014, American Chemical Society, pp. 731-736.
Yang, Xiaowei et al, "Liquid-Mediated Dense Integration of Graphene Materials for Compact Capacitive Energy Storage," Science, vol. 341, Issue 6145, Aug. 2, 2013, American Association for the Advancement of Science, 5 pages.
Yoo, Eunjoo et al., "Large Reversible Li Storage of Graphene Nanosheet Families for Use in Rechargeable Lithium Ion Batteries," Nano Letters, vol. 8, Issue 8, Jul. 24, 2008, American Chemical Society, pp. 2277-2282.
Yoo, Jung Joon et al., "Ultrathin Planar Graphene Supercapacitors," Nano Letters, vol. 11, Issue 4, Mar. 7, 2011, American Chemical Society, pp. 1423-1427.
Yu, Dingshan et al., "Scalable synthesis of hierarchically structured carbon nanotube-graphene fibres for capacitive energy storage," Nature Nanotechnology, vol. 9, Issue 7, May 11, 2014, Macmillan Publishers Limited, pp. 1-8.
Yu, Guihua et al., "Solution-Processed Graphene/$MnO_2$ Nanostructured Textiles for High-Performance Electrochemical Capacitors," Nano Letters, vol. 11, Issue 7, Jun. 13, 2011, American Chemical Society, pp. 2905-2911.
Yu, Pingping et al., "Graphene-Wrapped Polyaniline Nanowire Arrays on Nitrogen-Doped Carbon Fabric as Novel Flexible Hybrid Electrode Materials for High-Performance Supercapacitor," Langmuir, vol. 30, Issue 18, Apr. 24, 2014, American Chemical Society, pp. 5306-5313.
Yu, Pingping et al., "Polyaniline Nanowire Arrays Aligned on Nitrogen-Doped Carbon Fabric for High-Performance Flexible Supercapacitors," Langmuir, vol. 29, Issue 38, Aug. 28, 2013, American Chemical Society, 8 pages.
Yu, Zenan et al., "Supercapacitor electrode materials: nanostructures from 0 to 3 dimensions," Energy & Environmental Science, vol. 8, Issue 3, Dec. 3, 2014, The Royal Society of Chemistry, pp. 702-730.
Zhang, Jintao et al., "A high-performance asymmetric supercapacitor fabricated with graphene-based electrodes," Energy & Environmental Science, vol. 4, Issue 10, Aug. 2, 2011, The Royal Society of Chemistry, pp. 4009-4015.
Zhang, Li et al., "High Voltage Super-capacitors for Energy Storage Devices Applications," 14th Symposium on Electromagnetic Launch Technology, Jun. 10-13, 2008, IEEE, pp. 1-4.
Zhang, Long et al., "Porous 3D graphene-based bulk materials with exceptional high surface area and excellent conductivity for supercapacitors," Scientific Reports, vol. 3, Issue 1408, Mar. 11, 2013, Nature Publishing Group, pp. 1-9.
Zhang, Yonglai et al., "Direct imprinting of microcircuits on graphene oxides film by femtosecond laser reduction," Nano Today, vol. 5, Issue 1, Jan. 19, 2010, Elsevier Ltd., pp. 15-20.
Zhang, Zheye et al., "Facile Synthesis of 3D $MnO_2$-Graphene and Carbon Nanotube-Graphene Composite Networks for High-Performance, Flexible, All-Solid-State Asymmetric Supercapacitors," Advanced Energy Materials, vol. 4, Issue 10, Jul. 15, 2014, WILEY-VCH Verlag GmbH & Co. KGaA, Weinheim, pp. 1-9.

(56) References Cited

OTHER PUBLICATIONS

Zhang, Zhongshen et al., "A New-Type Ordered Mesoporous Carbon/Polyaniline Composites Prepared by a Two-step Nanocasting Method for High Performance Supercapacitor Applications," Journal of Materials Chemistry A, vol. 2, Issue 39, Aug. 13, 2014, Royal Society of Chemistry, pp. 1-25.
Zhao, Xin et al., "Incorporation of Manganese Dioxide within Ultraporous Activated Graphene for High-Performance Electrochemical Capacitors," ACS Nano, vol. 6, Issue 6, May 3, 2012, American Chemical Society, pp. 5404-5412.
Zhi, Mingjia et al, "Nanostructured carbon-metal oxide composite electrodes for supercapacitors: a review," Nanoscale, vol. 5, Issue 1, Oct. 23, 2012,The Royal Society of Chemistry, pp. 72-88.
Zhou, Chuanqiang et al., "Synthesis of Polyaniline Hierarchical Structures in a Dilute SDS/HCl Solution: Nanostructure-Covered Rectangular Tubes," Macromolecules, vol. 42, Issue 4, Jan. 27, 2009, American Chemical Society, pp. 1252-1257.
Zhou, Guangmin et al., "Graphene-Wrapped $Fe_3O_4$ Anode Material with Improved Reversible Capacity and Cyclic Stability for Lithium Ion Batteries," Chemistry of Materials, vol. 22, Issue 18, Aug. 26, 2010, American Chemical Society, pp. 5306-5313.
Zhu, Xianjun et al., "Nanostructured Reduced Graphene Oxide/$Fe_2O_3$ Composite as a High-Performance Anode Material for Lithium Ion Batteries," ACS Nano, vol. 5, Issue 4, Mar. 28, 2011, American Chemical Society, pp. 3333-3338.
Zhu, Yanwu et al., "Carbon-Based Supercapacitors Produced by Activation of Graphene," Science, vol. 332, May 12, 2011, www.sciencemag.org, pp. 1537-1541.
Zoski, Cynthia G., "Handbook of Electrochemistry," First Edition, 2007, Las Cruces, New Mexico, USA, Elsevier B.V., 935 pages.
Non-Final Office Action for U.S. Appl. No. 13/725,073, dated Apr. 15, 2016, 32 pages.
Final Office Action for U.S. Appl. No. 13/725,073, dated Oct. 4, 2016, 38 pages.
First Examination Report for Australian Patent Application No. 2012378149, dated Jul. 28, 2016, 3 pages.
First Office Action for Chinese Patent Application No. 201280070343.4, dated Jul. 23, 2015, 29 pages.
Second Office Action for Chinese Patent Application No. 201280070343.4, dated Apr. 6, 2016, 8 pages.
Third Office Action for Chinese Patent Application No. 201280070343.4, dated Sep. 7, 2016, 25 pages.
Extended European Search Report for European Patent Application No. 12874989.2, dated Jun. 17, 2015, 6 pages.
Notice of Reason for Rejection for Japanese Patent Application No. 2014-548972, dated Feb. 7, 2017, 5 pages.
International Search Report and Written Opinion for PCT/US2012/071407, dated Nov. 12, 2013, 9 pages.
International Preliminary Report on Patentability for PCT/US2012/071407 dated Jul. 3, 2014, 6 pages.
Non-Final Office Action for U.S. Appl. No. 14/382,463, dated Jan. 6, 2017, 23 pages.
Notice of Allowance for U.S. Appl. No. 14/382,463, dated Apr. 6, 2017, 7 pages.
First Examination Report for Australian Patent Application No. 2013230195, dated May 27, 2016, 4 pages.
First Office Action and Search Report for Chinese Patent Application No. 201380023699.7, dated Nov. 21, 2016, 21 pages.
Extended European Search Report for European Patent Application No. 13757195.6, dated Jul. 1, 2015, 9 pages.
Final Office Action for U.S. Appl. No. 14/945,232, dated Aug. 10, 2018, 7 pages.
Notification of the First Office Action for Chinese Patent Application No. 201580072540.3, dated Jun. 25, 2018, 14 pages.
International Preliminary Report on Patentability for International Patent Application No. PCT/US2017/014126, dated Aug. 2, 2018, 10 pages.
Notice of Reasons for Rejection for Japanese Patent Application No. 2014-561017, dated Mar. 21, 2017, 10 pages.
International Search Report and Written Opinion for PCT/US2013/029022, dated Jun. 26, 2013, 13 pages.
International Preliminary Report on Patentability for PCT/US2013/029022 dated Sep. 18, 2014, 9 pages.
International Search Report and Written Opinion for International Patent Application No. PCT/US2015/036082, dated Aug. 27, 2015, 15 pages.
International Preliminary Report on Patentability for International Patent Application No. PCT/US2015/036082, dated Dec. 29, 2016, 12 pages.
International Search Report and Written Opinion for International Patent Application No. PCT/US2015/061400, dated Mar. 29, 2016, 20 pages.
Invitation to Pay Additional Fees for International Patent Application No. PCT/US2016/067468, dated Feb. 13, 2017, 2 pages.
Conway, B. E., "Chapter 2: Similarities and Differences between Supercapacitors and Batteries for Storing Electrical Energy," Electrochemical Supercapacitors: Scientific Fundamentals and Technological Applications (book), 1999, New York, Springer Science + Business Media, pp. 11-12.
Conway, B. E., "Chapter 3: Energetics and Elements of the Kinetics of Electrode Processes," Electrochemical Supercapacitors: Scientific Fundamentals and Technological Applications (book), 1999, New York, Springer Science + Business Media, pp. 33-34.
Ozawa, Kazunori, "Lithium-Cell System—Nonaqueous Electrolyte System," Lithium Ion Rechargeable Batteries (book), Chapter 1: General Concepts, Section 1.1.2, 2009, WILEY-VCH Verlag GmbH & Co. KGaA, 5 pages.
Root, Michael, "Electric Vehicles," The TAB™ Battery Book: An In-Depth Guide to Construction, Design, and Use (book), Chapter 2: The Many Uses of Batteries, 2011, The McGraw-Hill Companies, 4 pages.
Examination Report for European Patent Application No. 13757195.6, dated Jun. 13, 2018, 7 pages.
Partial Supplementary European Search Report for European Patent Application No. 15861794.4, dated Jun. 28, 2018, 16 pages.
International Preliminary Report on Patentability for International Patent Application No. PCT/US2016/067468, dated Jul. 5, 2018, 7 pages.
Non-Final Office Action for U.S. Appl. No. 15/319,286, dated Jun. 27, 2018, 9 pages.
Non-Final Office Action for U.S. Appl. No. 15/382,871, dated Jun. 27, 2018, 11 pages.
Non-Final Office Action for U.S. Appl. No. 15/472,409, dated Jun. 29, 2018, 11 pages.
Non-Final Office Action for U.S. Appl. No. 13/725,073, dated Aug. 28, 2017, 41 pages.
Second Office Action for Chinese Patent Application No. 201380023699.7, dated Aug. 9, 2017, 8 pages.
International Search Report and Written Opinion for International Patent Application No. PCT/US2017/038992, dated Sep. 21, 2017, 12 pages.
Fourth Office Action for Chinese Patent Application No. 201280070343.4, dated Apr. 26, 2017, 22 pages.
Notice of Reason for Rejection for Japanese Patent Application No. 2014-548972, dated May 23, 2017, 4 pages.
International Preliminary Report on Patentability for International Patent Application No. PCT/US2015/061400, dated Jun. 1, 2017, 16 pages.
International Search Report and Written Opinion for International Patent Application No. PCT/US2016/067468, dated Apr. 21, 2017, 10 pages.
International Search Report and Written Opinion for International Patent Application No. PCT/US2017/014126, dated Apr. 20, 2017, 13 pages.
International Search Report and Written Opinion for International Patent Application No. PCT/US2017/023632, dated May 31, 2017, 11 pages.
Invitation to Pay Additional Fees for International Patent Application No. PCT/US2017/048883, dated Sep. 29, 2017, 2 pages.
International Search Report and Written Opinion for International Patent Application No. PCT/US2017/048883, dated Dec. 26, 2017, 10 pages.

(56) References Cited

OTHER PUBLICATIONS

Non-Final Office Action for U.S. Appl. No. 14/945,232, dated Jan. 29, 2018, 9 pages.
Extended European Search Report for European Patent Application No. 15809519.0, dated Feb. 5, 2018, 10 pages.
Decision on Rejection for Chinese Patent Application No. 201280070343.4, dated Jan. 5, 2018, 18 pages.
Non-Final Office Action for U.S. Appl. No. 15/612,405, dated Feb. 9, 2018, 9 pages.
Decision to Grant a Patent for Japanese Patent Application No. 2014-561017, dated Mar. 13, 2018, 4 pages.
Acerce, Muharrem et al., "Metallic 1T phase $MoS_2$ nanosheets as supercapacitor electrode materials," Nature Nanotechnology, vol. 10, Mar. 23, 2015, Macmillan Publishers Limited, pp. 1-6.
Allen, Matthew J. et al., "Honeycomb Carbon: A Review of Graphene," Chemical Reviews, vol. 110, Issue 1, Jul. 17, 2009, American Chemical Society, pp. 132-145.
Augustyn, Veronica et al., "High-rate electrochemical energy storage through $Li^+$ intercalation pseudocapacitance," Nature Materials, vol. 12, Jun. 2013, www.nature.com/naturematerials, Macmillan Publishers Limited, pp. 518-522.
Author Unknown, "125 Volt Transportation Module," Maxwell Technologies, retrieved Apr. 13, 2016, website last modified Mar. 14, 2013, www.maxwell.com/products/ultracapacitors/125v-tranmodules, Maxwell Technologies, Inc., 2 pages.
Author Unknown, "ELTON: Super Capactiors," www.elton-cap.com/, Retrieved Apr. 15, 2016, ELTON, 1 page.
Author Unknown, "ELTON: Products and Technology," https://web.archive.org/web/20160306044847/http:/www.elton-cap.com/products/, dated Mar. 6, 2016, retrieved Mar. 15, 2017, ELTON, 2 pages.
Author Unknown, "Monthly battery sales statistics," Battery Association of Japan (BAJ), retrieved Apr. 13, 2016, website last modified Dec. 2010, web.archive.org/web/20110311224259/http://www.baj.or.jp/e/statistics/02.php, Battery Association of Japan, 1 page.
Author Unknown, "Turnigy Graphene Batteries," Batteries & Accessories, https://hobbyking.com/en_us/batteries-accessories/turnigy-graphene-2.html, retrieved Apr. 3, 2017, HobbyKing, 39 pages.
Arthur, Timothy, S. et al., "Three-dimensional electrodes and battery architectures," MRS Bulletin, vol. 36, Jul. 2011, Materials Research Society, pp. 523-531.
Bai, Ming-Hua et al., "Electrodeposition of vanadium oxide-polyaniline composite nanowire electrodes for high energy density supercapacitors," Journal of Materials Chemistry A, vol. 2, Issue 28, Jan. 29, 2014, The Royal Society of Chemistry, pp. 10882-10888.
Beidaghi, Majid, et al., "Capacitive energy storage in micro-scale devices: recent advances in design and fabrication of micro-supercapacitors," Energy and Environmental Science, vol. 7, Issue 3, Jan. 2, 2014, Royal Society of Chemistry, pp. 867-884.
Beidaghi, Majid et al., "Micro-Supercapacitors Based on Interdigital Electrodes of Reduced Graphene Oxide and Carbon Nanotube Composites with Ultra high Power Handling Performance," Advanced Functional Materials, vol. 22, Issue 21, Nov. 2, 2012, WILEY-VCH Verlag GmbH & Co. KGaA, Weinheim, pp. 4501-4510.
Beidaghi, Majid et al., "Micro-supercapacitors based on three dimensional interdigital polypyrrole/C-MEMS electrodes," Electrochimica Acta, vol. 56, Issue 25, Oct. 30, 2011, Elsevier Ltd., pp. 9508-9514.
Bélanger, Daniel et al., "Manganese Oxides: Battery Materials Make the Leap to Electrochemical Capacitors," Electrochemical Society Interface, vol. 17, Issue 1, Spring 2008, The Electrochemical Society, pp. 49-52.
Bian, Li-Jun et al., "Self-doped polyaniline on functionalized carbon cloth as electroactive materials for supercapacitor," Electrochimica Acta, vol. 64, Dec. 29, 2011, Elsevier Ltd., pp. 17-22.
Bouville, Florian et al., "Strong, tough and stiff bioinspired ceramics from brittle constituents," Nature Materials, vol. 13, Issue 5, Mar. 23, 2014, Macmillan Publishers Limited, pp. 1-7.

Brain, Marshall et al., "How Batteries Work," Battery Arrangement and Power—HowStuffWorks, http://electronics.howstuffworks.com/everyday-tech/battery6.htm/printable, accessed Dec. 14, 2015, HowStuffWorks, 4 pages.
Brodie, B.C., "Ueber das Atomgewicht des Graphits," Justus Liebigs Annalen der Chemie, vol. 114, Issue 1, 1860, WILEY-VCH Verlag GmbH & Co. KGaA, Weinheim, pp. 6-24.
Burke, Andrew, "R&D considerations for the performance and application of electrochemical capacitors," Electrochimica Acta, vol. 53, Jan. 26, 2007, Elsevier Ltd., pp. 1083-1091.
Cao, Liujun et al., "Direct Laser-Patterned Micro-Supercapacitors from Paintable $MoS_2$ Films," Small, vol. 9, Issue 17, Apr. 16, 2013, WILEY-VCH Verlag GmbH & Co. KGaA, Weinheim, pp. 2905-2910.
Chan, Candace K. et al, "High-performance lithium battery anodes using silicon nanowires," Nature Nanotechnology, vol. 3, Issue 1, Jan. 2008, Nature Publishing Group, pp. 31-35.
Chen, Cheng-Meng et al., "Macroporous 'bubble' graphene film via template-directed ordered-assembly for high rate supercapacitors," Chemical Communications, vol. 48, Issue 57, May 15, 2012, The Royal Society of Chemistry, pp. 1-3.
Chen, Ji et al., "High-yield preparation of graphene oxide from small graphite flakes via an improved Hummers method with a simple purification process," Carbon, vol. 81, Jan. 2015, Elsevier Ltd., pp. 1-9.
Chen, L. Y. et al., "Toward the Theoretical Capacitance of $RuO_2$ Reinforced by Highly Conductive Nanoporous Gold," Advanced Energy Materials, vol. 3, Issue 7, Jul. 2014, WILEY-VCH Verlag GmbH & Co. KGaA, Weinheim, pp. 851-856.
Chen, Wei et al., "High-Performance Nanostructured Supercapacitors on a Sponge," Nano Letters, vol. 11, Issue 12, Sep. 16, 2011, American Chemical Society, 22 pages.
Chen, Zongping et al, "Three-dimensional flexible and conductive interconnected graphene networks grown by chemical vapour deposition," Nature Materials, vol. 10, Issue 6, Jun. 2011, Macmillan Publishers Limited, pp. 424-428.
Cheng, Yingwen et al., "Synergistic Effects from Graphene and Carbon Nanotubes EnableFlexible and Robust Electrodes for High-PerformanceSupercapacitors," Nano Letters, vol. 12, Issue 8, Jul. 23, 2012, American Chemical Society, pp. 4206-4211.
Chi, Kai et al., "Freestanding Graphene Paper Supported Three-Dimensional Porous Graphene—Polyaniline Nanocomposite Synthesized by Inkjet Printing and in Flexible All-Solid-State Supercapacitor," ACS Applied Materials & Interfaces, vol. 6, Issue 18, Sep. 10, 2014, American Chemical Society, 8 pages.
Chmiola, John et al., "Monolithic Carbide-Derived Carbon Films for Micro-Supercapacitors," Science, vol. 328, Issue 5977, Apr. 2010, American Association for the Advancement of Science, 4 pages.
Choi, Bong Gill et al., "3D Macroporous Graphene Frameworks for Supercapacitors with High Energy and Power Densities," ACS Nano, vol. 6, Issue 5, Apr. 23, 2012, American Chemical Society, pp. 4020-4028.
Cooper, A. et al., "The UltraBattery—A new battery design for a new beginning in hybrid electric vehicle energy storage," Journal of Power Sources, vol. 188, Issue 2, Dec. 6, 2008, Elsevier B.V. pp. 642-649.
Deville, Sylvain, "Freeze-Casting of Porous Ceramics: A Review of Current Achievements and Issues," Advanced Engineering Materials, vol. 10, Issue 3, Mar. 20, 2008, WILEY-VCH Verlag GmbH & Co., pp. 155-169.
Deville, Sylvain, "Metastable and unstable cellular solidification of colloidal suspensions," Nature Materials, vol. 8, Dec. 2009, Macmillan Publishers Limited, pp. 966-972.
De Volder, Michaël et al., "Corrugated Carbon Nanotube Microstructures with Geometrically Tunable Compliance," ACS NANO, vol. 5, Issue 9, Aug. 1, 2011, pp. 7310-7317.
Dunn, Bruce et al., "Electrical Energy Storage for the Grid: A Battery of Choices," Science, vol. 334, Issue 928, Nov. 18, 2011, American Association for the Advancement of Science, pp. 928-935.

(56) References Cited

OTHER PUBLICATIONS

Eda, Goki et al., "Chemically Derived Graphene Oxide: Towards Large-Area Thin-Film Electronics and Optoelectronics," Advanced Materials, vol. 22, Issue 22, Apr. 28, 2010, WILEY-VCH Verlag GmbH & Co., pp. 2392-2415.
El-Kady, Maher F. et al., "Engineering Three-Dimensional Hybrid Supercapacitors and Micro-Supercapacitors for High-Performance Integrated Energy Storage," Proceedings of the National Academy of Sciences of the United States of America, vol. 112, Issue 14, Apr. 7, 2015, National Academy of Sciences, pp. 4233-4238.
El-Kady, Maher F. et al., "Laser Scribing of High-Performance and Flexible Graphene-Based Electrochemical Capacitors," Science Magazine, Mar. 16, 2012, vol. 335, No. 6074, 6 pages.
El-Kady, Maher F. et al., "Laser Scribing of High-Performance and Flexibile Graphene-Based Electrochemical Capacitors," Science, vol. 335, Issue 6074, Mar. 16, 2012, www.sciencemag.org/cgi/content/full/335/6074/1326/DC1, American Association for the Advancement of Science, 25 pages.
El-Kady, Maher F. et al., "Scalable Fabrication of High-Power Graphene Micro-Supercapacitors for Flexible and On-Chip Energy Storage," Nature Communications, vol. 4, Issue 1475, Feb. 12, 2013, Macmillan Publishers Limited, pp. 1-9.
El-Kady, Maher F. et al., "Supplementary Information: Scalable Fabrication of High-Power Graphene Micro-Supercapacitors for Flexible and On-Chip Energy Storage", Nature Communications, Submitted for Publication: Oct. 1, 2012, 23 pages.
Fan, Zhuangjun et al., "Asymmetric Supercapacitors Based on Graphene/$MnO_2$ and Activated Carbon Nanofiber Electrodes with High Power and Energy Density," Advanced Functional Materials, vol. 21, Issue 12, Jun. 21, 2011, WILEY-VCH Verlag GmbH & Co. KGaA, Weinheim, pp. 2366-2375.
Feng, Jun et al., "Metallic Few-Layered $VS_2$ Ultrathin Nanosheets: High Two-Dimensional Conductivity for In-Plane Supercapacitors," Journal of the American Chemical Society, vol. 133, Issue 44, Sep. 27, 2011, American Chemical Society, pp. 17832-17838.
Fischer, Anne E. et al., "Incorporation of Homogeneous, Nanoscale $MnO_2$ within Ultraporous Carbon Structures via Self-Limiting Electroless Deposition: Implications for Electrochemical Capacitors," Nano Letters, vol. 7, Issue 2, Jan. 13, 2007, American Chemical Society, pp. 281-286.
Foo, CE Yao et al., "Flexible and Highly Scalable $V_2O_5$-rGO Electrodes in an Organic Electrolyte for Supercapacitor Devices," Advanced Energy Materials, vol. 4, Issue 12, Aug. 26, 2014, WILEY-VCH Verlag GmbH & Co. KGaA, Weinheim, pp. 1-7.
Gan, Shiyu et al., "Spontaneous and Fast Growth of Large-Area Graphene Nanofilms Facilitated by Oil/Water Interfaces," Advanced Materials, vol. 24, Issue 29, Jun. 12, 2012, WILEY-VCH Verlag GmbH & Co, pp. 3958-3964.
Gao, Wei et al., "Direct laser writing of micro-supercapacitors on hydrated graphite oxide films," Nature Nanotechnology, vol. 6, Issue 8, Jul. 2011, Macmillan Publishers Limited, p. 496-500.
Gao, Wei et al., "Direct laser writing of micro-supercapacitors on hydrated graphite oxide films," Supplementary Information, Nature Nanotechnology, vol. 6, Issue 8, Jul. 2011, Macmillan Publishers Limited, 15 pages.
Gao, Hongcai et al., "Flexible All-Solid-State Asymmetric Supercapacitors Based on Free-Standing Carbon Nanotube/Graphene and $Mn_3O_4$ Nanoparticle/Graphene Paper Electrodes," Applied Materials & Interfaces, vol. 4, Issue 12, Nov. 20, 2012, American Chemical Society, pp. 7020-7026.
Gao, Hongcai et al., "High-Performance Asymmetric Supercapacitor Based on Graphene Hydrogel and Nanostructured $MnO_2$," ACS Applied Materials and Interfaces, vol. 4, Issue 5, Apr. 30, 2012, American Chemical Society, pp. 2801-2810.
U.S. Appl. No. 13/725,073, filed Dec. 21, 2012.
U.S. Appl. No. 15/427,210, filed Feb. 8, 2017.
U.S. Appl. No. 14/382,463, filed Sep. 2, 2014.
U.S. Appl. No. 15/319,286, filed Dec. 15, 2016.
U.S. Appl. No. 14/945,232, filed Nov. 18, 2015.
U.S. Appl. No. 15/382,871, filed Dec. 19, 2016.
U.S. Appl. No. 15/472,409, filed Mar. 29, 2017.
U.S. Appl. No. 15/466,425, filed Mar. 22, 2017.
Luo, Zhi-Jia et al., "A timesaving, low-cost, high-yield method for the synthesis of ultrasmall uniform graphene oxide nanosheets and their application in surfactants," Nanotechnology, vol. 27, Issue 5, Dec. 16, 2015, IOP Publishing Ltd, pp. 1-8.
Maiti, Sandipan et al., "Interconnected Network of $MnO_2$ Nanowires with a "Cocoonlike" Morphology: Redox Couple-Mediated Performance Enhancement in Symmetric Aqueous Supercapacitor," ACS Applied Materials & Interfaces, vol. 6, Issue 13, Jun. 16, 2014, American Chemical Society, pp. 10754-10762.
Maiti, Uday Narayan et al., "Three-Dimensional Shape Engineered, Interfacial Gelation of Reduced Graphene Oxide for High Rate, Large Capacity Supercapacitors," vol. 26, Issue 4, Jan. 29, 2014, WILEY-VCH Verlag GmbH & Co., pp. 615-619.
Mao, Lu et al., "Surfactant-stabilized graphene/polyaniline nanofiber composites for high performance supercapacitor electrode," Journal of Materials Chemistry, vol. 22, Issue 1, Oct. 12, 2011, The Royal Society of Chemistry, pp. 80-85.
Marcano, Daniela C. et al., "Improved Synthesis of Graphene Oxide," ACS Nano, vol. 4, Issue 8, Jul. 22, 2010, American Chemical Society, pp. 4806-4814.
Miller, John R. et al., "Electrochemical Capacitors for Energy Management," Materials Science, vol. 321, Aug. 1, 2008, AAAS, pp. 651-652.
Moosavifard, Seyyed E. et al., "Designing 3D highly ordered nanoporous CuO electrodes for high-performance asymmetric supercapacitors," ACS Applied Materials & Interfaces, vol. 7, Issue 8, American Chemical Society, 13 pages.
Moussa, Mahmoud et al, "Free-Standing Composite Hydrogel Film for Superior Volumetric Capacitance," Journal of Materials Chemistry A, vol. 3, Issue 30, Jun. 19, 2015, The Royal Society of Chemistry, pp. 1-8.
Naoi, Katsuhiko et al., "Second generation 'nanohybrid supercapacitor': Evolution of capacitive energy storage devices," Energy & Environmental Science, vol. 5, Issue 11, Sep. 14, 2012, The Royal Society of Chemistry, pp. 9363-9373.
Nathan, Arokia et al., "Flexible Electronics: The Next Ubiquitous Platform," Proceedings of the IEEE, vol. 100, Special Centennial Issue, May 13, 2012, IEEE, pp. 1486-1517.
Niu, Zhiqiang et al., "A Leavening Strategy to Prepare Reduced Graphene Oxide Foams," Advanced Materials, vol. 24, Issue 30, Aug. 8, 2012, WILEY-VCH Verlag GmbH & Co., pp. 1-7.
Oudenhoven, Jos F. M. et al., "All-Solid-State Lithium-Ion Microbatteries: A Review of Various Three-Dimensional Concepts," Advanced Energy Matterials, vol. 1, Issue 1, WILEY-VCH Verlag GmbH & Co. KGaA, Weinheim, pp. 10-33.
Paravannoor, Anjali et al., "High voltage supercapacitors based on carbon-grafted NiO nanowires interfaced with an aprotic ionic liquid," Chemical Communications, vol. 51, Issue 28, Feb. 26, 2015, The Royal Society of Chemistry, pp. 1-4.
Patel, Mehul N. et al., "Hybrid $MnO_2$-disordered mesoporous carbon nanocomposites: synthesis and characterization as electrochemical pseudocapacitor electrodes," Journal of Materials Chemistry, vol. 20, Issue 2, Nov. 11, 2009, The Royal Society of Chemistry, pp. 390-398.
Pech, David et al, "Ultrahigh-power micrometre-sized supercapacitors based on onion-like carbon," Nature Nanotechnology, vol. 5, Sep. 2010, Macmillan Publishers Limited, 10 pages.
Pendashteh, Afshin et al., "Fabrication of anchored copper oxide nanoparticles on graphene oxide nanosheets via an electrostatic coprecipitation and its application as supercapacitor," Electrochimica Acta, vol. 88, Oct. 29, 2012, Elsevier Ltd., pp. 347-357.
Pendashteh, Afshin et al., "Facile synthesis of nanostructured $CuCo_2O_4$ as a novel electrode material for high-rate supercapacitors," vol. 50, Issue 16, Dec. 17, 2013, The Royal Society of Chemistry, 4 pages.
Pendashteh, Afshin et al., "Highly Ordered Mesoporous $CuCo_2O_4$ Nanowires, a Promising Solution for High-Performance Supercapacitors," Chemistry of Materials, vol. 27, Issue 11, Apr. 20, 2015, American Chemical Society, pp. 1-11.

(56) References Cited

OTHER PUBLICATIONS

Qing, Xutang et al., "P/N/O co-doped carbonaceous materials based supercapacitor with voltage up to 1.9 V in the aqueous electrolyte," RSC Advances, vol. 4, Issue 99, Oct. 21, 2014, Royal Society of Chemistry, pp. 1-22.
Qiu, Ling et al., "Controllable Corrugation of Chemically Converted Graphene Sheets in Water and Potential Application for Nanofiltration," Chemical Communications, vol. 47, 2011, pp. 5810-5812.
Qu, Qunting et al., "Core-Shell Structure of Polypyrrole Grown on $V_2O_5$ Nanoribbon as High Performance Anode Material for Supercapacitors," Advanced Energy Materials, vol. 2, Issue 8, 2012, WILEY-VCH Verlag GmbH & Co., pp. 1-6.
Raccichini, Rinaldo et al., "The role of graphene for electrochemical energy storage," Nature Materials, vol. 14, Issue 3, Dec. 22, 2014, Macmillan Publishers Limited, pp. 1-9.
Samitsu, Sadaki et al., "Flash freezing route to mesoporous polymer nanofibre networks," Nature Communications, vol. 4, Issue 2653, Oct. 22, 2013, Macmillan Publishers Limited, pp. 1-7.
Shae, Yuanlong et al., "Fabrication of large-area and high-crystallinity photoreduced graphene oxide films via reconstructed two-dimensional multilayer structures," NPG Asia Materials, vol. 6, Issue 8, e119, Aug. 15, 2014, Nature Publishing Group, pp. 1-9.
Shao, Yuanlong et al., "Graphene-based materials for flexible supercapacitors," Chemical Society Review, vol. 14, Issue 11, Apr. 22, 2015, The Royal Society of Chemistry, 27 pages.
Shao, Yuanlong et al., "High-performance flexible asymmetric supercapacitors based on 3D porous graphene/$MnO_2$ nanorod and graphene/Ag hybrid thin-film electrodes," Journal of Materials Chemistry C, vol. 1, Dec. 5, 2012, The Royal Society of Chemistry, pp. 1245-1251.
Sheats, James R., "Manufacturing and commercialization issues in organic electronics," Journal of Materials Research, vol. 19, Issue 7, Jul. 2004, Materials Research Society, pp. 1974-1989.
Shen, Caiwei et al., "A high-energy-density micro supercapacitor of asymmetric $MnO_2$-carbon configuration by using micro-fabrication technologies," Journal of Power Sources, vol. 234, Feb. 9, 2013, Elsevier B.V., pp. 302-309.
Shen, Jiali et al., "High-Performance Asymmetric Supercapacitor Based on Nano-architectured Polyaniline/Graphene/Carbon Nanotube and Activated Graphene Electrodes," ACS Applied Materials & Interfaces, vol. 5, Issue 17, Aug. 9, 2013, American Chemical Society, 36 pages.
Shown, Indrajit et al., "Conducting polymer-based flexible supercapacitor," Energy Science & Engineering, vol. 3, Issue 1, Nov. 19, 2014, Society of Chemical Industry and John Wiley & Sons Ltd., pp. 1-25.
Simon, P. et al., "Capacitive Energy Storage in Nanostructured Carbon-Electrolyte Systems," Accounts of Chemical Research, vol. 46, Issue 5, Jun. 6, 2012, American Chemical Society, 10 pages.
Simon, Patrice et al., "Materials for electrochemical capacitors," Nature Materials, vol. 7, Issue 11, Nov. 2008, Macmillan Publishers Limited, pp. 845-854.
Simon, Patrice et al., "Where Do Batteries End and Supercapacitors Begin?" Science, vol. 343, Issue 6176, Mar. 14, 2014, American Association for the Advancement of Science, 3 pages.
Snook, Graeme A. et al., "Conducting-polymer-based supercapacitor devices and electrodes," Journal of Power Sources, vol. 196, Jul. 15, 2010, Elsevier B.V., pp. 1-12.
Stoller, Meryl D. et al., "Graphene-Based Ultracapacitors," Nano Letters, vol. 8, Issue 10, Sep. 13, 2008, American Chemical Society, pp. 3498-3502.
Strong, Veronica et al., "Patterning and Electronic Tuning of Laser Scribed Graphene for Flexible All-Carbon Devices," ACS Nano, vol. 6, Issue 2, Jan. 13, 2012, American Chemical Society, p. 1395-1403.
Su, Zijin et al., "Scalable fabrication of $MnO_2$ nanostructure deposited on free-standing Ni nanocone arrays for ultrathin, flexible, high-performance micro-supercapacitor," Energy and Environmental Science, vol. 7, May 28, 2014, The Royal Society of Chemistry, pp. 2652-2659.
Sumboja, Afriyanti et al., "Large Areal Mass, Flexible and Free-Standing Reduced Graphene Oxide/Manganese Dioxide Paper for Asymmetric Supercapacitor Device," Advanced Materials, vol. 25, Issue 20, May 24, 2013, WILEY-VCH Verlag GmbH & Co. KGaA, Weinheim, pp. 2809-2815.
Tian, Yuyu et al., "Synergy of $W_{18}O_{49}$ and Polyaniline for Smart Supercapacitor Electrode Integrated with Energy Level Indicating Functionality," Nano Letters, vol. 14, Issue 4, Mar. 4, 2014, American Chemical Society, pp. 2150-2156.
Toupin, Mathieu et al., "Charge Storage Mechanism of $MnO_2$ Electrode Used in Aqueous Electrochemical Capacitor," Chemistry of Materials, vol. 16, Issue 16, Jul. 16, 2004, American Chemical Society, pp. 3184-3190.
Tran, Henry D. et al., "The oxidation of aniline to produce "polyaniline": a process yielding many different nanoscale structures," Journal of Materials Chemistry, vol. 21, Issue 11, Nov. 25, 2010, The Royal Society of Chemistry, pp. 3534-3550.
Viculis, Lisa M. et al., "A Chemical Route to Carbon Nanoscrolls," Science, vol. 299, Issue 5611, Feb. 28, 2003, American Association for the Advancement of Science, 2 pages.
Vonlanthen, David et al., "A Stable Polyaniline-Benzoquinone-Hydroquinone Supercapacitor," Advanced Materials, vol. 26, Issue 30, Jun. 13, 2014, WILEY-VCH Verlag GmbH & Co., pp. 1-6.
Wallace, Gordon G. et al., "Processable aqueous dispersions of graphene nanosheets," Nature Nanotechnology, vol. 3, Issue 2, 2008, Nature Publishing Group, pp. 101-105.
Wang, Gongkai et al., "Flexible Pillared Graphene-Paper Electrodes for High-Performance Electrochemical Supercapacitors," Small, vol. 8, Issue 3, Dec. 8, 2011, pp. 452-459.
Wang, Guoping et al, "A review of electrode materials for electrochemical supercapacitors," Chemical Society Reviews, vol. 41, Jul. 21, 2011, The Royal Society of Chemistry, pp. 797-828.
Wang, Guoxiu et al., "Graphene nanosheets for enhanced lithium storage in lithium ion batteries," Carbon, vol. 47, Issue 8, Apr. 1, 2009, Elsevier Ltd., pp. 2049-2053.
Wang, Hailiang et al., "$Mn_3O_4$-Graphene Hybrid as a High-Capacity Anode Material for Lithium Ion Batteries," Journal of the American Chemical Society, vol. 132, Issue 40, Oct. 13, 2010, American Chemical Society, pp. 13978-13980.
Wang, Huanlei et al., "Graphene—Nickel Cobaltite Nanocomposite Asymmetrical Supercapacitor with Commercial Level Mass Loading," Nano Research, vol. 5, Issue 9, Sep. 2012, Tsinghua University Press and Springer-Verlag Berlin Heidelberg, pp. 605-617.
Wang, Kai et al., "Flexible supercapacitors based on cloth-supported electrodes of conducting polymer nanowire array/SWCNT composites," Journal of Materials Chemistry, vol. 21, Issue 41, Sep. 20, 2011, The Royal Society of Chemistry, pp. 16373-16378.
Kaewsongpol, Tanon et al., "High-performance supercapacitor of electrodeposited porous 3Dpolyaniline nanorods on functionalized carbon fiber paper: Effects of hydrophobic and hydrophilic surfaces of conductive carbon paper substrates," Materials Today Communications, vol. 4, Aug. 19, 2015, Elsevier Ltd., pp. 176-185.
Yan, Jun et al., "Preparation of graphene nanosheet/carbon nanotube/polyaniline composite as electrode material for supercapacitors," Journal of Power Sources, vol. 195, Issue 9, Nov. 11, 2009, Elsevier B.V., pp. 3041-3045.
Examination Report for European Patent Application No. 12874989.2, dated Jul. 24, 2017, 5 pages.
Communication pursuant to Article 94(3) EPC for European Patent Application No. 13757195.6, dated Jul. 6, 2017, 3 pages.
International Search Report and Written Opinion for International Patent Application No. PCT/US2017/024716, dated Jun. 20, 2017, 13 pages.
Gao, Yu et al., "High power supercapcitor electrodes based on flexible TiC-CDC nano-felts," Journal of Power Sources, vol. 201, Issue 1, Mar. 2012, Elsevier B.V., pp. 368-375.
Gao, Lijun et al., "Power Enhancement of an Actively Controlled Battery/Ultracapacitor Hybrid," IEEE Transactions on Power Electronics, vol. 20, Issue 1, Jan. 2005, IEEE, pp. 236-243.
Ghasemi, S. et al., "Enhancement of electron transfer kinetics on a polyaniline-modified electrode in the presence of anionic dopants,"

(56) References Cited

OTHER PUBLICATIONS

Journal of Solid State Electrochemistry, vol. 12, Issue 3, Jul. 28, 2007, Springer-Verlag, pp. 259-268.
Ghidiu, Michael et al., "Conductive two-dimensional titanium carbide 'clay' with high volumetric capacitance," Nature, vol. 516, Dec. 4, 2014, Macmillan Publishers Limited, pp. 78-81.
Gilje, Scott et al., "A Chemical Route to Graphene for Device Applications," Nano Letters, vol. 7, Issue 11, Oct. 18, 2007, American Chemical Society, pp. 3394-3398.
Gilje, Scott et al., "Photothermal Deoxygenation of Graphene Oxide for Patterning and Distributed Ignition Applications," Advanced Materials, vol. 22, Issue 3, Oct. 26, 2009, WILEY-VCH Verlag GmbH & Co. KGaA, Weinheim, Germany, pp. 419-423.
Glavin, M.E. et al, "A Stand-alone Photovoltaic Supercapacitor Battery Hybrid Energy Storage System," Proceedings of the 13th International Power Electronics and Motion Control Conference (EPE-PEMC), Sep. 1-3, 2008, Poznań, Poland, IEEE, pp. 1688-1695.
Gogotsi, Y. et al., "True Performance Metrics in Electrochemical Energy Storage," Science Magazine, vol. 334, Issue 6058, Nov. 18, 2011, 4 pages.
Gracia, J. et al., "Corrugated layered heptazine-based carbon nitride: the lowest energy modifications of $C_3N_4$ ground state," Journal of Materials Chemistry, vol. 19, 2009, pp. 3013-3019.
Griffiths, Katie et al., "Laser-scribed graphene presents an opportunity to print a new generation of disposable electrochemical sensors," Nanoscale, vol. 6, Sep. 22, 2014, The Royal Society of Chemistry, pp. 13613-13622.
Guardia, L. et al., "UV light exposure of aqueous graphene oxide suspensions to promote their direct reduction, formation of graphene—metal nanoparticle hybrids and dye degradation," Carbon, vol. 50, Issue 3, Oct. 12, 2011, Elsevier Ltd., pp. 1014-1024.
Guerrero-Contreras, Jesus et al., "Graphene oxide powders with different oxidation degree, prepared by synthesis variations of the Hummers method," Materials Chemistry and Physics, vol. 153, Mar. 1, 2015, Elsevier B.V., pp. 1-12.
Günes, Fethullah et al., "Layer-by-Layer Doping of Few-Layer Graphene Film," ACS Nano, vol. 4, Issue 8, Jul. 27, 2010, American Chemical Society, pp. 4595-4600.
He, Xinping et al., "A new nanocomposite: Carbon cloth based polyaniline for an electrochemical supercapacitor," Electrochimica Acta, vol. 111, Aug. 17, 2013, Elsevier Ltd., pp. 210-215.
Hu, Liangbing et al., "Symmetrical $MnO_2$-Carbon Nanotube-Textile Nanostructures for Wearable Pseudocapacitors with High Mass Loading," ACS Nano, vol. 5, Issue 11, Sep. 16, 2011, American Chemical Society, pp. 8904-8913.
Huang, Yi et al., "An Overview of the Applications of Graphene-Based Materials in Supercapacitors," Small, vol. 8, Issue 12, Jun. 25, 2012, Wiley-VCH Verlag GmbH & Co. KGaA, Weinheim, pp. 1-30.
Huang, Ming et al., "Self-Assembly of Mesoporous Nanotubes Assembled from Interwoven Ultrathin Birnessite-type $MnO_2$ Nanosheets for Asymmetric Supercapacitors," Scientific Reports, vol. 4, Issue 3878, Jan. 27, 2014, ww.nature.com/scientificreports, pp. 1-8.
Hwang, Jee Y. et al., "Direct preparation and processing of graphene/$RuO2$ nanocomposite electrodes for high-performance capacitive energy storage," Nano Energy, vol. 18, Sep. 25, 2015, Elsevier B.V., pp. 57-70.
Jana, Milan et al., "Non-covalent functionalization of reduced graphene oxide using sulfanilic acid azocromotrop and its application as a supercapacitor electrode material," Journal of Materials Chemistry A, vol. 3, Issue 14, Feb. 24, 2015, The Royal Society of Chemistry, pp. 7323-7331.
Ji, Junyi et al., "Nanoporous $Ni(OH)_2$ Thin Film on 3D Ultrathin-Graphite Foam for Asymmetric Supercapacitor," ACS Nano, vol. 7, Issue 7, Jun. 11, 2013, American Chemical Society, pp. 6237-6243.
Jimbo, "Transistors," Sparkfun, https://learn.sparkfun.com/tutorials/transistors/extending-the-water-analogy, accessed Dec. 14, 2015, SparkFun Electronics, 3 pages.
Jin, H. Y. et al., "Controllable functionalized carbon fabric for high-performance all-carbon-based supercapacitors," RSC Advances, vol. 4, Issue 62, Jul. 15, 2014, The Royal Society of Chemistry, pp. 33022-33028.
Kang, Yu Jin et al., "All-solid-state flexible supercapacitors based on papers coated with carbon nanotubes and ionic-liquid-based gel electrolytes," Nanotechnology, vol. 23, Issue 6, Jan. 17, 2012, IOP Publishing Ltd, pp. 1-6.
Khaligh, Alireza et al., "Battery, Ultracapacitor, Fuel Cell, and Hybrid Energy Storage Systems for Electric, Hybrid Electric, Fuel Cell, and Plug-In Hybrid Electric Vehicles: State of the Art," IEEE Transactions on Vehicular Technology, vol. 59, Issue 6, Jul. 2010, IEEE, pp. 2806-2814.
Khomenko, V. et al., "Optimisation of an asymmetric manganese oxide/activated carbon capacitor working at 2 V in aqueous medium," Journal of Power Sources, vol. 153, Issue 1, Mar. 14, 2005, Elsevier B.V., pp. 183-190.
Kiani, Mohammad Ali et al., "Fabrication of High Power $LiNi0.5Mn1.5O4$ Battery Cathodes by Nanostructuring of Electrode Materials," RSC Advances, vol. 5, Issue 62, May 26, 2015, The Royal Society of Chemistry, pp. 1-6.
Kiani, M.A. et al., "Size effect investigation on battery performance: Comparison between micro- and nano-particles of $3-Ni(OH)_2$ as nickel battery cathode material," Journal of Power Sources, vol. 195, Issue 17, Apr. 2, 2010, Elsevier B.V., pp. 5794-5800.
Kiani, M.A. et al., "Synthesis of Nano- and Micro-Particles of $LiMn_2O_4$: Electrochemical Investigation and Assessment as a Cathode in Li Battery," International Journal of Electrochemical Science, vol. 6, Issue 7, Jul. 1, 2011, ESG, pp. 2581-2595.
Kovtyukhova, Nina, I. et al., "Layer-by-Layer Assembly of Ultrathin Composite Films from Micron-Sized Graphite Oxide Sheets and Polycations," Kovtyukhova, et al, Chemistry of Materials, vol. 11, Issue 3, Jan. 28, 1999, American Chemical Society, pp. 771-778.
Lam, L.T. et al., "Development of ultra-battery for hybrid-electric vehicle applications," Journal of Power Sources, vol. 158, Issue 2, May 2, 2006, Elsevier B.V., pp. 1140-1148.
Lang, Xingyou et al., "Nanoporous metal/oxide hybrid electrodes for electrochemical supercapacitors," Nature Nanotechnology, vol. 6, Apr. 2011, Macmillan Publishers Limited, pp. 232-236.
Lee, Kyu Hyung et al., "Large scale production of highly conductive reduced graphene oxide sheets by a solvent-free low temperature reduction," Carbon, vol. 69, Dec. 16, 2013, Elsevier Ltd., pp. 327-335.
Lee, Kyoung, G. et al, "Sonochemical-assisted synthesis of 3D graphene/nanoparticle foams and their application in supercapacitor," Ultrasonics Sonochemistry, vol. 22, May 2, 2014, Elsevier B.V., pp. 422-428.
Lee, Seung Woo et al., "Carbon Nanotube/Manganese Oxide Ultrathin Film Electrodes for Electrochemical Capacitors," ACS Nano, vol. 4, Issue 7, Jun. 16, 2010, American Chemical Society, pp. 3889-3896.
Lei, Zhibin et al., "Platelet CMK-5 as an Excellent Mesoporous Carbon to Enhance the Pseudocapacitance of Polyaniline," ACS Applied Materials & Interfaces, vol. 5, Issue 15, Jul. 12, 2013, American Chemical Society, pp. 7501-7508.
Li, Dan et al., "Processable aqueous dispersions of graphene nanosheets," Nature Nanotechnology, vol. 3, Feb. 2008, Nature Publishing Group, pp. 101-105.
Li, Lei et al., "Nanocomposite of Polyaniline Nanorods Grown on Graphene Nanoribbons for Highly Capacitive Pseudocapacitors," ACS Applied Materials and Interfaces, vol. 5, Issue 14, Jun. 21, 2013, American Chemical Society, 6 pages.
Li, Peixu et al., "Core-Double-Shell, Carbon Nanotube@Polypyrrole@$MnO_2$ Sponge as Freestanding, Compressible Supercapacitor Electrode," ACS Applied Materials and Interfaces, vol. 6, Issue 7, Mar. 12, 2014, American Chemical Society, pp. 5228-5234.
Li, Qi et al., "Design and Synthesis of $MnO_2/Mn/MnO_2$ Sandwich-Structured Nanotube Arrays with High Supercapacitive Performance for Electrochemical Energy Storage," Nano Letters, vol. 12, Issue 7, Jun. 25, 2012, American Chemical Society, pp. 3803-3807.

(56) References Cited

OTHER PUBLICATIONS

Li, Yingzhi et al., "Oriented Arrays of Polyaniline Nanorods Grown on Graphite Nanosheets for an Electrochemical Supercapacitor," Langmuir, vol. 29, Issue 1, Dec. 3, 2012, American Chemical Society, 8 pages.
Li, Zhe-Fei et al., "Fabrication of high-surface-area graphene/polyaniline nanocomposites and their application in supercapacitors," ACS Applied Materials & Interfaces, vol. 5, Issue 7, Mar. 12, 2013, American Chemical Society, pp. 1-25.
Lin, Jian et al., "3-Dimensional Graphene Carbon Nanotube Carpet-Based Microsupercapacitors with High Electrochemical Performance," Nano Letters, vol. 13, Issue 1, Dec. 13, 2012, American Chemical Society, pp. 72-78.
Linden, David et al., "Handbook of Batteries," McGraw-Hill Handbooks, Third Edition, 2010, New York, The McGraw-Hill Companies, Inc., 1,454 pages.
Liu, Wenwen et al., "Novel and high-performance asymmetric micro-supercapacitors based on graphene quantum dots and polyaniline nanofibers," Nanoscale, vol. 5, Apr. 24, 2013, The Royal Society of Chemistry, pp. 6053-6062.
Liu, Wen-Wen et al., "Superior Micro-Supercapacitors Based on Graphene Quantum Dots," Advanced Functional Materials, vol. 23, Issue 33, Mar. 26, 2013, WILEY-VCH Verlag GmbH & Co. KGaA, Weinheim, pp. 4111-4122.
Liu, Yongfeng et al., "Advanced hydrogen storage alloys for Ni/MH rechargeable batteries," Journal of Materials Chemistry, vol. 21, Issue 11, Dec. 15, 2010, The Royal Society of Chemistry, pp. 4743-4755.
Long, Jeffrey W. et al., "Asymmetric electrochemical capacitors—Stretching the limits of aqueous electrolytes," MRS Bulletin, vol. 36, Jul. 2011, Materials Research Society, pp. 513-522.
Lu, Xihong et al., "Stabilized TiN Nanowire Arrays for High-Performance and Flexible Supercapacitors," Nano Letters, vol. 12, Issue 10, Sep. 4, 2012, American Chemical Society, 6 pages.
Lukatskaya, Maria R. et al., "Cation Intercalation and High Volumetric Capacitance of Two-Dimensional Titanium Carbide," Science, vol. 341, Issue 6153, Sep. 27, 2013, American Association for the Advancement of Science, pp. 1502-1505.
Lukic, Srdjam, M. et al., "Power Management of an Ultracapacitor/Battery Hybrid Energy Storage System in an HEV," IEEE Vehicle Power and Propulsion Conference (VPPC), Sep. 6-8, 2006, IEEE, 6 pages.
First Office Action for Canadian Patent Application No. 2,862,806, dated Nov. 22, 2018, 5 pages.
Notification of the First Office Action for Chinese Patent Application No. 201580043429.1, dated Oct. 29, 2018, 19 pages.
International Search Report and Written Opinion for International Patent Application No. PCT/US2018/041728, dated Nov. 9, 2018, 10 pages.
Decision on Rejection for Chinese Patent Application No. 201380023699.7, dated Aug. 16, 2018, 11 pages.
International Preliminary Report on Patentability for International Patent Application No. PCT/US2017/024716, dated Oct. 11, 2018, 10 pages.
International Preliminary Report on Patentability for International Patent Application No. PCT/US2017/023632, dated Oct. 4, 2018, 8 pages.
Invitation to Pay Additional Fees for International Patent Application No. PCT/US2018/041728, dated Sep. 12, 2018, 2 pages.
Extended European Search Report for European Patent Application No. 15861794.4, dated Oct. 2, 2018, 13 pages.
Corrected Notice of Allowability for U.S. Appl. No. 15/319,286, dated Nov. 30, 2018, 5 pages.
Notice of Allowance for U.S. Appl. No. 15/319,286, dated Oct. 1, 2018, 8 pages.
Advisory Action for U.S. Appl. No. 14/945,232, dated Oct. 15, 2018, 3 pages.
Braz, Elton P., et al., "Effects of Gamma Irradiation in Graphene/Poly(ethylene Oxide) Nanocomposites," 2013 International Nuclear Atlantic Conference—INAC 2013, Nov. 24-29, 2013, Recife, PE, Brazil, 7 pages.
Hu, Liangbing, et al., "Lithium-Ion Textile Batteries with Large Areal Mass Loading," Advanced Energy Materials, vol. 1, Issue 6, Oct. 6, 2011, pp. 1012-1017.
Corrected Notice of Allowability for U.S. Appl. No. 15/319,286, dated Oct. 29, 2018, 5 pages.
Non-Final Office Action for U.S. Appl. No. 15/427,210, dated Feb. 28, 2019, 17 pages.
Non-Final Office Action for U.S. Appl. No. 16/029,930, dated Jan. 14, 2019, 8 pages.
Corrected Notice of Allowability for U.S. Appl. No. 15/319,286, dated Jan. 18, 2019, 5 pages.
Non-Final Office Action for U.S. Appl. No. 14/945,232, dated Jan. 9, 2019, 7 pages.
Final Office Action for U.S. Appl. No. 15/382,871, dated Jan. 25, 2019, 16 pages.
Final Office Action for U.S. Appl. No. 15/472,409, dated Jan. 18, 2019, 12 pages.
Huang, L. et al., "Pulsed laser assisted reduction of graphene oxide," Carbon, vol. 49, 2011, Elsevier, pp. 2431-2436.
Kumar, P. et al., "Graphene produced by radiation-induced reduction of graphene oxide," Sep. 26, 2010, DOI: DOI:10.1142/S0219581X11008824, 23 pages.
Notice of Preliminary Rejection for Korean Patent Application No. 10-2014-7020353, dated Apr. 15, 2019, 11 pages.
Examination Report No. 1 for Australian Patent Application No. 2015277264, dated Mar. 7, 2019, 4 pages.
Notification of the Second Office Action for Chinese Patent Application No. 201580072540.3, dated Mar. 7, 2019, 12 pages.
Official Action for Eurasian Patent Application No. 201791078, dated Mar. 27, 2019, 5 pages.
Examination Report for European Patent Application No. 12874989.2, dated Mar. 5, 2019, 5 pages.
Office Action for Canadian Patent Application No. 2,866,250, dated Jan. 11, 2019, 3 pages.
Notice of Reasons for Rejection for Japanese Patent Application No. 2016-573846, dated Feb. 26, 2019, 8 pages.
Search Report for Japanese Patent Application No. 2016-573846, dated Feb. 28, 2019, 44 pages.
Examination Report No. 1 for Australian Patent Application No. 2015349949, dated Mar. 8, 2019, 4 pages.
International Preliminary Report on Patentability for International Patent Application No. PCT/US2017/048883, dated Mar. 14, 2019, 7 pages.
International Preliminary Report on Patentability for International Patent Application No. PCT/US2017/038992, dated Jan. 3, 2019, 10 pages.
Non-Final Office Action for U.S. Appl. No. 16/029,930, dated Apr. 3, 2019, 13 pages.
Interview Summary for U.S. Appl. No. 14/945,232, dated Apr. 11, 2019, 3 pages.
Interview Summary for U.S. Appl. No. 15/382,871, dated Apr. 1, 2019, 10 pages.
Advisory Action for U.S. Appl. No. 15/382,871, dated Apr. 24, 2019, 3 pages.
Non-Final Office Action for U.S. Appl. No. 15/688,342, dated Mar. 26, 2019, 9 pages.
Notice of Preliminary Rejection for Korean Patent Application No. 10-2014-7028084, dated Aug. 22, 2019, 30 pages.
Notification of Reasons for Rejection for Japanese Patent Application No. 2017-526533, dated Aug. 20, 2019, 4 pages.
Notice of Acceptance for Australian Patent Application No. 2015277264, dated Jul. 31, 2019, 3 pages.
Notification of the Third Office Action for Chinese Patent Application No. 201580072540.3, dated Jul. 17, 2019, 9 pages.
Park, S. et al., "Colloidal Suspensions of Highly Reduced Graphene Oxide in a Wide Variety of Organic Solvents," Nano Letters, vol. 9, No. 4, 2009, American Chemical Society, pp. 1593-1597.
Applicant-Initiated Interview Summary for U.S. Appl. No. 15/427,210, dated May 29, 2019, 3 pages.

(56) References Cited

OTHER PUBLICATIONS

Notice of Reexamination for Chinese Patent Application No. 201280070343.4, dated Jun. 27, 2019, 14 pages.
Non-Final Office Action for U.S. Appl. No. 15/466,425, dated Jul. 10, 2019, 8 pages.
Non-Final Office Action for U.S. Appl. No. 15/612,405, dated Jun. 18, 2019, 12 pages.
Notification of the Second Office Action for Chinese Patent Application No. 201580043429.1, dated Jun. 20, 2019, 9 pages.
Final Office Action for U.S. Appl. No. 14/945,232, dated Jul. 17, 2019, 8 pages.
Notice of Acceptance for Australian Patent Application No. 2015349949, dated Jul. 12, 2019, 3 pages.
Notice of Allowance for U.S. Appl. No. 15/382,871, dated May 17, 2019, 10 pages.
Extended European Search Report for European Patent Application No. 16879927.8, dated Jul. 9, 2019, 14 pages.
Partial Supplementary European Search Report for European Patent Application No. 17741923.1, dated Jul. 23, 2019, 13 pages.
Non-Final Office Action for U.S. Appl. No. 15/472,409, dated May 31, 2019, 12 pages.
Cannarella et al., "Mechanical Properties of a Battery Separator under Compression and Tension," Journal of the Electrochemical Society, vol. 161, No. 11, Sep. 26, 2014, pp. F3117-F3122.
Non-Final Office Action for U.S. Appl. No. 15/427,210, dated Sep. 3, 2019, 16 pages.
Applicant-Initiated Interview Summary for U.S. Appl. No. 16/029,930, dated Jul. 29, 2019, 4 pages.
Non-Final Office Action for U.S. Appl. No. 14/945,232, dated Sep. 3, 2019, 8 pages.
Non-Final Office Action for U.S. Appl. No. 15/382,871, dated Sep. 16, 2019, 9 pages.
Non-Final Office Action for U.S. Appl. No. 16/428,409, dated Sep. 16, 2019, 12 pages.
Office Action for Canadian Patent Application No. 2,862,806, dated Sep. 30, 2019, 3 pages.
Decision of Rejection for Japanese Patent Application No. 2016-573846, dated Oct. 29, 2019, 9 pages.
First Office Action for Chinese Patent Application No. 2016800753323, dated Aug. 27, 2019, 15 pages.
Extended European Search Report for European Patent Application No. 17741923.1, dated Nov. 15, 2019, 18 pages.
Extended European Search Report for European Patent Application No. 17776536.9, dated Oct. 30, 2019, 8 pages.
Extended European Search Report for European Patent Application No. 17771081.1, dated Oct. 22, 2019, 6 pages.
Fernandez-Merino, M.J. et al., "Vitamin C is an Ideal Substitute for Hydrazine in the Reduction of Graphene Oxide Suspensions," The Journal of Physical Chemistry C, vol. 114, No. 14, Mar. 4, 2010, American Chemical Society, pp. 6426-6432.
Lu, J. et al., "Advanced applications of ionic liquids in polymer science," Progress in Polymer Science, vol. 34, 2009, Elsevier Ltd., pp. 431-448.

Yan, Jun et al., "High-performance supercapacitor electrodes based on highly corrugated graphene sheets," Carbon, vol. 50, 2012, Elsevier Ltd., pp. 2179-2188.
Final Office Action for U.S. Appl. No. 16/029,930, dated Nov. 15, 2019, 16 pages.
Final Office Action for U.S. Appl. No. 15/688,342, dated Oct. 17, 2019, 11 pages.
Non-Final Office Action for U.S. Appl. No. 15/630,758, dated Oct. 11, 2019, 11 pages.
Applicant-Initiated Interview Summary for U.S. Appl. No. 15/466,425, dated Oct. 22, 2019, 3 pages.
Grant of Patent of Korean Patent Application No. 10-2014-7020353, dated Oct. 29, 2019, 3 pages.
Vranes, M. et al., "Physicochemical Characterization of 1-Butyl-3-methylimidazolium and 1-Buty-1-methylpyrrolidinium Bis{trifluoromethylsulfonyl)imide," Journal of Chemical & Engineering Data, vol. 57, Mar. 7, 2012, American Chemical Society, pp. 1072-1077.
Notice of Allowance for U.S. Appl. No. 15/427,210, dated Dec. 18, 2019, 9 pages.
Final Office Action for U.S. Appl. No. 15/612,405, dated Dec. 27, 2019, 17 pages.
Notice of Allowance for U.S. Appl. No. 14/945,232, dated Dec. 20, 2019, 9 pages.
Applicant-Initiated Interview Summary for U.S. Appl. No. 15/382,871, dated Dec. 31, 2019, 5 pages.
Non-Final Office Action for U.S. Appl. No. 16/692,123, dated Dec. 27, 2019, 11 pages.
Notice of Allowance for U.S. Appl. No. 15/472,409, dated Dec. 11, 2019, 11 pages.
Gao, C. et al., "Superior Cycling Performance of SiOx/C Composite with Arrayed Mesoporous Architecture as Anode Material for Lithium-Ion Batteries," Journal of The Electrochemical Society, vol. 161, No. 14, 2014, The Electrochemical Society, pp. A2216-A2221.
Office Action for Canadian Patent Application No. 2,866,250, dated Dec. 17, 2019, 3 pages.
Examination Report for European Patent Application No. 15809519.0, dated Dec. 9, 2019, 7 pages.
Office Action for Israeli Patent Application No. 249506, dated Dec. 3, 2019, 8 pages.
Official Action for Eurasian Patent Application No. 201791078, dated Nov. 6, 2019, 4 pages.
Official Action for Eurasian Patent Application No. 201892199, dated Nov. 28, 2019, 6 pages.
Extended European Search Report for European Paetnt Application No. 17816292.1, dated Jan. 7, 2020, 9 pages.
Examination Report for Indian Patent Application No. 201817044642, dated Nov. 26, 2019, 7 pages.
Official Action for Eurasian Patent Application No. 201892118, dated Nov. 28, 2019, 4 pages.

* cited by examiner

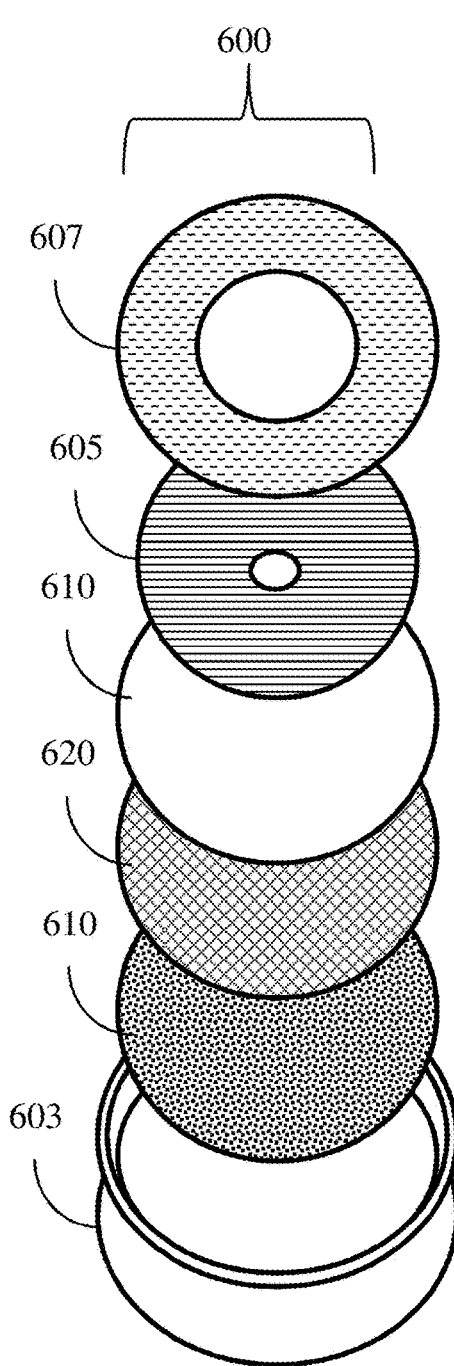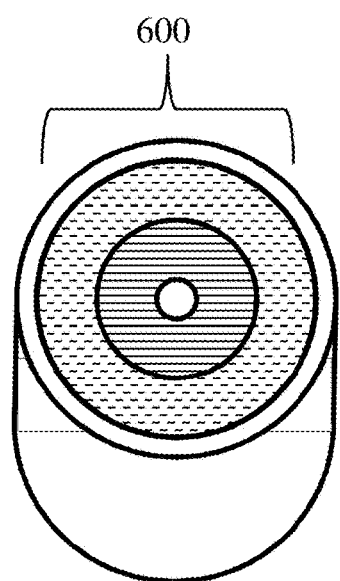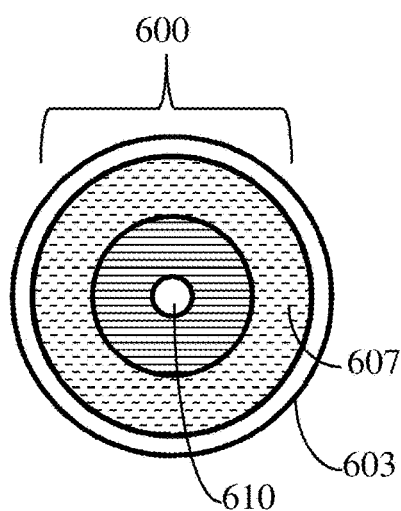
FIG. 6A
FIG. 6B
FIG. 6C

900

910

HIGH-VOLTAGE DEVICES

CROSS-REFERENCE

This application claims the benefit of U.S. Provisional Application No. 62/286,126, filed Jan. 22, 2016, which application is incorporated herein by reference.

BACKGROUND

The development of high performance energy storage devices has gained significant attention in a broad range of applications. While normal electronic devices progress rapidly, according to Moore's law, batteries have advanced only slightly, mainly due to the limitations of current materials' energy densities and capacities.

SUMMARY

The inventors have identified that batteries with a reduced charge time and an increased charge density have a profound effect on the design and use of portable electronics and renewable energy devices. Provided herein are methods, devices and systems of supercapacitors. The methods may include the manufacture (or synthesis) of an active material on a current collector and/or the manufacture of supercapacitor electrodes. Some embodiments provide methods, devices and systems for the manufacture (or synthesis) of planar and stacked arrays of electrodes and/or for the manufacture (or synthesis) of supercapacitors.

A first aspect of the disclosure provided herein is supercapacitor device comprising an array of electrodes, wherein each electrode comprises a current collector; and an active material on a portion of first surface of the current collector.

In some embodiments, the supercapacitor of the first aspect further comprises the active material on a portion of a second surface of the current collector.

In some embodiments, each electrode in the array is separated from a subsequent electrode by a gap.

In some embodiments, the current collector comprises a metal film or a polymeric film or any combination thereof, wherein the metal film comprises silver, copper, gold, aluminum, calcium, tungsten, zinc, tungsten, brass, bronze, nickel, lithium, iron, platinum, tin, carbon steel, lead, titanium, stainless steel, mercury, chromium, gallium arsenide or any combination thereof, and wherein the polymeric film comprises polyfluorene, polyphenylene, polypyrene, polyazulene, polynaphthalene, polyacetylene, poly p-phenylene vinylene, polypyrrole, polycarbazole, polyindole, polyazepinem, polyaniline, polythiophene, poly 3,4-ethylenedioxythiophene, poly p-phenylene sulfide, polyacetylene, poly p-phenylene vinylene or any combination thereof.

In some embodiments, the active material comprises two or more separated and interconnected layers. In some embodiments, the active material comprises carbon, activated carbon, graphene, polyaniline, polythiophene, an interconnected corrugated carbon-based network (ICCN) or any combination thereof. In some embodiments, the active material has a surface density of from about 250 meters squared per gram to about 3,500 meters squared per gram. In some embodiments, the active material has a conductivity of from about 750 siemens/meter to about 3,000 siemens/meter.

In some embodiments, the array of electrodes is a planar array of electrodes. In further such embodiments, the electrolyte is aqueous wherein the number of electrodes is about 5, and the produced voltage potential across the array of electrodes is from about 2.5 V to about 10 V. In further such embodiments, the electrolyte comprises tetraethyl ammonium tetrafluoroborate ($TEABF_4$) in acetonitrile wherein the number of electrodes is about 5, and the voltage potential produced across the array of electrodes is from about 6 V to about 24 V. In further such embodiments, the electrolyte is aqueous, wherein the number of electrodes is about 180, and the voltage potential produced across the array of electrodes is from about 100 V to about 360 V. In further such embodiments the electrolyte comprises tetraethyl ammonium tetrafluoroborate ($TEABF_4$) in acetonitrile, wherein the number of electrodes is about 72, and the voltage potential produced across the array pf electrodes is from about 100 V to about 360 V.

In some embodiments, the array of electrodes is a stacked array of electrodes.

In some embodiments, the supercapacitor device of the first aspect further comprises at least one or more of a separator and a support, wherein the at least one or more of a separator and a support is positioned between a pair of adjacent electrodes.

In some embodiments, the supercapacitor device of the first aspect further comprises an electrolyte, wherein the electrolyte is a liquid, a solid, a gel, or any combination thereof comprising a polymer, silica, fumed silica, fumed silica nano-powder, 1-butyl-3-methylimidazolium bis(trifluoromethylsulfonyl)imide, phosphoric acid, tetraethyl ammonium tetrafluoroborate ($TEABF_4$), acetonitrile, 1-ethyl-3-methylimidazoliumtetrafluoroborate, ethanolammonium nitrate, a dicarboxylate, a prostaglandin, adenosine monophosphate, guanosine monophosphate, a p-aminohippurate, polysiloxane, polyphosphazene, potassium hydroxide, polyvinyl alcohol or any combination thereof.

A second aspect of the disclosure provided herein is a method of fabricating a supercapacitor comprising, fabricating an array of electrodes comprising: applying an active material onto a portion of the first surface of the current collector; and drying the active material on the current collector, wherein each electrode is separated from a subsequent electrode by a gap.

In some embodiments, the method of the second aspect further comprises applying an active material onto a portion of the second surface of the current collector; and drying the active material on the current collector.

In some embodiments, at least one or more of a tape and a mask, shields a portion of the substrate to thereby prevent application of an active material onto the shielded portion of the substrate.

In some embodiments, the active material is applied in the form of a slurry. In some embodiments, the slurry is applied to the substrate by a doctor blade. In some embodiments, the process of applying an active material onto the first surface of the current collector and the process of applying an active material onto the second surface of the current collector are performed simultaneously.

In some embodiments, the drying of the active material on the current collector occurs at a temperature of from about 40° C. to about 160° C. In some embodiments, the drying of the active material on the current collector current collector occurs over a period of time from about 6 hours to about 24 hours.

In some embodiments, the electrode array comprises a planar electrode array. In some embodiments, planar electrode array is fabricated by etching or cutting the active material and the current collector.

In some embodiments, the electrode array comprises a stacked electrode array.

In some embodiments, the method of the second aspect further comprises positioning at least one or more of a separator and a support, between a pair of consecutive electrodes.

In some embodiments, the method of the second aspect further comprises dispersing an electrolyte on the array of electrodes; encasing the array of electrodes in a sheath; and inserting the encased array of electrodes into a housing.

In some embodiments, the electrolyte is a liquid, a solid, a gel, or any combination thereof comprising a polymer, silica, fumed silica, fumed silica nano-powder, 1-butyl-3-methylimidazolium bis(trifluoromethylsulfonyl)imide, phosphoric acid, tetraethyl ammonium tetrafluoroborate (TEABF$_4$), acetonitrile, 1-ethyl-3-methylimidazoliumtetrafluoroborate, ethanolammonium nitrate, a dicarboxylate, a prostaglandin, adenosine monophosphate, guanosine monophosphate, a p-aminohippurate, polysiloxane, polyphosphazene, potassium hydroxide, polyvinyl alcohol or any combination thereof.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings or figures (also "FIG." and "FIGs." herein), of which:

FIGS. 6A-C show exemplary exploded, perspective and top view illustrations of a packaged single-cell supercapacitor.

DETAILED DESCRIPTION OF THE INVENTION

Figure 1A:
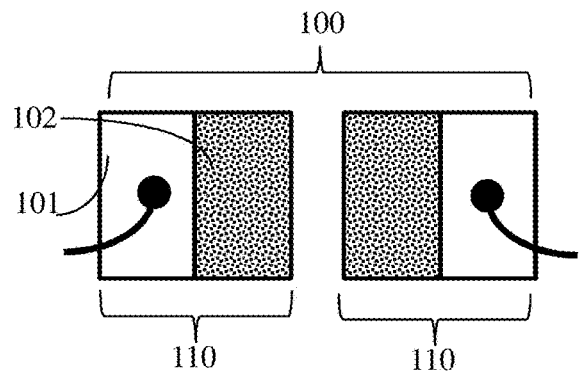
FIGS. 1A-D show exemplary illustrations of supercapacitors having multiple electrodes.

The inventors have recognized a need for an improved design of, and the integration of hybrid materials into, microsupercapacitors, to simplify the microfabrication of 3D microelectrodes with micrometer separations.

The present disclosure provides a simple, yet versatile technique for the fabrication of supercapacitors. The present disclosure provides a method for the preparation and/or integration of supercapacitors for high voltage applications. In some embodiments, the present disclosure provides a method for the direct preparation and integration of supercapacitors for high voltage applications. The supercapacitors may comprise an array of separate electrochemical cells. In some embodiments, the array of separate electrochemical electrodes may be directly fabricated in the same plane and in one step. This configuration may provide very good control over the voltage and current output. In some embodiments, the array may be integrated with solar electrodes for efficient solar energy harvesting and storage. In some embodiments, the devices are integrated supercapacitors for high voltage applications.

An aspect of the disclosure provides a supercapacitor device comprising an array of electrodes, wherein each electrode comprises a current collector; and an active material on a portion of first surface of the current collector. In some embodiments, the current collector comprises active material on a portion of a second surface of the current collector. In some embodiments, an electrode in the array is separated from a subsequent electrode by a gap.

In some embodiments, the active material comprises carbon, activated carbon, graphene, polyaniline, polythiophene, an interconnected corrugated carbon-based network (ICCN) or any combination thereof.

In some embodiments, the current collector comprises a metal film or a polymeric film or any combination thereof. In some embodiments, the metal film comprises silver, copper, gold, aluminum, calcium, tungsten, zinc, tungsten, brass, bronze, nickel, lithium, iron, platinum, tin, carbon steel, lead, titanium, stainless steel, mercury, chromium, gallium arsenide or any combination thereof. In some embodiments, the polymeric film comprises polyfluorene, polyphenylene, polypyrene, polyazulene, polynaphthalene, polyacetylene, poly p-phenylene vinylene, polypyrrole, polycarbazole, polyindole, polyazepinem, polyaniline, polythiophene, poly 3,4-ethylenedioxythiophene, poly p-phenylene sulfide, polyacetylene, poly p-phenylene vinylene or any combination thereof.

In some embodiments, the thickness of the current collector is from about 50 nanometers to about 200 nanometers. In some embodiments, the thickness of the current collector is at least about 50 nanometers. In some embodiments, the thickness of the current collector is at most about 200 nanometers. In some embodiments, thickness of the current collector is about 50 nanometers to about 75 nanometers, about 50 nanometers to about 100 nanometers, about 50 nanometers to about 125 nanometers, about 50 nanometers to about 150 nanometers, about 50 nanometers to about 175 nanometers, about 50 nanometers to about 200 nanometers, about 75 nanometers to about 100 nanometers, about 75 nanometers to about 125 nanometers, about 75 nanometers to about 150 nanometers, about 75 nanometers to about 175 nanometers, about 75 nanometers to about 200 nanometers, about 100 nanometers to about 125 nanometers, about 100 nanometers to about 150 nanometers, about 100 nanometers to about 175 nanometers, about 100 nanometers to about 200 nanometers, about 125 nanometers to about 150 nanometers, about 125 nanometers to about 175 nanometers, about 125 nanometers to about 200 nanometers, about 150 nanometers to about 175 nanometers, about 150 nanometers to about 200 nanometers, or about 175 nanometers to about 200 nanometers.

In some embodiments, the active material comprises two or more separated and interconnected layers. In some embodiments, a layer is corrugated. In some embodiments, a layer is one atom thick.

In some embodiments, a portion of the layers are separated by a distance of at least about 1 nanometer (nm). In some embodiments, a portion of the layers are separated by a distance of at most about 150 nm. In some embodiments, a portion of the layers are separated by a distance of about 1 nm to about 150 nm. In some embodiments, a portion of the layers are separated by a distance of about 1 nm to about 5 nm, about 1 nm to about 10 nm, about 1 nm to about 25 nm, about 1 nm to about 50 nm, about 1 nm to about 100 nm, about 1 nm to about 150 nm, about 5 nm to about 10 nm, about 5 nm to about 25 nm, about 5 nm to about 50 nm, about 5 nm to about 100 nm, about 5 nm to about 150 nm, about 10 nm to about 25 nm, about 10 nm to about 50 nm, about 10 nm to about 100 nm, about 10 nm to about 150 nm, about 25 nm to about 50 nm, about 25 nm to about 100 nm, about 25 nm to about 150 nm, about 50 nm to about 100 nm, about 50 nm to about 150 nm, or about 100 nm to about 150 nm.

In some embodiments, the active material has a surface density of at least about 250 meters squared per gram ($m^2/g$). In some embodiments, the active material has a surface density of at most about 3,500 $m^2/g$. In some embodiments, the active material has a surface density of about 250 $m^2/g$ to about 3,500 $m^2/g$. In some embodiments, the active material has a surface density of about 250 $m^2/g$ to about 500 $m^2/g$, about 250 $m^2/g$ to about 750 $m^2/g$, about 250 $m^2/g$ to about 1,000 $m^2/g$, about 250 $m^2/g$ to about 1,500 $m^2/g$, about 250 $m^2/g$ to about 2,000 $m^2/g$, about 250 $m^2/g$ to about 2,500 $m^2/g$, about 250 $m^2/g$ to about 3,000 $m^2/g$, about 250 $m^2/g$ to about 3,500 $m^2/g$, about 500 $m^2/g$ to about 750 $m^2/g$, about 500 $m^2/g$ to about 1,000 $m^2/g$, about 500 $m^2/g$ to about 1,500 $m^2/g$, about 500 $m^2/g$ to about 2,000 $m^2/g$, about 500 $m^2/g$ to about 2,500 $m^2/g$, about 500 $m^2/g$ to about 3,000 $m^2/g$, about 500 $m^2/g$ to about 3,500 $m^2/g$, about 750 $m^2/g$ to about 1,000 $m^2/g$, about 750 $m^2/g$ to about 1,500 $m^2/g$, about 750 $m^2/g$ to about 2,000 $m^2/g$, about 750 $m^2/g$ to about 2,500 $m^2/g$, about 750 $m^2/g$ to about 3,000 $m^2/g$, about 750 $m^2/g$ to about 3,500 $m^2/g$, about 1,000 $m^2/g$ to about 1,500 $m^2/g$, about 1,000 $m^2/g$ to about 2,000 $m^2/g$, about 1,000 $m^2/g$ to about 2,500 $m^2/g$, about 1,000 $m^2/g$ to about 3,000 $m^2/g$, about 1,000 $m^2/g$ to about 3,500 $m^2/g$, about 1,500 $m^2/g$ to about 2,000 $m^2/g$, about 1,500 $m^2/g$ to about 2,500 $m^2/g$, about 1,500 $m^2/g$ to about 3,000 $m^2/g$, about 1,500 $m^2/g$ to about 3,500 $m^2/g$, about 2,000 $m^2/g$ to about 2,500 $m^2/g$, about 2,000 $m^2/g$ to about 3,000 $m^2/g$, about 2,000 $m^2/g$ to about 3,500 $m^2/g$, about 2,500 $m^2/g$ to about 3,000 $m^2/g$, about 2,500 $m^2/g$ to about 3,500 $m^2/g$, or about 3,000 $m^2/g$ to about 3,500 $m^2/g$.

In some embodiments, active material has a conductivity of at least about 750 siemens/meter (S/m). In some embodiments, active material has a conductivity of at most about 3,000 S/m. In some embodiments, active material has a conductivity of about 750 S/m to about 3,000 S/m. In some embodiments, active material has a conductivity of about 750 S/m to about 1,000 S/m, about 750 S/m to about 1,500 S/m, about 750 S/m to about 2,000 S/m, about 750 S/m to about 2,500 S/m, about 750 S/m to about 3,000 S/m, about 1,000 S/m to about 1,500 S/m, about 1,000 S/m to about 2,000 S/m, about 1,000 S/m to about 2,500 S/m, about 1,000 S/m to about 3,000 S/m, about 1,500 S/m to about 2,000 S/m, about 1,500 S/m to about 2,500 S/m, about 1,500 S/m to about 3,000 S/m, about 2,000 S/m to about 2,500 S/m, about 2,000 S/m to about 3,000 S/m, or about 2,500 S/m to about 3,000 S/m.

In some embodiments, the two or more electrodes are arranged in an array. In some embodiments, each electrode in the array is separated from a subsequent electrode by a gap.

In some embodiments, the array is a planar array. In some embodiments, the number of electrodes is at least about 2.

In some embodiments, the width of the gap at least about 10 μm. In some embodiments, the width of the gap at most about 2,000 μm. In some embodiments, the width of the gap about from 10 μm to about 2,000 μm. In some embodiments, the width of the gap about 10 μm to about 25 μm, about 10 μm to about 50 μm, about 10 μm to about 100 μm, about 10 μm to about 500 μm, about 10 μm to about 1,000 μm, about 10 μm to about 1,500 μm, about 10 μm to about 2,000 μm, about 25 μm to about 50 μm, about 25 μm to about 100 μm, about 25 μm to about 500 μm, about 25 μm to about 1,000 μm, about 25 μm to about 1,500 μm, about 25 μm to about 2,000 μm, about 50 μm to about 100 μm, about 50 μm to about 500 μm, about 50 μm to about 1,000 μm, about 50 μm to about 1,500 μm, about 50 μm to about 2,000 μm, about 100 μm to about 500 μm, about 100 μm to about 1,000 μm, about 100 μm to about 1,500 μm, about 100 μm to about 2,000 μm, about 500 μm to about 1,000 μm, about 500 μm to about 1,500 μm, about 500 μm to about 2,000 μm, about 1,000 μm to about 1,500 μm, about 1,000 μm to about 2,000 μm, or about 1,500 μm to about 2,000 μm.

In some embodiments, the supercapacitor device further comprises an electrolyte. In some embodiments, the electrolyte is a liquid, a solid, a gel, or any combination thereof. In some embodiments, the electrolyte comprises a polymer, silica, 1-butyl-3-methylimidazolium bis(trifluoromethylsulfonyl)imide, phosphoric acid, tetraethyl ammonium tetrafluoroborate ($TEABF_4$), acetonitrile, 1-ethyl-3-methylimidazoliumtetrafluoroborate, ethanolammonium nitrate, a dicarboxylate, a prostaglandin, adenosine monophosphate, guanosine monophosphate, a p-aminohippurate, polysiloxane, polyphosphazene, potassium hydroxide, polyvinyl alcohol or any combination thereof. In some embodiments, the silica is fumed silica. In some embodiments, the silica is fumed silica and/or is in the form of a nano-powder.

In some embodiments, the electrolyte is aqueous and wherein the number of electrodes is about 5. In this embodiment, the produced voltage potential across the array of electrodes is at least about 2.5 volts (V). In some embodiments, produced voltage potential across the array of electrodes is at most about 10 V. In some embodiments, produced voltage potential across the array of electrodes is about 2.5 V to about 10 V. In some embodiments, produced voltage potential across the array of electrodes is about 2.5 V to about 3 V, about 2.5 V to about 4 V, about 2.5 V to about 5 V, about 2.5 V to about 6 V, about 2.5 V to about 8 V, about 2.5 V to about 10 V, about 3 V to about 4 V, about 3 V to about 5 V, about 3 V to about 6 V, about 3 V to about 8 V, about 3 V to about 10 V, about 4 V to about 5 V, about 4 V to about 6 V, about 4 V to about 8 V, about 4 V to about 10 V, about 5 V to about 6 V, about 5 V to about 8 V, about 5 V to about 10 V, about 6 V to about 8 V, about 6 V to about 10 V, or about 8 V to about 10 V.

In some embodiments, the electrolyte comprises tetraethyl ammonium tetrafluoroborate ($TEABF_4$) in acetonitrile and wherein the number of electrodes is about 5. In this embodiment, the produced voltage potential across the array of electrodes is at least about 6 V. In some embodiments, produced voltage potential across the array of electrodes is at most about 24 V. In some embodiments, produced voltage potential across the array of electrodes is about 6 V to about 24 V. In some embodiments, produced voltage potential across the array of electrodes is about 6 V to about 8 V, about 6 V to about 10 V, about 6 V to about 12 V, about 6 V to about 14 V, about 6 V to about 16 V, about 6 V to about 18 V, about 6 V to about 20 V, about 6 V to about 22 V, about 6 V to about 24 V, about 8 V to about 10 V, about 8 V to about 12 V, about 8 V to about 14 V, about 8 V to about 16 V, about 8 V to about 18 V, about 8 V to about 20 V, about 8 V to about 22 V, about 8 V to about 24 V, about 10 V to about 12 V, about 10 V to about 14 V, about 10 V to about 16 V, about 10 V to about 18 V, about 10 V to about 20 V, about 10 V to about 22 V, about 10 V to about 24 V, about 12 V to about 14 V, about 12 V to about 16 V, about 12 V to about 18 V, about 12 V to about 20 V, about 12 V to about 22 V, about 12 V to about 24 V, about 14 V to about 16 V, about 14 V to about 18 V, about 14 V to about 20 V, about 14 V to about 22 V, about 14 V to about 24 V, about 16 V to about 18 V, about 16 V to about 20 V, about 16 V to about 22 V, about 16 V to about 24 V, about 18 V to about 20 V, about 18 V to about 22 V, about 18 V to about 24 V, about 20 V to about 22 V, about 20 V to about 24 V, or about 22 V to about 24 V.

In some embodiments, the electrolyte is aqueous and wherein the number of electrodes is about 180. In this embodiment, the produced voltage potential across the array of electrodes is at least about 100 V. In some embodiments, produced voltage potential across the array of electrodes is at most about 360 V. In some embodiments, produced voltage potential across the array of electrodes is about 100 V to about 360 V. In some embodiments, produced voltage potential across the array of electrodes is about 100 V to about 150 V, about 100 V to about 200 V, about 100 V to about 250 V, about 100 V to about 300 V, about 100 V to about 360 V, about 150 V to about 200 V, about 150 V to about 250 V, about 150 V to about 300 V, about 150 V to about 360 V, about 200 V to about 250 V, about 200 V to about 300 V, about 200 V to about 360 V, about 250 V to about 300 V, about 250 V to about 360 V, or about 300 V to about 360 V.

In some embodiments, the electrolyte comprises tetraethyl ammonium tetrafluoroborate ($TEABF_4$) in acetonitrile and wherein the number of electrodes is about 72. In this embodiment, the produced voltage potential across the array of electrodes is at least about 100 V. In some embodiments, produced voltage potential across the array of electrodes is at most about 360 V. In some embodiments, produced voltage potential across the array of electrodes is about 100 V to about 360 V. In some embodiments, produced voltage potential across the array of electrodes is about 100 V to about 150 V, about 100 V to about 200 V, about 100 V to about 250 V, about 100 V to about 300 V, about 100 V to about 360 V, about 150 V to about 200 V, about 150 V to about 250 V, about 150 V to about 300 V, about 150 V to about 360 V, about 200 V to about 250 V, about 200 V to about 300 V, about 200 V to about 360 V, about 250 V to about 300 V, about 250 V to about 360 V, or about 300 V to about 360 V.

In some embodiments, the array of electrodes is a stacked array of electrodes. In some embodiments, the stacked array of electrodes comprises a plurality of electrodes.

In some embodiments, an electrode is a single-sided electrode, wherein a first surface of the current collector contains an active material. In some embodiments, an electrode is a double-sided electrode, wherein a first and an, opposing, second surface of the current collector contain an active material.

In some embodiments, the supercapacitor comprises an active material on a second surface of the current collector. In some embodiments, a portion the first surface of the current collector is not covered by an active material. In some embodiments, a portion of the second surface of the current collector is not covered by an active material.

In some embodiments, a distal electrode in the stacked array comprises a single-sided electrode. In some embodiments, the first surface of a distal electrode's current collector faces inwards. In some embodiments, a double-sided electrode is placed between two single-sided electrodes. In some embodiments, the number of double-active-sided electrodes in the stacked array is at least about 1.

In some embodiments, a separator positioned between each pair of adjacent electrodes. In some embodiments, the separator is comprised of cotton, cellulose, nylon, polyesters, glass, polyethylene, polypropylene, polytetrafluoroethylene, polyvinyl chloride, polyvinylidene fluoride, plastic, ceramics, rubber, asbestos, wood or any combination thereof.

In some embodiments, the stacked array further comprises a support that may be positioned between the first faces of a pair of adjacent single-active-sided electrodes. In some embodiments, the support is comprised of steel, stainless steel, aluminum, wood, glass, plastic, carbon fiber, fiberglass, metal or any combination thereof.

A second aspect provided herein is a method of fabricating a supercapacitor comprising: fabricating an array of electrodes comprising: covering a portion of the first surface of a current collector; applying an active material onto the first surface of the current collector; and drying the active material on the current collector.

In some embodiments the second aspect further comprises covering a portion of the second surface of the current collector; applying an active material onto the second surface of the current collector; and drying the active material on the current collector.

In some embodiments, at least one or more of a tape and a mask, shields a portion of the substrate to thereby prevent application of an active material onto the shielded portion of the substrate.

In some embodiments, the current collector comprises a metal film or a polymeric film or any combination thereof. In some embodiments, the metal film comprises silver, copper, gold, aluminum, calcium, tungsten, zinc, brass, bronze, nickel, lithium, iron, platinum, tin, carbon steel, lead, titanium, stainless steel, mercury, chromium, gallium arsenide or any combination thereof. In some embodiments, the polymeric film comprises polyfluorene, polyphenylene, polypyrene, polyazulene, polynaphthalene, polyacetylene, poly p-phenylene vinylene, polypyrrole, polycarbazole, polyindole, polyazepinem, polyaniline, polythiophene, poly 3,4-ethylenedioxythiophene, poly p-phenylene sulfide, polyacetylene, poly p-phenylene vinylene or any combination thereof.

In some embodiments, thickness of the current collector is at least about 50 nm. In some embodiments, thickness of the current collector is at most about 200 nm. In some embodiments, thickness of the current collector is about 50 nm to about 200 nm. In some embodiments, thickness of the current collector is about 50 nm to about 75 nm, about 50 nm to about 100 nm, about 50 nm to about 125 nm, about 50 nm to about 150 nm, about 50 nm to about 175 nm, about 50 nm to about 200 nm, about 75 nm to about 100 nm, about 75 nm to about 125 nm, about 75 nm to about 150 nm, about 75 nm to about 175 nm, about 75 nm to about 200 nm, about 100 nm to about 125 nm, about 100 nm to about 150 nm, about 100 nm to about 175 nm, about 100 nm to about 200 nm, about 125 nm to about 150 nm, about 125 nm to about 175 nm, about 125 nm to about 200 nm, about 150 nm to about 175 nm, about 150 nm to about 200 nm, or about 175 nm to about 200 nm.

Some embodiments further comprise a step of adhering the current collector to a substrate. In some embodiments, the substrate comprises wood, glass, plastic, carbon fiber, fiberglass, metal or any combination thereof.

In some embodiments, the current collector is partially covered by a tape or a mask. In some embodiments, the tape comprises Kapton tape double-active-sided electrode tape, duct tape, electrical tape, filament tape, gaffer tape, gorilla tape, masking tape, Scotch tape, surgical tape, Teflon tape or any combination thereof.

In some embodiments, the active material is in the form of a slurry. In some embodiments, the slurry is applied to the substrate by a doctor blade. In some embodiments, the processes of applying an active material onto the first surface of the current collector and applying an active material onto the second surface of the current collector are performed simultaneously.

In some embodiments, the drying of the active material on the current collector occurs at a temperature of at least about 40° C. In some embodiments, the drying of the active material on the current collector occurs at a temperature of at most about 160° C. In some embodiments, the drying of the active material on the current collector occurs at a temperature of about 40° C. to about 160° C. In some embodiments, the drying of the active material on the current collector occurs at a temperature of about 40° C. to about 60° C., about 40° C. to about 80° C., about 40° C. to about 100° C., about 40° C. to about 120° C., about 40° C. to about 140° C., about 40° C. to about 160° C., about 60° C. to about 80° C., about 60° C. to about 100° C., about 60° C. to about 120° C., about 60° C. to about 140° C., about 60° C. to about 160° C., about 80° C. to about 100° C., about 80° C. to about 120° C., about 80° C. to about 140° C., about 80° C. to about 160° C., about 100° C. to about 120° C., about 100° C. to about 140° C., about 100° C. to about 160° C., about 120° C. to about 140° C., about 120° C. to about 160° C., or about 140° C. to about 160° C.

In some embodiments, the drying of the active material on the current collector occurs over a period of time of at least about 6 hours. In some embodiments, the drying of the active material on the current collector occurs over a period of time of at most about 24 hours. In some embodiments, the drying of the active material on the current collector occurs over a period of time of about 6 hours to about 24 hours. In some embodiments, the drying of the active material on the current collector occurs over a period of time of about 6 hours to about 8 hours, about 6 hours to about 10 hours, about 6 hours to about 12 hours, about 6 hours to about 16 hours, about 6 hours to about 20 hours, about 6 hours to about 24 hours, about 8 hours to about 10 hours, about 8 hours to about 12 hours, about 8 hours to about 16 hours, about 8 hours to about 20 hours, about 8 hours to about 24 hours, about 10 hours to about 12 hours, about 10 hours to about 16 hours, about 10 hours to about 20 hours, about 10 hours to about 24 hours, about 12 hours to about 16 hours, about 12 hours to about 20 hours, about 12 hours to about 24 hours, about 16 hours to about 20 hours, about 16 hours to about 24 hours, or about 20 hours to about 24 hours.

In some embodiments the second aspect further comprises a step of forming an array of two or more electrodes, wherein each electrode is separated from a subsequent electrode by a gap. In some embodiments, the array is planar array, and wherein the planar array comprises a single-active-sided electrode, a double-active-sided electrode or any combination thereof. In some embodiments, the planar array is fabricated by etching or cutting the active material and the current collector. In some embodiments, the process of etching or cutting the active material on the current collector and the current collector is performed by a laser, a knife, a blade, scissors or any combination thereof.

In some embodiments, the width of the gap at least about 10 µm. In some embodiments, the width of the gap at most about 2,000 µm. In some embodiments, the width of the gap about from 10 µm to about 2,000 µm. In some embodiments, the width of the gap about 10 µm to about 25 µm, about 10 µm to about 50 µm, about 10 µm to about 100 µm, about 10 µm to about 500 µm, about 10 µm to about 1,000 µm, about 10 µm to about 1,500 µm, about 10 µm to about 2,000 µm, about 25 µm to about 50 µm, about 25 µm to about 100 µm, about 25 µm to about 500 µm, about 25 µm to about 1,000 µm, about 25 µm to about 1,500 µm, about 25 µm to about 2,000 µm, about 50 µm to about 100 µm, about 50 µm to about 500 µm, about 50 µm to about 1,000 µm, about 50 µm to about 1,500 µm, about 50 µm to about 2,000 µm, about 100 µm to about 500 µm, about 100 µm to about 1,000 µm, about 100 µm to about 1,500 µm, about 100 µm to about 2,000 µm, about 500 µm to about 1,000 µm, about 500 µm to about 1,500 µm, about 500 µm to about 2,000 µm, about 1,000 µm to about 1,500 µm, about 1,000 µm to about 2,000 µm, or about 1,500 µm to about 2,000 µm.

In some embodiments the second aspect further comprises dispersing an electrolyte onto an electrode. In some embodiments, the electrolyte is a liquid, a solid, a gel, or any combination thereof. In some embodiments, the electrolyte comprises a polymer, silica, 1-butyl-3-methylimidazolium bis(trifluoromethylsulfonyl)imide, phosphoric acid, tetraethyl ammonium tetrafluoroborate, acetonitrile, 1-ethyl-3-methylimidazoliumtetrafluoroborate, ethanolammonium nitrate, a dicarboxylate, a prostaglandin, adenosine monophosphate, guanosine monophosphate, a p-aminohippurate, polysiloxane, polyphosphazene or any combination thereof. In some embodiments, the silica is fumed. In some embodiments, the silica is fumed and/or is in the form of a nano-powder.

In some embodiments, the array is a stacked array. In some embodiments, the stacked array comprises a plurality of electrodes. In some embodiments, the distal electrodes in the stacked array have an active material only on the first surface of the current collector, and wherein the first surface of the current collector faces inwards. In some embodiments, the stacked array comprises one or more electrodes which have an active material on both a first and a second surface of its current collector, wherein the one or more electrodes which have an active material on both a first and a second surface of its current collector may be positioned between the single-active-sided electrodes.

In some embodiments, a separator positioned between each pair of consecutive electrodes. In some embodiments, the separator is comprised of cotton, cellulose, nylon, polyesters, glass, polyethylene, polypropylene, polytetrafluoroethylene, polyvinyl chloride, polyvinylidene fluoride, plastic, ceramics, rubber, asbestos, wood or any combination thereof.

In some embodiments, the stacked array further comprises a support positioned between an electrode and a subsequent electrode. In some embodiments, the support is comprised of steel, stainless steel, aluminum, wood, glass, plastic, carbon fiber, fiberglass, metal or any combination thereof.

In some embodiments the second aspect further comprises: dispersing an electrolyte on the stacked array; encasing the stacked array in a sheath; inserting the encased stacked array into a housing; or any combination thereof.

In some embodiments, the electrolyte is a liquid, a solid, a gel, or any combination thereof. In some embodiments, the electrolyte comprises a polymer, silica, 1-butyl-3-methylimidazolium bis(trifluoromethylsulfonyl)imide, phosphoric acid, tetraethyl ammonium tetrafluoroborate, acetonitrile, 1-ethyl-3-methylimidazoliumtetrafluoroborate, ethanolammonium nitrate, a dicarboxylate, a prostaglandin, adenosine monophosphate, guanosine monophosphate, a p-aminohippurate, polysiloxane, polyphosphazene or any combination thereof. In some embodiments, the silica is fumed. In some embodiments, the silica is fumed and/or is in the form of a nano-powder.

In some embodiments, the housing comprises: two or more terminals; a gasket; a container; or any combination thereof.

Other goals and advantages of the disclosure will be further appreciated and understood when considered in conjunction with the following description and accompanying drawings. While the following description may contain specific details describing particular embodiments of the disclosure, this should not be construed as limitations to the scope of the disclosure but rather as an exemplification of preferable embodiments. For each aspect of the disclosure, many variations are possible as suggested herein that are known to those of ordinary skill in the art. A variety of changes and modifications may be made within the scope of the disclosure without departing from the spirit thereof Supercapacitors Supercapacitors (also known as "ultracapacitors"), are high power density energy storage devices, with a much higher capacitance than normal capacitors, that have recently attracted considerable attention, and have been increasingly employed as high power density energy storage resources in portable electronic devices, medical devices and hybrid electric vehicles due to recent technological advancements.

Supercapacitors are attractive means of energy storage because they may exhibit ultrafast charge and discharge times on the order of seconds compared with hours for conventional batteries. Additionally, supercapacitors may play an important role in the progress of hybrid and electric vehicles, consumer electronics, and military and space applications. Current supercapacitors, however, often require multiple cells packaged either in series, in parallel, or in combinations thereof in order to meet energy and power requirements of portable electronics.

In some embodiments, supercapacitors or electrochemical capacitors are comprised of two or more electrodes separated by an ion-permeable membrane (separator), and an electrolyte ionically connecting the electrodes, whereas ions in the electrolyte form electric double layers of opposite polarity to the electrode's polarity when the electrodes are polarized by an applied voltage.

Supercapacitors may be classified according to their charge storage mechanism as either electric double-layer capacitors (EDLCs) or redox supercapacitors. In some embodiments, a supercapacitor may be a double-layer supercapacitor, pseudocapacitor or a hybrid supercapacitor.

High-voltage devices ("devices") of the disclosure may comprise interconnected cells, whereas each cell comprises two or more electrodes separated by a gap distance. In some embodiments, the cells may be electrochemical cells (e.g., individual supercapacitor cells). Two or more cells may be interconnected, for example, to achieve a high voltage (and/or for other purposes).

In some embodiments, a supercapacitor may be formed with a stacked (or sandwich) structure. In some embodiments, a stacked structure is comprised of two or more thin-film electrodes assembled face-to-face, which are separated by a separator that prevents electrical shorting.

In some embodiments, a supercapacitor may be formed with a planar structure. In some embodiments, a planar supercapacitor is comprised of electrodes designed in a planar configuration. Planar supercapacitors may have several advantages over the stacked design. First, a supercapacitor with electrodes in the same plane may be compatible with on-chip integration. Second, the traveling distance of the ions in the electrolyte, a major performance factor in supercapacitors, may be well controlled and shortened while eliminating the necessity of the separator required in stacked supercapacitors. Third, the structure may be extended to three dimensions, to increase its density while maintaining the mean ionic diffusion path. This architecture thus may have the potential to achieve high power densities and at high energy densities. Additionally, in some embodiments, in-plane devices may exhibit a simple structure of several cells which may be assembled in one step. In some embodiments, fabricated planar arrays of cells may be packaged using one package.

Electrode

In some embodiments, an electrode in an electrochemical cell comprises a current collector and an active material, and is referred to as either an anode, whereas electrons leave the active material within a cell and oxidation occurs, or as a cathode, whereas the electrons enter the active material within a cell and reduction occurs. Each electrode may become either the anode or the cathode depending on the direction of current through the cell.

In some embodiments, a single-sided electrode is comprised of a current collector and an active material whereas the active material is disposed on only one face of the current collector.

In some embodiments, a double-sided electrode is comprised of a current collector and an active material whereas the active material is disposed on both opposing faces of the current collector.

In some embodiments, a double-sided electrode disposed between, and separated by a gap from, two single-sided electrodes, whose active material faces inwards, forms a two-celled supercapacitor.

Materials commonly employed in supercapacitor electrodes include transition-metal oxides, conducting polymers, and high-surface carbons.

Current Collector

In some embodiments, a current collector connects the electrodes to a capacitor's terminals. In some embodiments, a current collector is a foil or a coating that is conductive, chemically stable, and corrosion resistant. In some embodiments, a current collector may be comprised of silver, copper, gold, aluminum, calcium, tungsten, zinc, tungsten, brass, bronze, nickel, lithium, iron, platinum, tin, carbon steel, lead, titanium, stainless steel, mercury, chromium, gallium arsenide, polyimide, polyfluorene, polyphenylene, polypyrene, polyazulene, polynaphthalene, polyacetylene, poly p-phenylene vinylene, polypyrrole, polycarbazole, polyindole, polyazepinem, polyaniline, polythiophene, poly 3,4-ethylenedioxythiophene, poly p-phenylene sulfide, polyacetylene, poly p-phenylene vinylene or any combination thereof.

In some embodiments, the thickness of the current collector is about 50 nanometers to about 200 nanometers.

Active Material

In some embodiments, an active material is the component within an electrode that participates in the electrochemical charge and discharge reaction, and may comprise carbonaceous and/or other suitable materials. In some embodiments, the active material comprises carbon, activated carbon, carbon cloth, carbon fiber, amorphous carbon, glassy carbon, carbon nanofoam, carbon aerogel, graphene, polyaniline, polythiophene, interconnected corrugated carbon-based network (ICCN) or any combination thereof.

In some embodiments, ICCN comprises a plurality of expanded and interconnected carbon layers. In some embodiments, each carbon layer is a two-dimensional, one atom thick sheet of carbon. In some embodiments, one or more of the expanded and interconnected carbon layers comprise a one atom thick corrugated carbon sheet. An ICCN may exhibit a high surface area and a high electrical conductivity.

In certain embodiments, the term "expanded," refers to a plurality of carbon layers that are expanded apart from one another, whereas a portion of adjacent carbon layers are separated by at least about 2 nanometers (nm). In some embodiments, at least a portion of adjacent carbon layers are separated by a gap of greater than or equal to about 1 nm.

In some embodiments, a plurality of carbon layers has an electrical conductivity of at least about 750 siemens/meter (S/m). In some embodiments, a plurality of carbon layers has an electrical conductivity of at most about 3,000 S/m. In some embodiments, a plurality of carbon layers has an electrical conductivity of about 750 S/m to about 3,000 S/m.

In some embodiments, a plurality of carbon layers has a surface density of at least about 250 meters squared per gram ($m^2/g$). In some embodiments, a plurality of carbon layers has a surface density of at most about 3,500 $m^2/g$. In some embodiments, a plurality of carbon layers has a surface density of from about 250 $m^2/g$ to about 3,500 $m^2/g$.

Electrolyte

In some embodiments, an electrolyte is a substance that produces an electrically conducting solution when dissolved in a polar solvent. In some embodiments, if an electric potential is applied to such a solution, the cations of the solution are drawn to the electrode that has an abundance of electrons, while the anions are drawn to the electrode that has a deficiency of electrons. The movement of anions and cations in opposite directions within the solution draws a current.

In some embodiments, electrolytes may be comprised of an aqueous electrolyte, an organic electrolyte, an ionic liquid-based electrolyte, or any combination thereof. In some embodiments, an electrolyte may be liquid, solid or a gel (ionogel). In some embodiments, an ionic liquid may be hybridized with another solid component such as for example, polymer, silica or fumed silica to form a gel-like electrolyte. In some embodiments, an aqueous electrolyte may be hybridized with, for example, a polymer, to form a gel-like electrolyte (also "hydrogel" or "hydrogel-polymer"). In some embodiments, an organic electrolyte may be hybridized with, for example, a polymer, to form a gel-like electrolyte. In some embodiments, the electrolyte is comprised of aqueous potassium hydroxide, a hydrogel comprising poly(vinyl alcohol) (PVA)-$H_2SO_4$ or PVA-$H_3PO_4$, an aqueous solution of phosphoric acid ($H_3PO_4$), tetraethyl ammonium tetrafluoroborate ($TEABF_4$) dissolved in acetonitrile, 1-ethyl-3-methylimidazoliumtetrafluoroborate ($EMIMBF_4$), an ionogel comprising fumed silica (e.g., fumed silica nano-powder) mixed with an ionic liquid (e.g., 1-butyl-3-methylimidazolium bis(trifluoromethylsulfonyl) imide ($BMIMNTf_2$)), or any combination thereof.

Separator

In some embodiments, a separator is a permeable membrane placed between a battery's or supercapacitor's anode and cathode electrodes. In some embodiments, a separator maintains a gap distance between two adjacent electrodes to prevent electrical short circuits while also allowing the transport of ionic charge carriers that are needed to close the circuit during the passage of current in an electrochemical cell. In some embodiments, a separator absorbs an electrolyte to increase conductivity between the electrodes.

A separator may be a critical component in a liquid electrolyte energy storage device because its structure and properties considerably affect an energy storage device's performance characteristics such as its energy and power density, cycle life, and safety. In some embodiments, a separator is comprised of a polymeric membrane that forms a chemically and electrochemically stable microporous layer, with regard to the electrolyte and electrode materials, and exhibits sufficient mechanical strength to withstand battery construction and use. In some embodiments, a separator comprises a single layer/sheet or multiple layers/sheets of material. In some embodiments, a separator comprises a nonwoven fiber comprising a web or mat of directionally or randomly oriented fibers, supported liquid membranes comprising solid and liquid materials within a microporous structure, a polymer, or any combination thereof.

In some embodiments, a separator is placed between two electrode's active material surfaces.

In some embodiments, polymer electrolytes form complexes with alkali metal salts, which produce ionic conductors that serve as solid electrolytes. In some embodiments, a solid ion conductor may serve as both a separator and the electrolyte.

In some embodiments, separators are comprised of cotton, cellulose, nylon, polyesters, glass, polyethylene, polypropylene, polytetrafluoroethylene, polyvinyl chloride, polyvinylidene fluoride, plastic, ceramics, rubber, asbestos, wood or any combination thereof.

Support

In some embodiments, a support is a conductive material placed between supercapacitor electrodes that increases the rigidity of the supercapacitor device. In some embodiments, a support is placed between two electrodes in contact with each of their current collector's surfaces without an active material coating.

In some embodiments, the support is composed of any conducting material comprising scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury or any combination thereof.

Seal

In some embodiments, a seal is used to prevent an electrolyte from leaking out a supercapacitor cell and potentially cause short circuit. Additionally, a seal may increase the rigidity and durability of a stacked supercapacitor device by constraining one or more of the supercapacitor's cells. In some embodiments, the seal may be formed of a chemical resistant and waterproof material that does not degrade upon contact with the electrolyte. In some embodiments, the seal is comprised of glue, epoxy, resin, tubing, plastic, fiberglass, glass or any combination thereof.

Housing

In some embodiments, the components of a supercapacitor device are stored within a housing to increase durability and prevent electrolyte leakage. In some embodiments, the housing comprises a preformed component, a component formed around the supercapacitor components or any combination thereof. In some embodiments, the housing acts as the negative or positive terminal. In some embodiments, the housing of a supercapacitor device is comprised of metal, plastic, wood, carbon fiber, fiberglass, glass or any combination thereof.

In some embodiments, the housing of a supercapacitor device additionally comprises a tab, a terminal, a gasket or any combination thereof. In some embodiments, a tab transmits electricity from the sealed electrodes to the positive terminal or the negative terminal. In some embodiments, the positive terminal or the negative terminal connect the sealed electrodes to an electronic device which consumes the energy stored therein. In some embodiments, the tabs and terminals may be composed of any conducting material comprising scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury or any combination thereof. In some embodiments, the tabs and terminals may be composed of a polymer containing traces of a conducting material. In some embodiments, the gasket is comprised of water resistant material including plastics, metals, resins or any combination thereof.

REFERENCES TO THE FIGURES

Exemplary illustrations of high-voltage supercapacitor devices are shown in FIGS. 1A-1D. An exemplary single-cell linear supercapacitor device 100, per FIG. 1A, comprises two wires 103, and an array of two electrodes 110, whereas each electrode 110 comprises a current collector 101, and an active material 102. A single supercapacitor cell is defined by a pair of electrodes 110 separated by a dielectric gap.

Figure 1B:
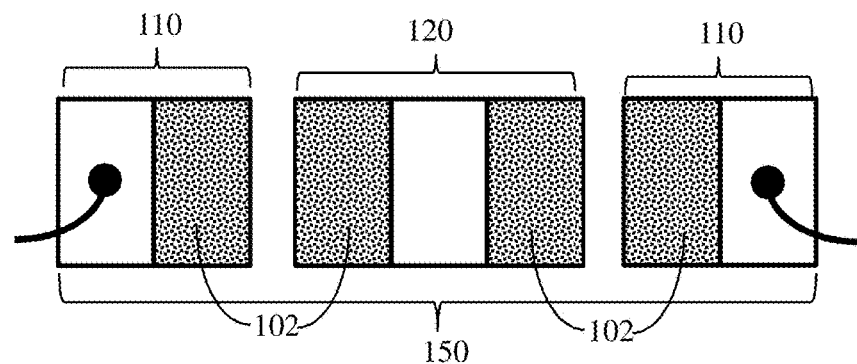
Figure 1C:
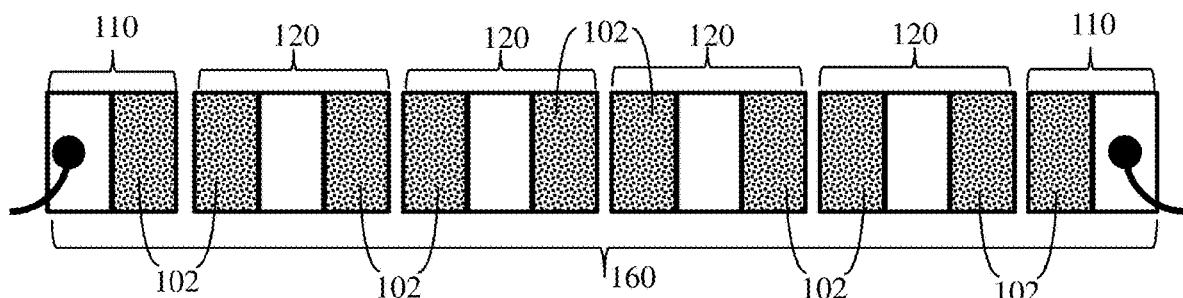

FIG. 1B displays an exemplary 2-cell linear supercapacitor device 150 comprising a linear array of one isobilateral electrode 120 and two anisobilateral electrodes 110, whereas the isobilateral electrode 120 contains one portion of its current collector that is covered by the active material 102, and wherein the anisobilateral electrode 110 contains two distal portions of its current collector that are covered by the active material 102. In some embodiments, the anisobilateral electrode 110 is arranged such that its side that is covered by the active material is aligned distally within the array. In some embodiments, the 2-cell linear supercapacitor device 150 is capable of producing twice the voltage as a single-cell supercapacitor device 100. FIG. 1C displays an exemplary 5-cell linear supercapacitor device 160 comprising a linear array of four isobilateral electrodes 120 and two anisobilateral electrodes 110. In some embodiments, the 5-cell linear supercapacitor device 160 is capable of producing five times the voltage as a single-cell supercapacitor device 100.

Per FIGS. 1B and 1C, the distal electrodes in the array comprise anisobilateral electrodes 110, whereas the 1 or 4 proximal electrodes comprise isobilateral electrodes 120, respectively. Additionally, each pair of consecutive electrodes is separated by a set gap distance which acts as an insulating layer (or dielectric separator).

Figure 1D:
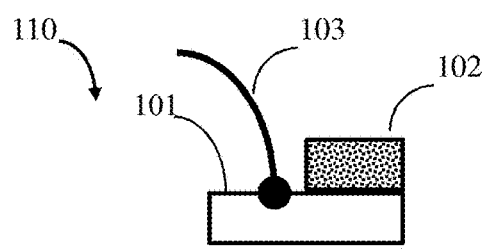

As seen, in FIGS. 1B-1D, a portion of the current collectors 101 of the distal anisobilateral electrodes 110 is not covered by the active material 102, to allow for the adhesion of a wire 103, capable of electrical connection with other devices or device components such as a terminal. Additionally, per FIGS. 1B-1D, a portion of the current collectors 101 of the proximal isobilateral electrodes 120 is not covered by the active material 102, to form a boundary between cells.

Figure 2:
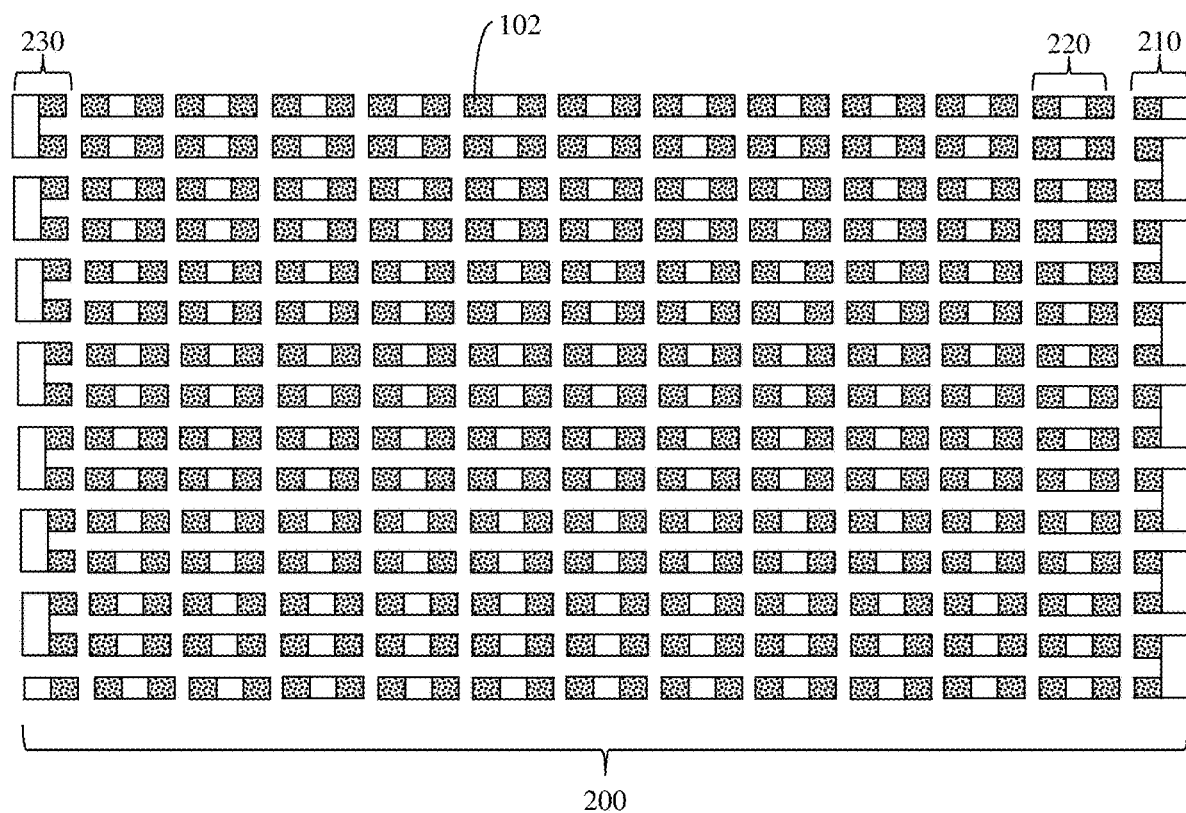
FIG. 2 shows an exemplary illustration of a supercapacitor having 180 cells.

In addition to the single-cell supercapacitor device 100 and the linear supercapacitor devices 150 160 displayed in FIGS. 1A-C, an exemplary planar supercapacitor device 200, as shown in FIG. 2, may comprise a two dimensional array of a series of 180 electrodes, wherein the first and last electrodes in the series of electrodes are anisobilateral electrodes 210, wherein the distal electrodes, that are not the first or last electrode in the series of electrodes, in each row of the two dimensional array of electrodes comprise a C-shaped isobilateral electrode 230, and wherein the proximal electrodes in each row of the two dimensional array of electrodes comprise isobilateral electrodes 220. In some embodiments, the 180-cell linear supercapacitor device 200 is capable of producing 180 times the voltage as a single-cell supercapacitor device.

In principle, there may be no limit to the number of the cells that may be arranged in two dimensional planar series. Only the voltage required for the operation of the unit may define the total number of electrodes needed for the unit.

Figure 3A:
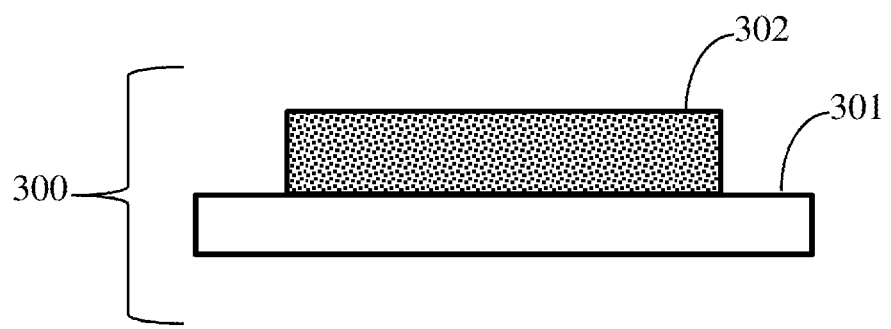
FIGS. 3A-B show exemplary illustrations of a single-sided electrode and a double-sided electrode.
Figure 3B:
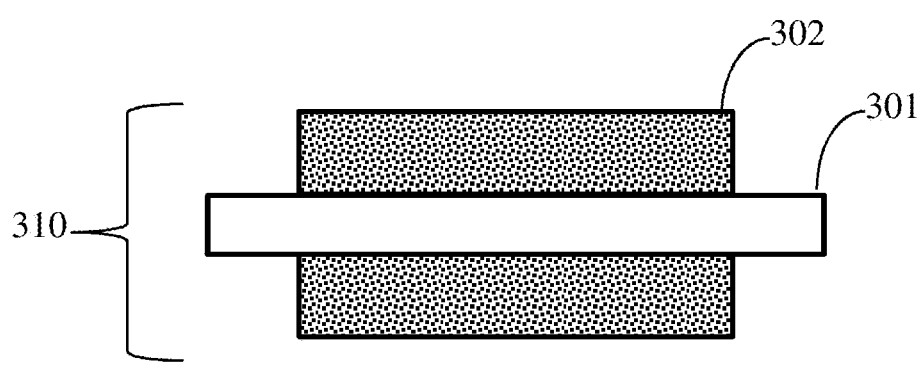

FIGS. 3A and 3B show exemplary illustrations of a single-sided electrode 300 and a double-sided electrode 310, respectively, wherein a single-sided electrode 300 is comprised of a current collector 301 with an active material 302 deposited on a first surface of the current collector 301, and wherein a double-sided electrode 310 is comprised of a current collector 301 with an active material 302 deposited on both a first and on the opposing, second surface, of the current collector 301.

In some embodiments, the anisobilateral electrodes 110 210, isobilateral electrodes 120 220, or the C-shaped isobilateral electrodes 230, shown in the exemplary supercapacitor devices 100 200 in FIGS. 1-2 may comprise a single-sided electrode 300 or a double-sided electrode 310 or any combination thereof.

Figure 4A:
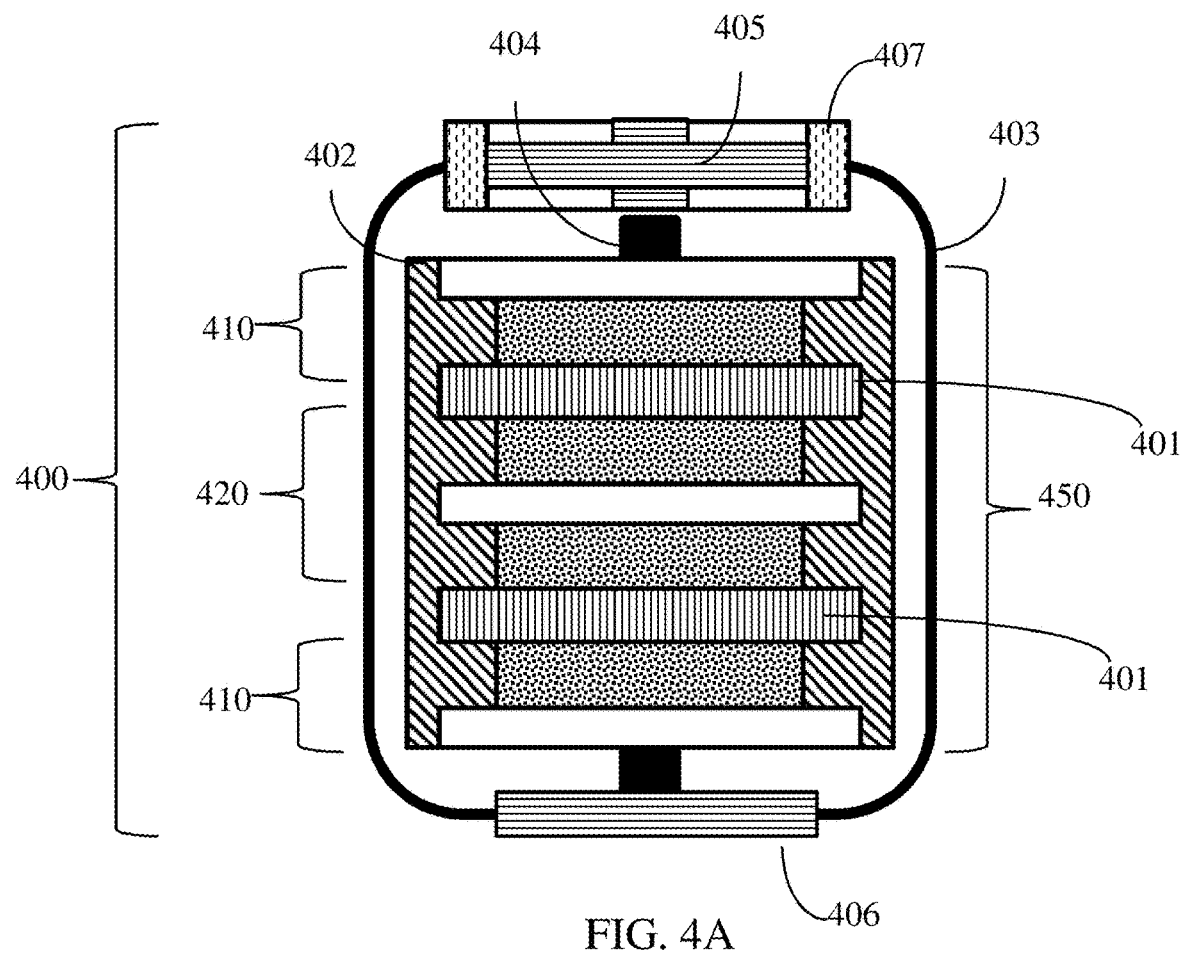
FIGS. 4A-B show exemplary front and top cross-sectional illustrations of an assembled supercapacitor.
Figure 4B:
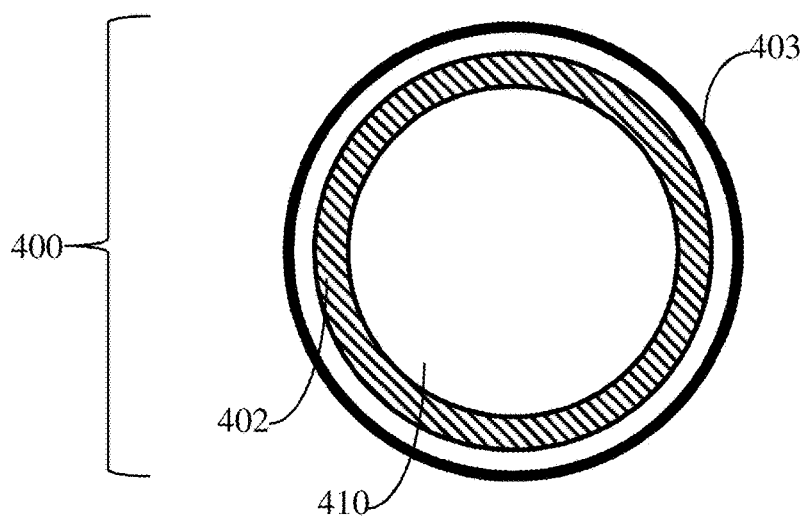

In some embodiments, stacked arrays of cells may be assembled into a single package. FIGS. 4A-B show exemplary front and top cross-sectional illustrations of a first preferred mode of a stacked supercapacitor device assembly 400 comprising an electrode stack 450, a housing 403, a tab 404, a positive terminal 405, a negative terminal 406, and a gasket 407, wherein the electrode stack 450 comprises two single-sided electrodes 410, one or more double-sided electrodes 420, one or more separators 401, and a seal 402. In some embodiments, the distal electrodes in the electrode stack 450 are single-sided electrodes 410, wherein the surface of each single-sided electrode 410 without the active material faces outwards.

In some embodiments, a separator 401 is inserted between each electrode to provide an insulating layer and prevent a short circuit. In some embodiments, an electrolyte is deposited onto each single-sided electrode 410 and double-sided electrode 420, wherein the seal 402 prevents electrolyte leakage and potential short circuit. In some embodiments, the electrode stack 450 is protected by a housing 403. In some embodiments, the housing 403 contains two tabs 404 which transmit electricity from the electrode stack 450 to the positive terminal 405 or the negative terminal 406, and/or a gasket 407 which seals the contents of the housing 403.

Although the exemplary stacked supercapacitor device assembly 400 shown in FIGS. 4A-B comprises an electrode stack 450 with two single-sided electrodes 410 and one double-sided electrode 420, alternative supercapacitor device assemblies may include any number of double-sided electrodes 420.

Figure 5A:
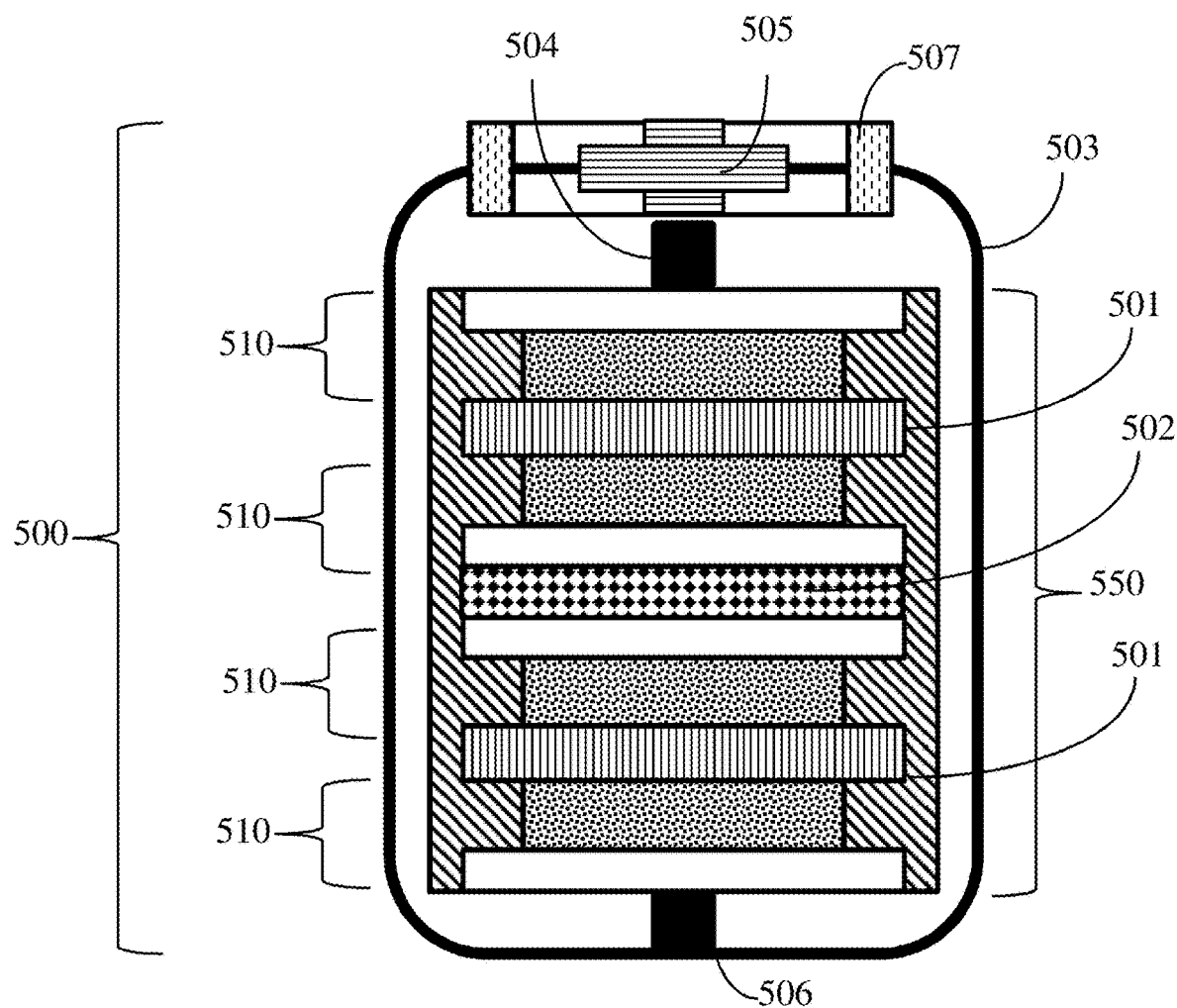
FIGS. 5A-B show an exemplary front cross-sectional illustration of an assembled supercapacitor with supports, and an exemplary illustration of a supported double-sided electrode.

FIG. 5A shows an exemplary cross-sectional illustration of a second preferred mode of a supercapacitor device assembly 500, wherein the electrode stack 550 comprises one or more single-sided electrodes 510. As shown, the first surface of each distal single-sided electrode 510 (without the active material) in the electrode stack 550 faces outwards. In some embodiments, a separator 501 is inserted between each single-sided electrode's 510 first surface, and a support 502 is inserted between each single-sided electrode's 510 second surface.

Figure 5B:
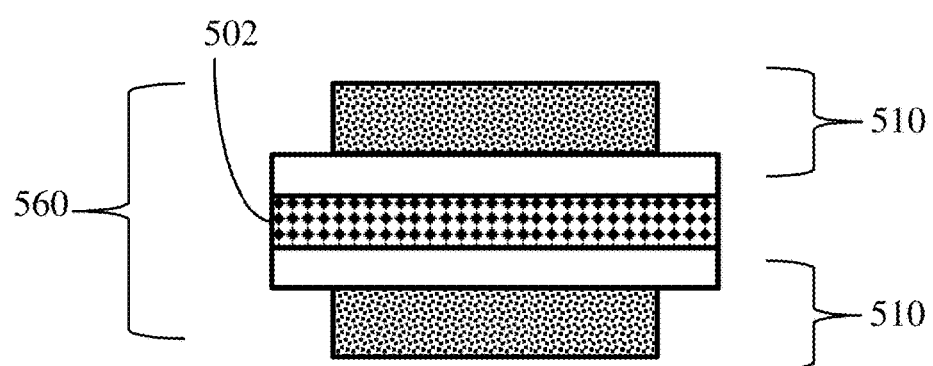

In some embodiments, per FIG. 5B, the support 502 may be adhered between two current collector's first surfaces prior to the disposing of the active material on each current collector to form a supported double-sided electrode 560.

FIGS. 6A-C show illustrations of an exemplary packaged single cell supercapacitor 600 comprising a housing 603, two single-sided electrodes 610, a separator 620, a positive terminal 605 and a gasket 607. In some embodiments, the packaged single cell supercapacitor 600 additionally comprises an electrolyte disposed on the single-sided electrodes 610.

In some embodiments, the exemplary packaged single cell supercapacitor 600 is fabricated by inserting a first single-sided electrode 610, active material faced up, into the housing 603, placing a separator 620 on the first single-sided electrode 610, placing a second single-sided electrode 610, active material faced down, atop the separator 620, inserting the positive terminal 605 and the gasket 607, crimping the housing 603 to secure the contents within, or any combination thereof.

In some embodiments, the support is comprised of any rigid, conducting and chemical resistant material such as stainless steel, plastic, metal, glass or any combination thereof.

In some embodiments, a single-sided supercapacitor electrode is fabricated by partially covering a first surface of a current collector, applying an active material onto the first surface of the current collector and drying the active material on the current collector to form a single-sided electrode.

In some embodiments, a double-sided supercapacitor electrode is fabricated by partially covering the second surface of the single-sided electrode's current collector, applying an active material onto the second surface of the single-sided electrode's current collector and drying the active material on the current collector to form a double-sided electrode. In further embodiments, a double-sided electrode may be fabricated by coating both the first and second surfaces of a current collector simultaneously and drying the active material on the current collector.

Figure 7:
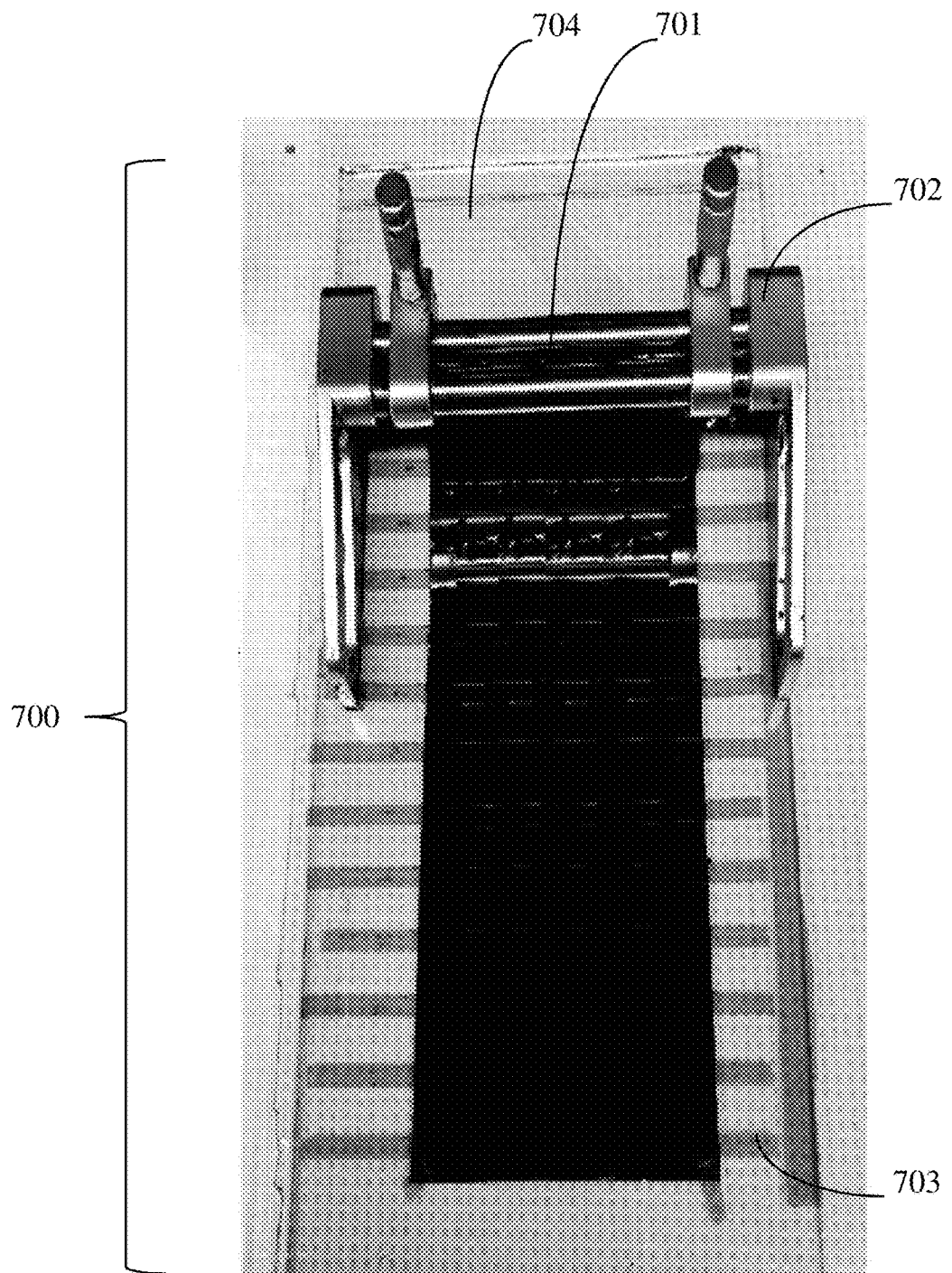
FIG. 7 shows an exemplary image of the application of an active material onto a current collector.

Images of an exemplary method of applying the active material onto a first or second surface of a current collector are shown in FIG. 7, whereas a doctor blade 702 is employed to apply a uniform thickness of an active material slurry 701 onto the current collector, and whereas a tape 703 is used to cover, and prevent the application of the active material slurry 701 onto a portion of the first and/or second surface of the current collector. In some embodiments, a doctor blade is a device which uniformly spreads a liquid or slurry onto a surface. In other embodiments, a rotogravure is employed to maintain a uniform active material thickness. In other embodiments, a mask is used to cover, and prevent the application of the active material slurry 701 onto portions of the first and/or second surface of the current collector. The resulting electrode is shown in FIG. 8.

In some embodiments, the current collector is adhered to a substrate 704, to stabilize and flatten the current collector. In the exemplary method, per FIG. 7, a tape 703 is used to both cover portions of the first surface of the current collector, and to adhere the current collector to the substrate 704. In some embodiments, the tape 703 comprises Kapton tape, polyimide, double-sided tape, duct tape, electrical tape, filament tape, gaffer tape, gorilla tape, masking tape, Scotch tape, surgical tape, Teflon tape or any combination thereof. In some embodiments, the substrate 704 comprises glass, wood, foam, carbon fiber, fiberglass, plastic, metal or any combination thereof.

Figure 8:
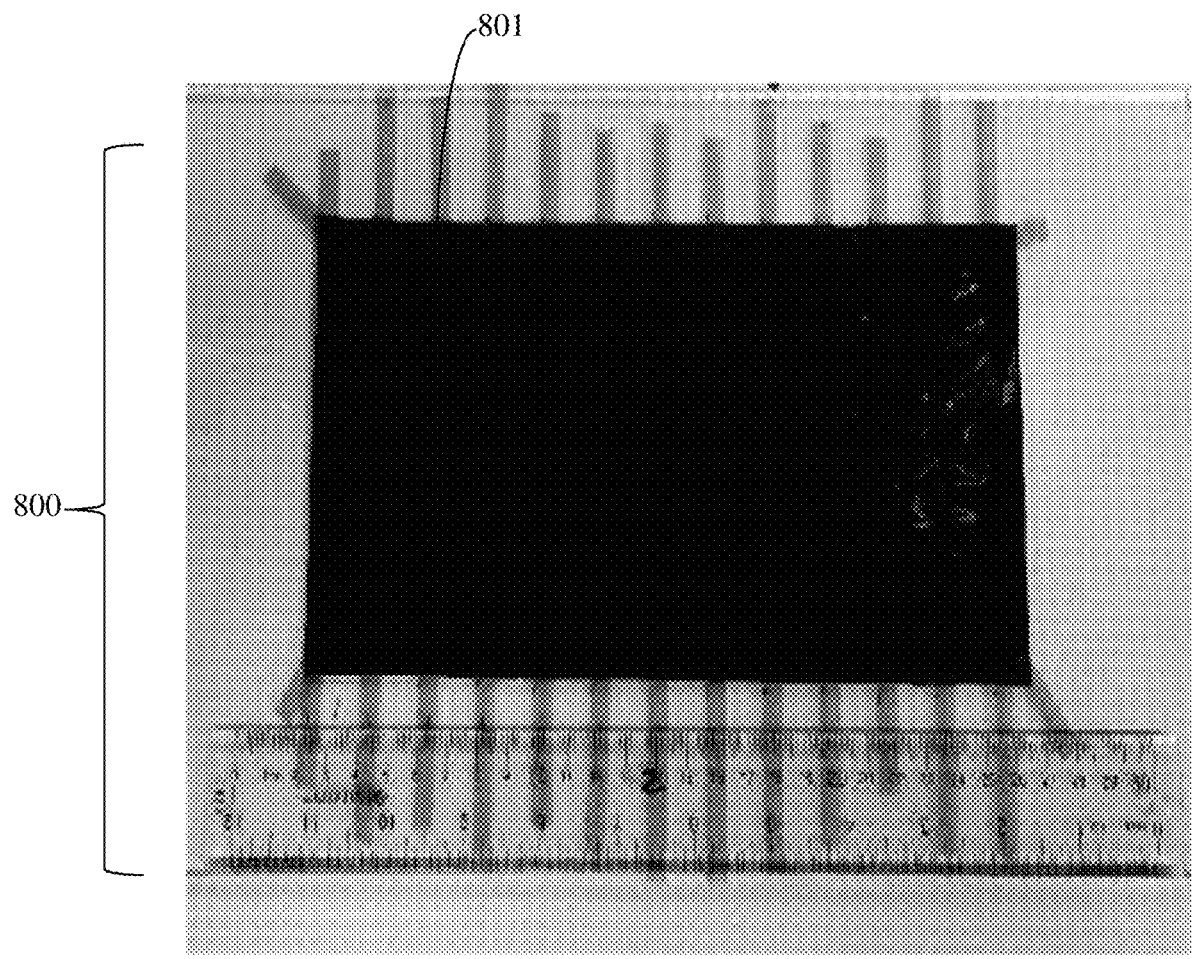
FIG. 8 shows an exemplary image of the active material applied on the current collector.

An exemplary image of the active material applied on the current collector 801, is shown in FIG. 8.

Figure 9A:
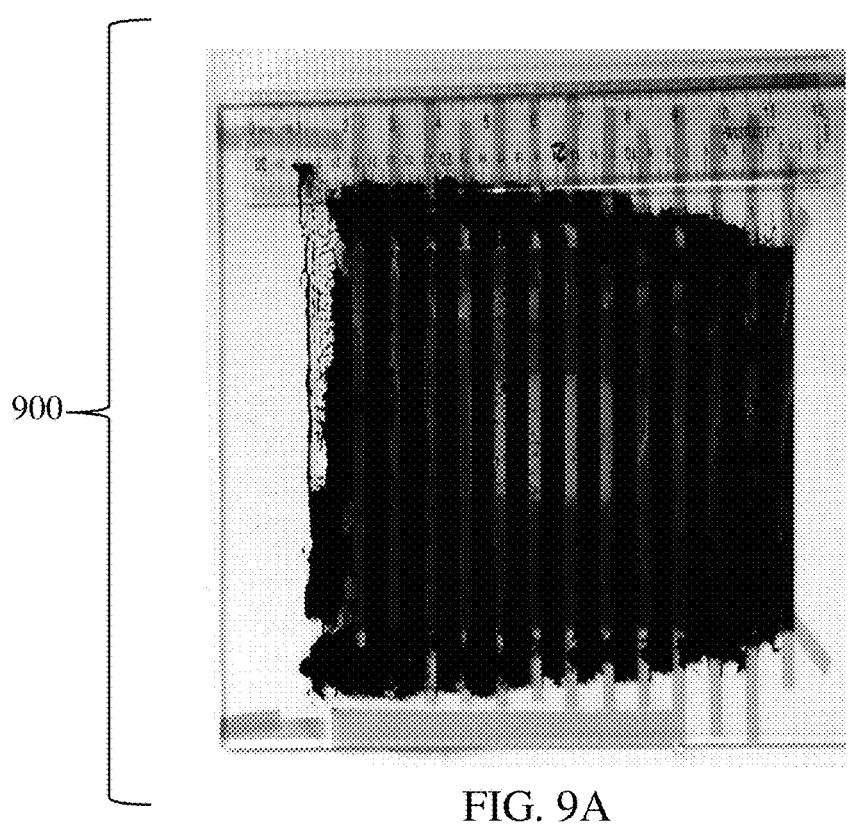
FIGS. 9A-B show exemplary images of the electrode after drying and tape removal.
Figure 9B:
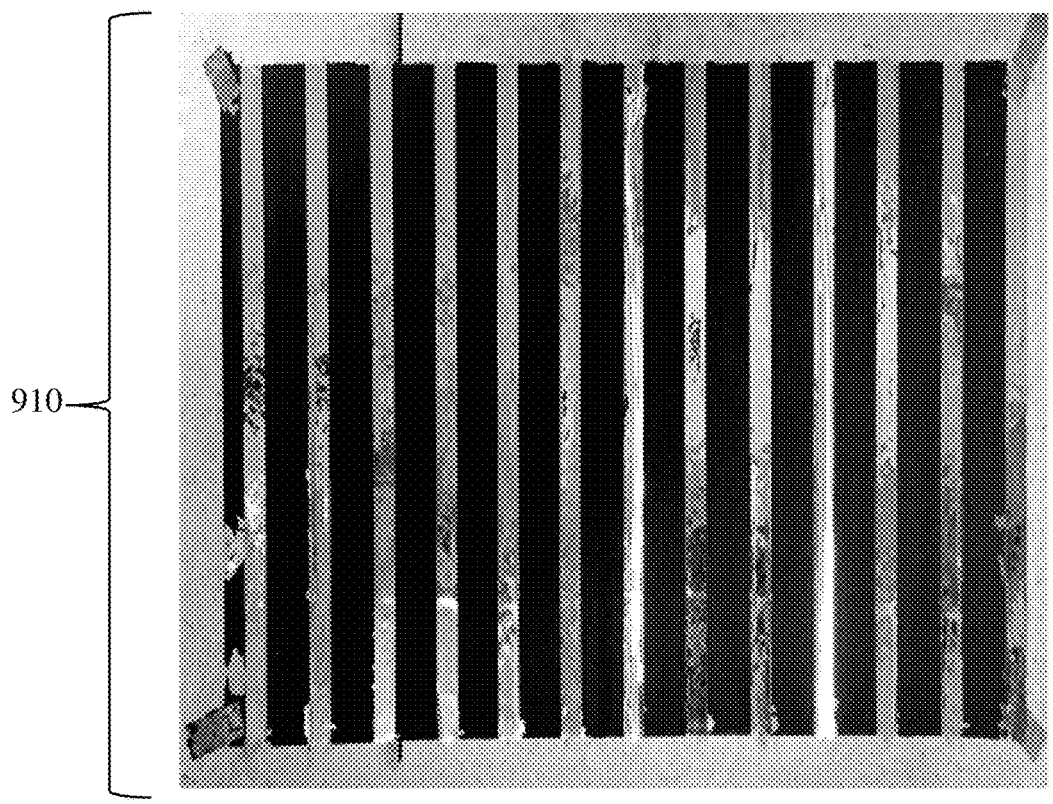

In some embodiments, the active material is dried after its application to the current collector. In some embodiments, the active material and the current collector are dried in an oven. In some embodiments, the active material and the current collector are dried at a temperature of about 40° C. to 160° C. In some embodiments, the active material and the current collector are dried for a period of time of about 6 hours to 24 hours. FIGS. 9A-B show exemplary images of the dried electrode 900 and the stripped electrode 910, after the tape and excess active material on the tape have been removed.

In some embodiments, a planar array of electrodes is formed by etching or cutting the dried active material and the current collector. In some embodiments, the process of etching or cutting the active material on the current collector and the current collector is performed by a laser, a knife, a blade, scissors or any combination thereof. In some embodiments, a gap is thereby created.

In some embodiments, the width of the gap at least about 10 µm. In some embodiments, the width of the gap at most about 2,000 µm. In some embodiments, the width of the gap about from 10 µm to about 2,000 µm. In some embodiments, the width of the gap about 10 µm to about 25 µm, about 10 µm to about 50 µm, about 10 µm to about 100 µm, about 10 µm to about 500 µm, about 10 µm to about 1,000 µm, about 10 µm to about 1,500 µm, about 10 µm to about 2,000 µm, about 25 µm to about 50 µm, about 25 µm to about 100 µm, about 25 µm to about 500 µm, about 25 µm to about 1,000 µm, about 25 µm to about 1,500 µm, about 25 µm to about 2,000 µm, about 50 µm to about 100 µm, about 50 µm to about 500 µm, about 50 µm to about 1,000 µm, about 50 µm to about 1,500 µm, about 50 µm to about 2,000 µm, about 100 µm to about 500 µm, about 100 µm to about 1,000 µm, about 100 µm to about 1,500 µm, about 100 µm to about 2,000 µm, about 500 µm to about 1,000 µm, about 500 µm to about 1,500 µm, about 500 µm to about 2,000 µm, about 1,000 µm to about 1,500 µm, about 1,000 µm to about 2,000 µm, or about 1,500 µm to about 2,000 µm. In some embodiments, the number of cells is at least 2.

Figure 10:
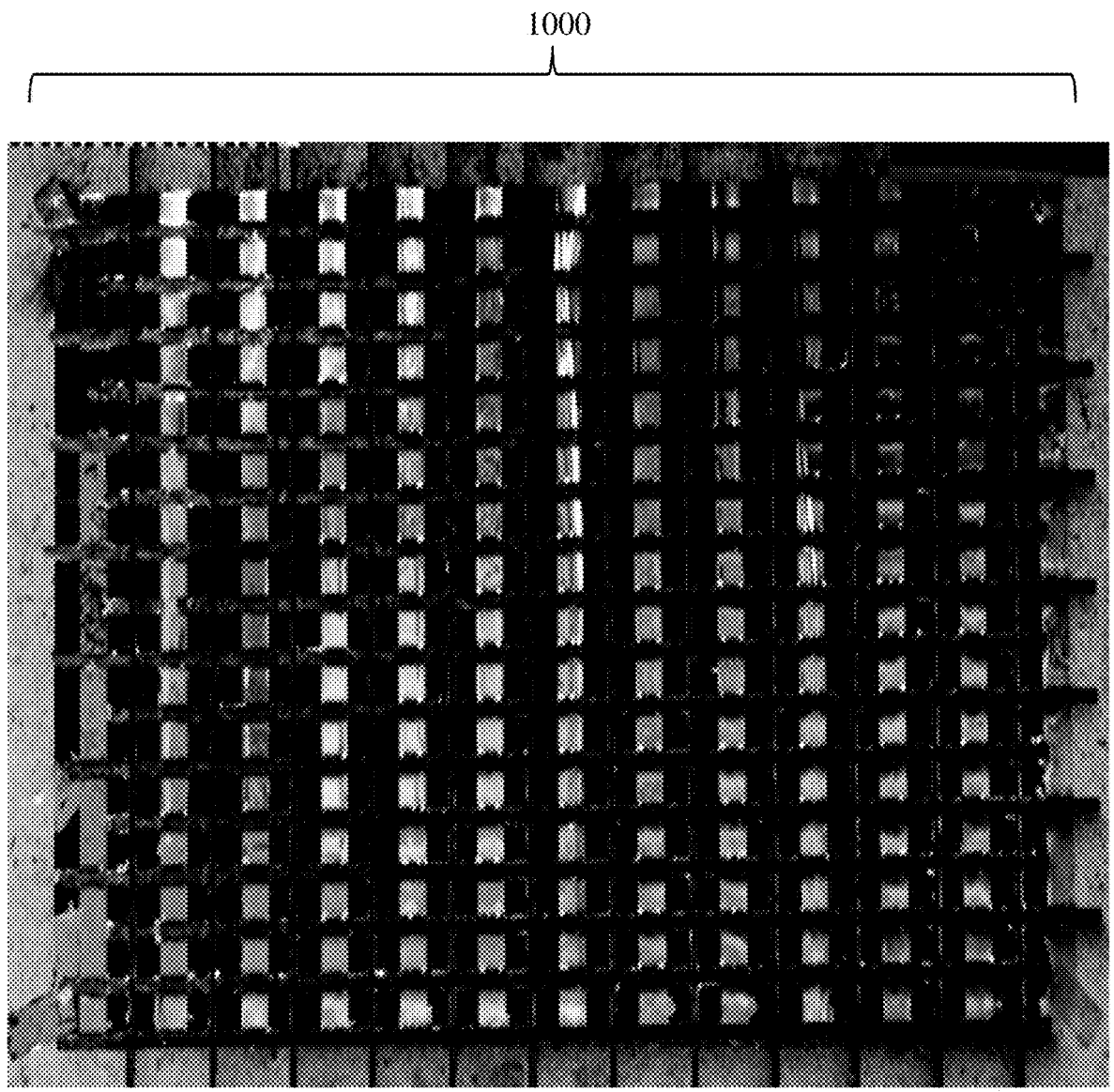
FIG. 10 shows an exemplary image of the fabrication of a patterned planar electrode.

FIG. 10 shows an exemplary image of a 180-cell supercapacitor device 900 formed by laser cutting the current collector and active material into a patterned array of electrodes. In some embodiments, the 180-cell supercapacitor device 1000 comprises a single-sided electrode, a double-sided electrode or any combination thereof.

Figure 11:
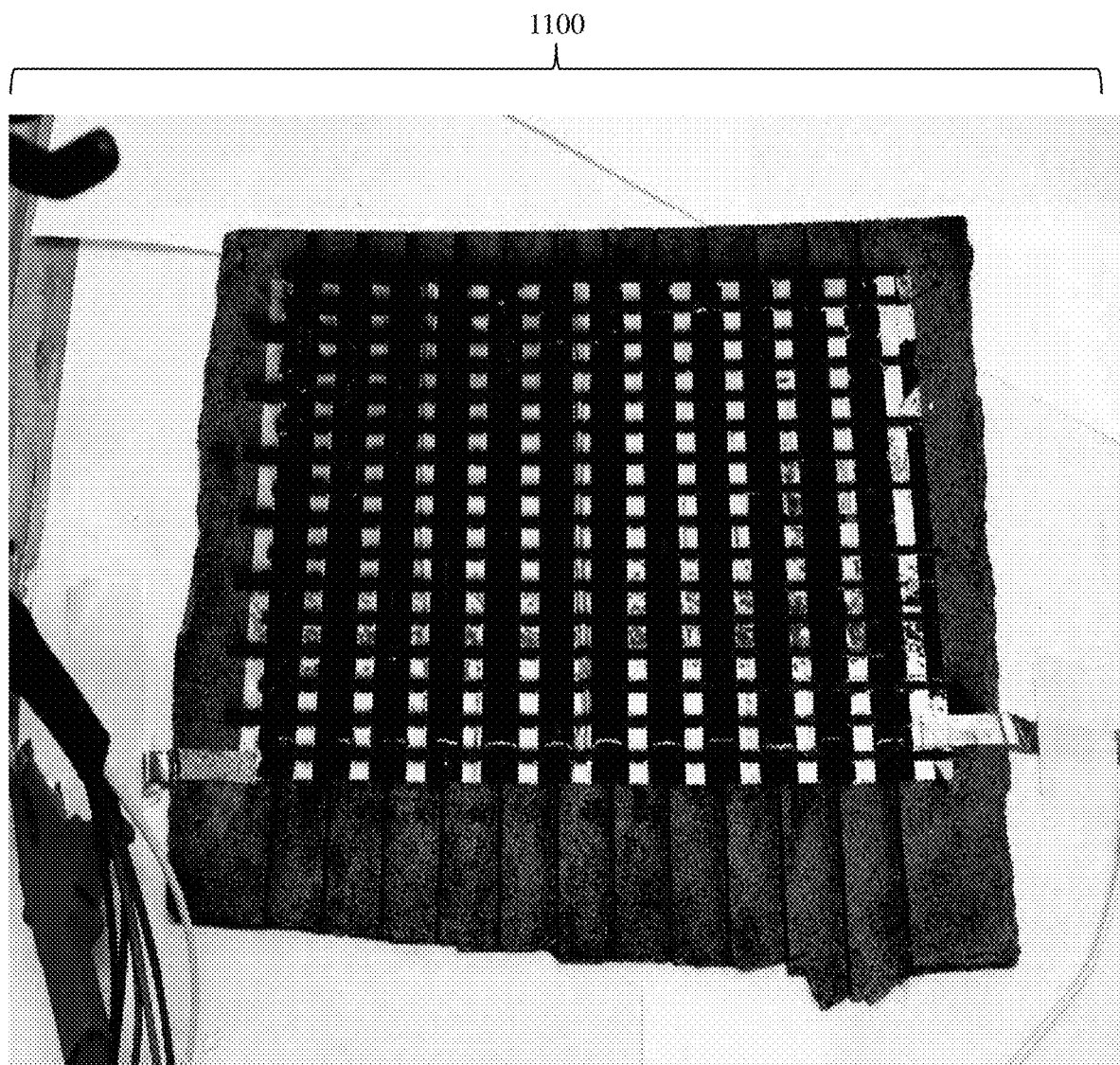
FIG. 11 shows an exemplary image of a high-voltage supercapacitor during electrochemical testing.
Figure 12A:
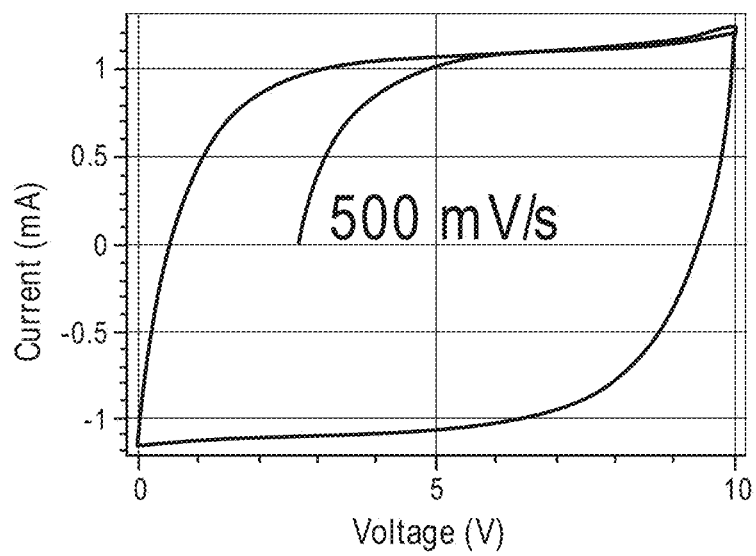
FIGS. 12A-E show cyclic voltammetry (CV) graphs of an exemplary supercapacitor device at different scan rates.
Figure 12B:
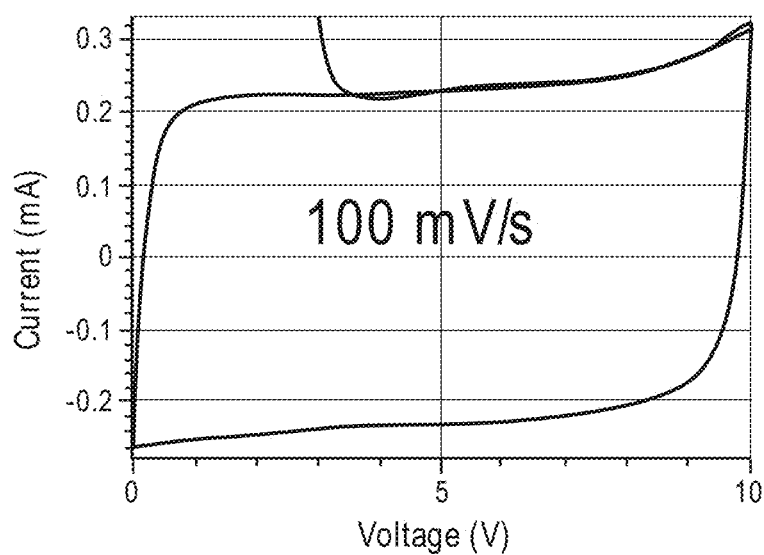
Figure 12C:
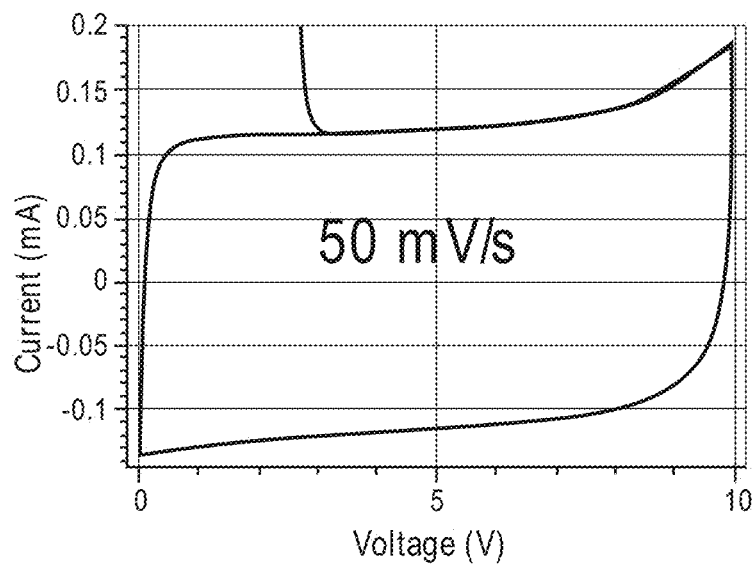
Figure 12D:
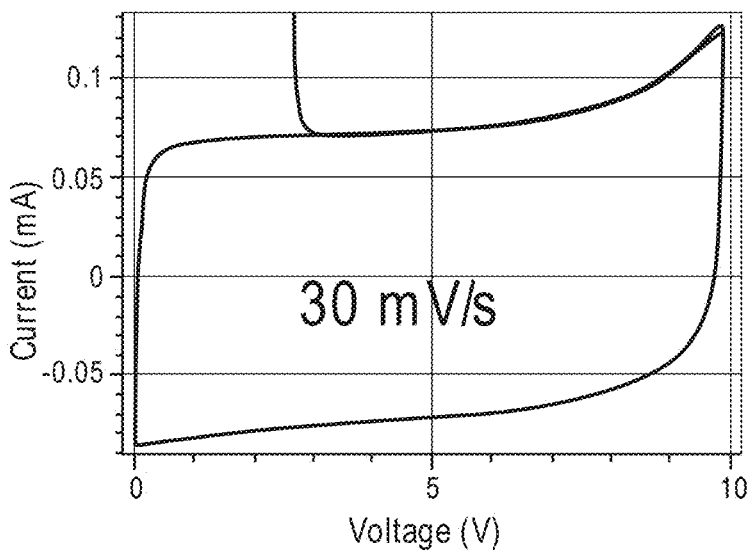
Figure 12E:
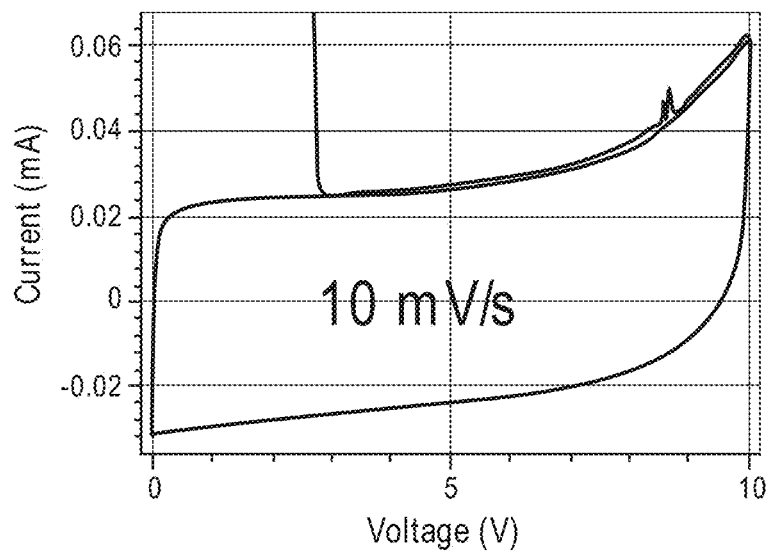

FIG. 11 shows an exemplary image of the 180-cell supercapacitor device 1100 during electrochemical testing, whereas an electrolyte may be disposed onto one or more of the cell's electrodes.

FIGS. 12A-E show exemplary cyclic voltammetry (CV) graphs at scan rates of 500 mV/s, 100 mV/s, 50 mV/s, 30 mV/s, and 10 mV/s, respectively. In some embodiments, cyclic voltammetry is an electrochemical technique which measures the current that develops in an electrochemical cell under applied voltages. In some embodiments of CV testing, the electrode potential ramps linearly versus time in cyclical phases, whereas the rate of voltage change over time during each of these phases is known as the scan rate.

Figure 13:
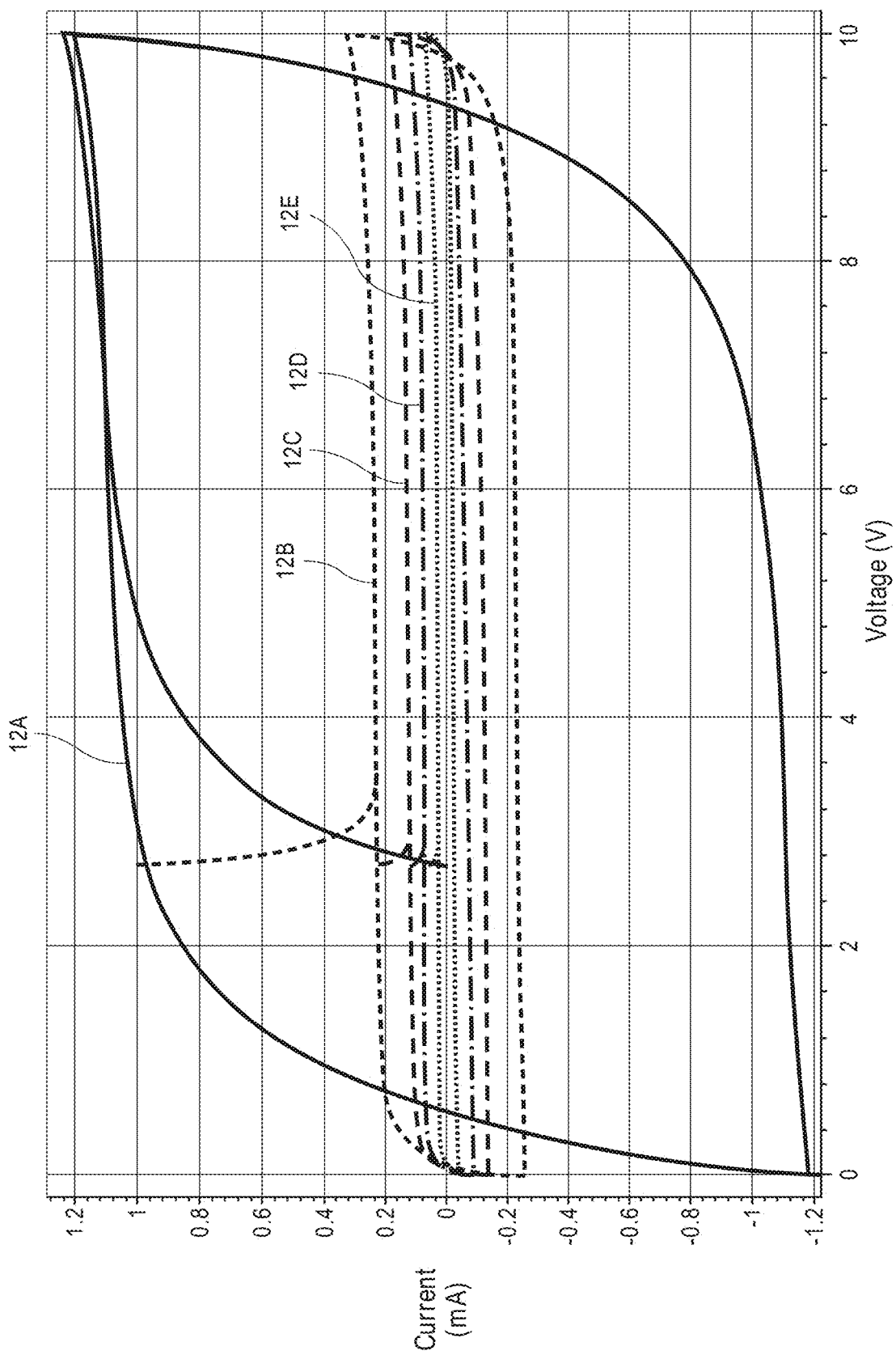
FIG. 13 shows an overlay of the cyclic voltammetry (CV) graphs of an exemplary supercapacitor device at different scan rates.
Figure 14:
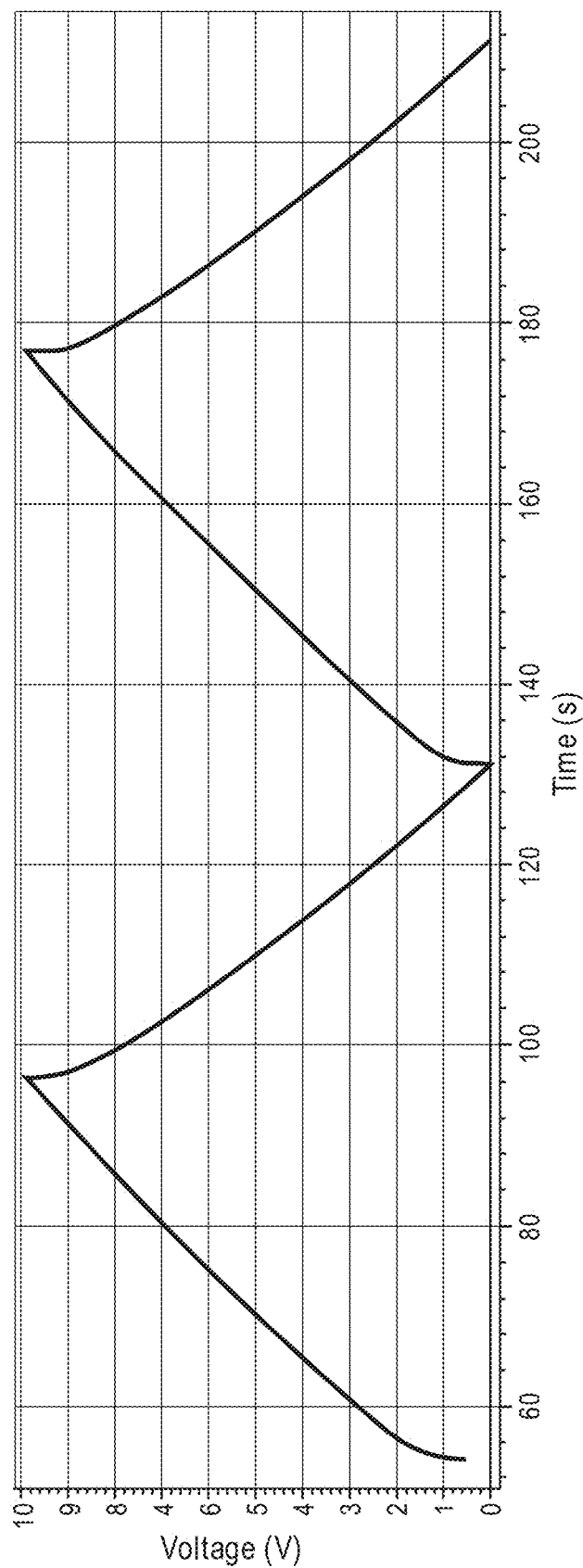
FIG. 14 shows the charge and discharge performance of an exemplary supercapacitor under a constant current.

FIG. 13 shows an overlay of the exemplary CV graphs at different scan rates, while FIG. 14 shows the charge and discharge waveform CV graph at a constant current.

Figure 15:
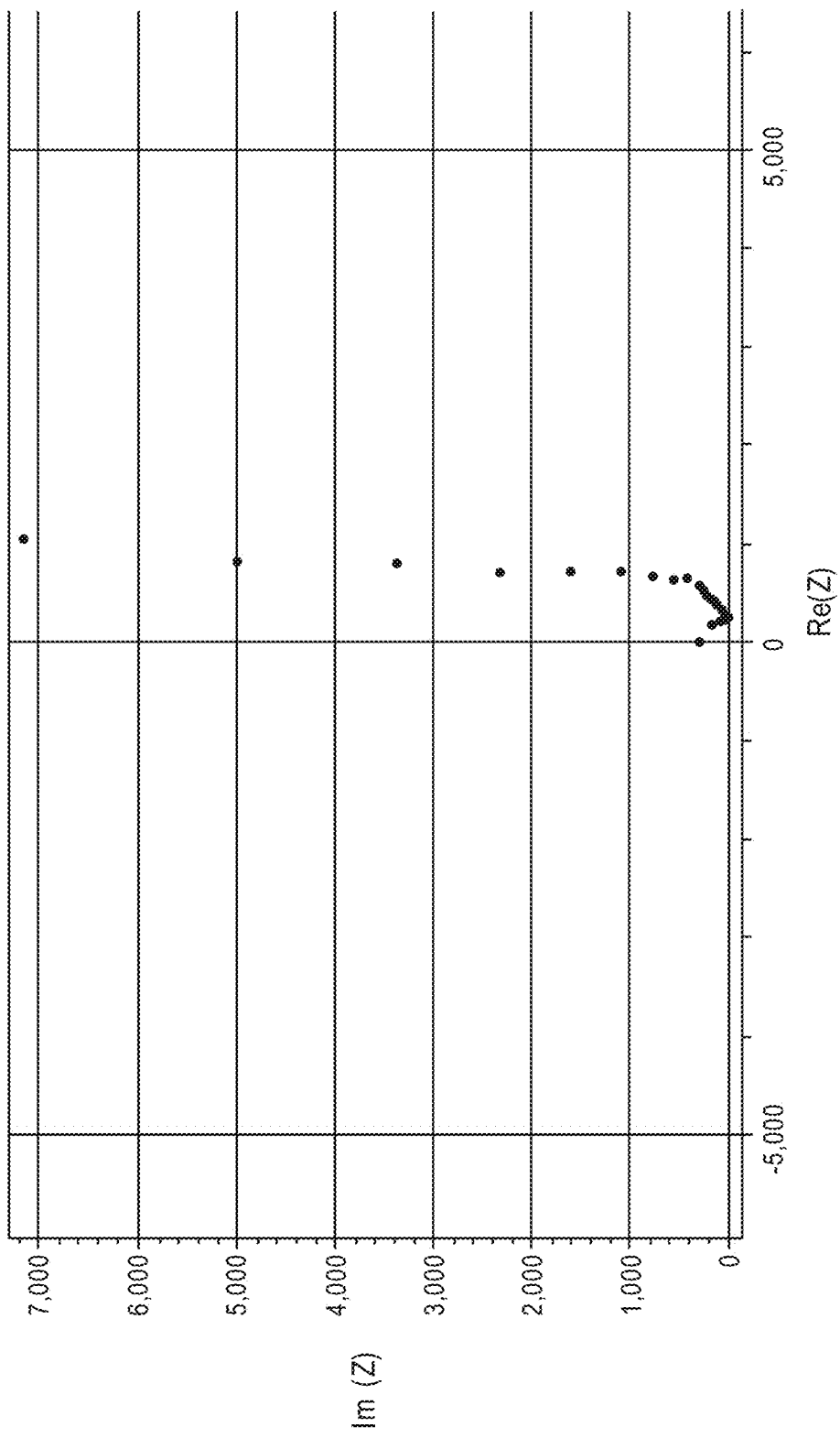
FIG. 15 shows the Warburg impedance of an exemplary supercapacitor.

FIG. 15 shows the Warburg impedance as the only impedance element for the functional high-voltage. In some embodiments, the Warburg diffusion element is an equivalent electrical circuit component that models the diffusion process in dielectric spectroscopy. In some embodiments, an equivalent circuit refers to a theoretical circuit that retains all of the electrical characteristics of a given circuit.

In some embodiments, a supercapacitor may be comprised of at least about 2 cells.

In some embodiments, an exemplary single cell supercapacitor device produced by the method described herein, and with an aqueous electrolyte, is capable of producing a potential of about 1 V.

In some embodiments, an exemplary 5-cell supercapacitor device produced by the method described herein, and with an aqueous electrolyte, is capable of producing a potential of from about 2.5 V to about 10 V.

In some embodiments, an exemplary 72-cell supercapacitor device produced by the method described herein, and with an aqueous electrolyte, is capable of producing a potential of from about 6 V to about 24 V.

In some embodiments, an exemplary 180-cell supercapacitor device produced by the method described herein, and with an aqueous electrolyte, is capable of producing a potential of from about 100 V to about 360 V.

In some embodiments, an exemplary single cell supercapacitor device produced by the method described herein, and with tetraethyl ammonium tetrafluoroborate ($TEABF_4$) in acetonitrile electrolyte, is capable of producing a potential of from about 2.5 V to about 10 V.

In some embodiments, an exemplary 5-cell supercapacitor device produced by the method described herein, and with tetraethyl ammonium tetrafluoroborate ($TEABF_4$) in acetonitrile electrolyte, is capable of producing a potential of from about 6 V to about 24 V.

In some embodiments, an exemplary 72-cell supercapacitor device produced by the method described herein, and with tetraethyl ammonium tetrafluoroborate ($TEABF_4$) in acetonitrile electrolyte, is capable of producing a potential of from about 100 V to about 360 V.

In some embodiments, an exemplary 180-cell supercapacitor device produced by the method described herein, and with tetraethyl ammonium tetrafluoroborate ($TEABF_4$) in acetonitrile electrolyte, is capable of producing a potential of from about 100 V to about 360 V.

Aspects of the disclosure described herein may be used in combination. Additionally, the systems and methods of the disclosure may be adapted to other active materials. For example, during fabrication of planar arrays of cells (e.g., by masking, coating, drying and patterning electrodes), two-step electrode coating (and other fabrication steps such as, for example, masking) may be used to fabricate adjacent electrodes comprising different (or asymmetric) active materials. Such embodiments may enable, for example, fabrication of batteries comprising a plurality of interconnected battery cells, or other devices (e.g., photovoltaics, thermoelectrics or fuel cells) comprising cells with different (or asymmetric) electrodes.

Terms and Definitions

As used herein, and unless otherwise defined, the term "corrugated" refers to a structure with a series of parallel ridges and furrows.

As used herein, and unless otherwise defined, the term "specific surface area" or "surface density" refers to a property of solids defined as the total surface area of a material per unit of mass.

As used herein, and unless otherwise defined, the term "conductivity" or "specific conductance" refers to the degree to which a specified material conducts electricity, calculated as the ratio of the current density in the material to the electric field that causes the flow of current.

As used herein, and unless otherwise defined, the term "planar" refers to a two-dimensional element lying primarily on a single plane.

As used herein, and unless otherwise defined, the term "stacked array" refers to a column, row or sandwich of elements.

As used herein, and unless otherwise defined, the term "aqueous" means a solution of a solvent and/or a solute, wherein either the solvent or solute are liquid in form.

As used herein, and unless otherwise defined, the term "gel" refers to a solid jelly-like material that may have properties ranging from soft and weak to hard and tough. Gels may be defined as a substantially dilute cross-linked system, which exhibits no flow when in the steady-state.

As used herein, and unless otherwise defined, the term "fumed silica" or pyrogenic silica refers to silica produced in a flame, which may consist of microscopic droplets of amorphous silica fused into branched, chainlike, three-dimensional secondary particles, which may then agglomerate to form tertiary particles.

As used herein, and unless otherwise defined, the term "isobilateral electrode" refers to an electrode with a geometrical symmetry about its vertical midplane.

As used herein, and unless otherwise defined, the term "anisobilateral electrode" refers to an electrode without a geometrical symmetry about its vertical midplane.

Unless otherwise defined, all technical terms used herein have the same meaning as commonly understood by one of ordinary skill in the art to which this disclosure belongs. As used in this specification and the appended claims, the singular forms "a," "an," and "the" include plural references unless the context clearly dictates otherwise. Any reference to "or" herein is intended to encompass "and/or" unless otherwise stated.

As used herein, and unless otherwise defined, the term "about" refers to a range of values plus or minus 10% of the specified value.

While preferable embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

Non-Limiting Embodiments

Additional non-limiting embodiments of the devices herein are listed below.

The present disclosure relates to a simple technique for the direct preparation of high-voltage devices such as, for example, high-voltage supercapacitors. The high-voltage devices may be prepared in a single step. The high-voltage devices may be prepared using one package. The high-voltage devices may be prepared in a single step and using one package. One package may advantageously be used instead of a plurality of packages (e.g., instead of hundreds in the traditional modules). In some embodiments, the high-voltage devices (e.g., high-voltage supercapacitors) herein may have a voltage in excess of about 180 V (and up to about 540 V). However, it is to be understood that even higher voltages are achievable depending on chemistry, total number of electrodes in series, and physical dimensions. Examples include direct preparation of high-voltage supercapacitors (e.g., in excess of about 180 V (and up to about 540 V)) in a single step and using one package (instead of a plurality, such as, for example, instead of hundreds in the traditional modules).

High-voltage devices ("devices") of the disclosure may comprise interconnected cells. In some embodiments, the electrodes may be electrochemical electrodes (e.g., individual supercapacitor cells). The electrodes may be interconnected, for example, to achieve a high voltage (and/or for other purposes).

A device such as, for example, a supercapacitor (e.g., double-layer supercapacitor, pseudocapacitor or hybrid supercapacitor), may be of a given type (e.g., with a given configuration or structure). For example, two main types of supercapacitors may differ by structure: a sandwich structure in which two thin-film electrodes are put together face-to-face with polymer plastic separator, and another structure that consists of micro-electrodes designed in a planar configuration. Planar supercapacitors may have several advantages over the stacked design. First, having both electrodes in the same plane is compatible with on-chip integration. Second, the traveling distance of the ions in the electrolyte, a major performance factor in supercapacitors, may be well controlled and shortened while eliminating the necessity of a separator (which is used in the sandwich-type supercapacitors to prevent electrical shorting). Third, the structure may potentially be extended to three dimensions, which allows more materials loaded per unit area while leaving the mean ionic diffusion path unaffected. This architecture thus has the potential to achieve high power density and high energy density in a small footprint.

Provided in certain embodiments are planar electrodes. Because of the simple structure of the in-plane device, several electrodes may be put together and assembled in one step, as will be explained later. Fabricated planar arrays of electrodes may be packaged using one package.

A planar supercapacitor consists of two carbon electrodes: one of them is used as the positive electrode and the other as the negative electrode. The electrodes are made by coating the active material onto a metallic sheet. The spacing in between, acts as a dielectric separator. A cross-sectional view of this device is shown in diagram where a part of the metallic foil that is left uncovered for use as a metal pad and for connecting this electrode with others. In this example, the voltage window of the planar supercapacitor electrode varies between about 1 V and 2.5 V depending on the type of electrolyte used in the assembly of the cells. Aqueous electrolytes often result in electrodes with about 1 V, whereas voltages as high as about 2.5 V may be obtained when using tetraethyl ammonium tetrafluoroborate ($TEABF_4$) in acetonitrile.

Electrolytes herein may include, for example, aqueous, organic and ionic liquid-based electrolytes. An electrolyte may be liquid, solid or a gel. An ionic liquid may be hybridized with another solid component such as, for example, polymer or silica (e.g., fumed silica), to form a gel-like electrolyte (also "ionogel" herein). An aqueous electrolyte may be hybridized with, for example, a polymer, to form a gel-like electrolyte (also "hydrogel" and "hydrogel-polymer" herein). An organic electrolyte may be hybridized with, for example, a polymer, to form a gel-like electrolyte. Examples of electrolytes may include, but are not limited to, aqueous potassium hydroxide, hydrogel comprising poly(vinyl alcohol) (PVA)-$H_2SO_4$ or PVA-$H_3PO_4$, aqueous electrolyte of phosphoric acid ($H_3PO_4$), tetraethyl ammonium tetrafluoroborate ($TEABF_4$) dissolved in acetonitrile, 1-ethyl-3-methylimidazoliumtetrafluoroborate ($EMIMBF_4$), ionogel comprising fumed silica (e.g., fumed silica nano-powder) mixed with an ionic liquid (e.g., 1-butyl-3-methylimidazolium bis(trifluoromethylsulfonyl)imide ($BMIMNTf_2$)), and the like. Such electrolytes may provide a range of voltage windows (e.g., at least about 0.5 V, 1 V, 2 V, 3 V, 4 V or more). For example, some ionogels (e.g., fumed silica nano-powder with the ionic liquid $BMIMNTf_2$) may provide a voltage window of about 2.5 V and some hydrogel-polymer electrolytes may provide a voltage window of about 1 V.

The active material in the electrodes may comprise carbonaceous and/or other suitable materials. For example, the active material in the electrodes may be carbon, which may be activated carbon, graphene, interconnected corrugated carbon-based network (ICCN), or any combination thereof.

ICCN may comprise a plurality of expanded and interconnected carbon layers. For the purpose of this disclosure, in certain embodiments, the term "expanded," referring to a plurality of carbon layers that are expanded apart from one another, means that a portion of adjacent ones of the carbon layers are separated by at least about 2 nanometers (nm). In some embodiments, at least a portion of adjacent carbon layers are separated by greater than or equal to about 2 nm, 3 nm, 4 nm, 5 nm, 6 nm, 7 nm, 8 nm, 9 nm, 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm or 100 nm. In some embodiments, at least a portion of adjacent carbon layers are separated by less than about 3 nm, 4 nm, 5 nm, 6 nm, 7 nm, 8 nm 9 nm, 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm or 100 nm. In some embodiments, at least a portion of adjacent carbon layers are separated by between about 2 nm and 10 nm, 2 nm and 25 nm, 2 nm and 50 nm, or 2 nm and 100 nm. Moreover, for the purpose of this disclosure, in certain embodiments, the plurality of carbon layers is also defined as having an electrical conductivity greater than about 0.1 siemens/meter (S/m). In some embodiments, each of the plurality of carbon layers is a two-dimensional material with only one carbon atom of thickness. In some embodiments, each of the expanded and interconnected carbon layers may comprise at least one, or a plurality of corrugated carbon sheets that are each one atom thick.

ICCN has a combination of properties that include, for example, high surface area and high electrical conductivity in an expanded interconnected network of carbon layers. In some embodiments, the plurality of expanded and interconnected carbon layers has a surface area of greater than or equal to about 500 square meters per gram ($m^2/g$) or 1000 $m^2/g$. In one embodiment the plurality of expanded and interconnected carbon layers has a surface area of greater than or equal to about 1400 $m^2/g$. In other embodiments, the plurality of expanded and interconnected carbon layers has a surface area of greater than or equal to about 1500 $m^2/g$, 1750 $m^2/g$ or 2000 $m^2/g$. In yet another embodiment, the surface area is about 1520 $m^2/g$. In some embodiments, the plurality of expanded and interconnected carbon layers has a surface area of between about 100 $m^2/g$ and 1500 $m^2/g$, 500 $m^2/g$ and 2000 $m^2/g$, 1000 $m^2/g$ and 2500 $m^2/g$, or 1500 $m^2/g$ and 2000 $m^2/g$. The plurality of expanded and interconnected carbon layers may have such surface areas in combination with one or more electrical conductivities (e.g., one or more electrical conductivities provided herein). Examples of such combinations are provided elsewhere herein.

In one embodiment, the plurality of expanded and interconnected carbon layers yields an electrical conductivity that is greater than or equal to about 1500 S/m. In another embodiment, the plurality of expanded and interconnected carbon layers yields an electrical conductivity that is greater than or equal to about 1600 S/m. In yet another embodiment, the plurality of expanded and interconnected carbon layers yields an electrical conductivity of about 1650 S/m. In still another embodiment, the plurality of expanded and interconnected carbon layers yields an electrical conductivity that is greater than or equal to about 1700 S/m. In yet one more embodiment, the plurality of expanded and interconnected carbon layers yields an electrical conductivity of about 1738 S/m. In some embodiments, the plurality of expanded and interconnected carbon layers yields an electrical conductivity of greater than or equal to about 1800 S/m, 1900 S/m or 2000 S/m.

Moreover, in one embodiment, the plurality of expanded and interconnected carbon layers yields an electrical conductivity that is greater than about 1700 S/m and a surface area that is greater than about 1500 $m^2/g$. In another embodiment, the plurality of expanded and interconnected carbon layers yields an electrical conductivity of about 1650 S/m and a surface area of about 1520 $m^2/g$.

Two electrodes may be connected together in series with the uncovered metal part in between the two electrodes acting as a contact point. This assembly may produce twice as much voltage as the individual cell. To increase the voltage further, more electrodes may be connected together in series in which five electrodes are used to get voltages as high as about 5 V when using aqueous electrolyte and 12.5 V when using tetraethyl ammonium tetrafluoroborate ($TEABF_4$) in acetonitrile (e.g., up to about 5 V when using aqueous electrolyte and/or up to about 12.5 V when using $TEABF_4$ in acetonitrile).

In principle, there may be no limit to the number of the electrodes that may be put together in series. Only the voltage required for the operation of the unit may define the total number of electrodes needed for the unit. For example, a unit having a voltage of about 180 V may require 180 electrodes connected together to reach the target voltage when using water-based electrolytes and only 72 electrodes when using tetraethyl ammonium tetrafluoroborate ($TEABF_4$) in acetonitrile.

Units consisting of a large number of electrodes may be divided into strings consisting of a given number of electrodes (e.g., 12 cells) each, and additional metal contacts may be made around the edges.

A roll of an ultrathin layer of gold (100 nm) coated onto a sheet of polyimide (Kapton) is used as a model example for a current collector in cells. Alternative current collectors include aluminum, copper, nickel, and stainless steel. Suitable current collectors may include various conductive (e.g., metal) foils, and/or conductive coatings (e.g., on polymer or other suitable sheet materials). In inset, the foil is affixed onto a flat substrate such as, for example, a glass plate and is partially covered by Kapton tape. The electrode slurry is then coated onto the metallic foil using standard doctor blade technique.

In some embodiments, the film may be made directly on the substrate of choice (e.g., without being transferred). The substrate is insulating and may be easily etched with a laser cutter. In this case a piece of wood was used, but other substrates such as acrylic have also been successfully used. The electrode material may be easily identified on the sheet, the black material. The lines are uncovered metallic parts that were obtained after the Kapton tape had been removed.

A laser cutter is used to etch (or pattern) the individual cells. The final unit is shown. The size of the electrodes and the spacing between them (i.e., the size of the dielectric) may be controlled by the laser table.

A droplet of gel electrolyte is added to each individual electrode to enable the electrode to store charge. The unit may then be tested for its operating voltage, capacitance rating, internal resistance, cycle, and shelf life.

Provided in certain embodiments are stacked electrodes. Fabricated stacked arrays of electrodes may be packaged using one package.

A supercapacitor electrode may comprise an aluminum foil coated with a layer of porous carbon (e.g., activated carbon). Such electrodes may be used in the assembly of high-voltage supercapacitors by stacking individual electrodes in a vertical direction instead of the planar expansion in the flat structure.

A sandwich structure is used in which two thin-film electrodes are put together face-to-face with polymer plastic separator and a few droplets of the electrolyte to allow charge storage. In this example, the individual electrodes are sealed from the sides so that they do not leak the liquid electrolyte and to prevent short circuits with the other cells. Heat shrinking tubes with internal chemical resistance are the glue used to allow the assembly of several electrodes in vertical direction.

Single-sided coated electrodes and double-sided coated electrodes are made simply by coating a layer of carbon on aluminum foil. The double-sided electrode may be made in two steps in which the foil is coated from one side, dried, and then coated from the other side. In some embodiments, the foil may be coated on both sides simultaneously.

In this structure, the electrodes are stacked on top of each other. The total number of electrodes varies depending on the required voltage. Metal tabs are attached to the bottom and top electrodes to allow for internal connection to the positive and negative terminals. Plastic gaskets 18 are used to prevent short circuit between positive and negative terminals.

A fully assembled high-voltage supercapacitor having stainless steel (or other suitable material) shims (discs) are used to give the unit physical robustness (e.g., to afford the pressure made by the heat shrinking tubes during assembly).

The electrodes in this example may be, for example, single-sided coated electrodes or double-sided coated electrodes as described elsewhere herein.

The electrode may comprise a high-density polyethylene (HDPE) insulator in contact with a positive (electrode) terminal. The positive terminal in turn is in contact with a positive (electrode) plate. The positive plate may comprise one or more active electrode materials, such as, for example, graphene. The active electrode material may be provided on one side of the positive plate. The positive plate may be positioned such that the side of the plate that comprises the graphene (or any other active material herein) faces a paper layer (e.g., downward ("side-down")). On the other side of the paper layer, a negative (electrode) plate 6 is in contact with the paper layer. The negative plate may comprise one or more active electrode materials, such as, for example, graphene. The active electrode material may be provided on one side of the negative plate. The negative plate 6 may be positioned such that the side of the plate that comprises the graphene (or any other active material herein) faces the paper layer (e.g., upward ("side-up")). The active materials of the positive and/or negative plates may be provided or fabricated, for example, as described elsewhere herein (e.g., by coating). The other side of the negative plate is covered or enclosed in electrode housing. The electrode housing may be pre-formed. At least a portion of the layers of electrode may be saturated with electrode. For example, electrolyte saturation may exist between all layers.

In some embodiments, the single electrode may have an outer diameter of about 20 millimeters (mm). An electrode housing may enclose the edges of the electrode top to bottom (i.e., across all layers). The electrode housing may be formed. At the top of the cell, the electrode housing may form a flange over the edge of the HDPE insulator. At the bottom of the cell, the electrode housing may form a flange over the edge of the electrode housing.

The electrode stack may comprise, for example, a plurality of the cells. The protruding electrode terminals of individual electrodes allow the electrodes to be electrically interconnected.

Aspects of the disclosure may be used in combination. For example, two or more planar expansions may be stacked in a configuration adapting one or more features of the stacks mentioned above. In another example, one or more components (e.g., paper layer, separator or housing components) of the stacks mentioned above may be used in another stacking configuration.

Systems and methods of the disclosure may be adapted to other active materials. For example, during fabrication of planar arrays of electrodes (e.g., by masking, coating, drying and patterning electrodes), two-step electrode coating (and other fabrication steps such as, for example, masking) may be used to fabricate adjacent electrodes comprising different (or asymmetric) active materials. Such embodiments may enable, for example, fabrication of batteries comprising a plurality of interconnected battery cells, or other devices (e.g., photovoltaics, thermoelectrics or fuel cells) comprising electrodes with different (or asymmetric) electrodes.

A plurality of electrodes may be interconnected to form supercapacitors and/or other devices (e.g., batteries, various types of capacitors, etc.). For example, at least about 2, 5, 10, 20, 30, 40, 50, 75, 100, 125, 150, 200, 250, 300, 350, 400, 500, 600, 700, 800, 900, 1000, 1500, 2000 or more electrodes may be interconnected (e.g., in series). In some embodiments, between about 50 and 300 electrodes may be interconnected.

A high-voltage device (e.g., high-voltage supercapacitor) may have a voltage of greater than or equal to about 5 V, 10 V, 15 V, 20 V, 30 V, 40 V, 50 V, 60 V, 70 V, 80 V, 90 V, 100 V, 110 V, 120 V, 130 V, 140 V, 150 V, 160 V, 170 V, 180 V, 190 V, 200 V, 210 V, 220 V, 230 V, 240 V, 250 V, 260 V, 270 V, 280 V, 290 V, 300 V, 310 V, 320 V, 330 V, 340 V, 350 V, 360 V, 370 V, 380 V, 390 V, 400 V, 410 V, 420 V, 430 V, 440 V, 450 V, 460 V, 470 V, 480 V, 490 V, 500 V, 510 V, 520 V, 530 V, 540 V, 550 V, 560 V, 570 V, 580 V, 590 V, 600 V, 650 V, 700 V, 750 V, 800 V, 850 V, 900 V, 950 V or 1000 V. A high-voltage device (e.g., high-voltage supercapacitor) may have a voltage of less than about 10 V, 15 V, 20 V, 30 V, 40 V, 50 V, 60 V, 70 V, 80 V, 90 V, 100 V, 110 V, 120 V, 130 V, 140 V, 150 V, 160 V, 170 V, 180 V, 190 V, 200 V, 210 V, 220 V, 230 V, 240 V, 250 V, 260 V, 270 V, 280 V, 290 V, 300 V, 310 V, 320 V, 330 V, 340 V, 350 V, 360 V, 370 V, 380 V, 390 V, 400 V, 410 V, 420 V, 430 V, 440 V, 450 V, 460 V, 470 V, 480 V, 490 V, 500 V, 510 V, 520 V, 530 V, 540 V, 550 V, 560 V, 570 V, 580 V, 590 V, 600 V, 650 V, 700 V, 750 V, 800 V, 850 V, 900 V, 950 V or 1000 V. In some embodiments, a high-voltage device (e.g., high-voltage supercapacitor) may have a voltage of at least about 100 V. In some embodiments, a high-voltage device (e.g., high-voltage supercapacitor) may have a voltage of at least about 180 V. In some embodiments, a high-voltage device (e.g., high-voltage supercapacitor) may have a voltage of up to about 540 V. In some embodiments, a high-voltage device (e.g., high-voltage supercapacitor) may have a voltage of between about 100 V and 540 V, 180 and 540 V, 100 V and 200 V, 100 V and 300 V, 180 V and 300 V, 100 V and 400 V, 180 V and 400 V, 100 V and 500 V, 180 V and 500 V, 100 V and 600 V, 180 V and 600 V, 100 V and 700 V, or 180 V and 700 V.

Those skilled in the art will recognize improvements and modifications to the present disclosure. All such improvements and modifications are considered within the scope of the concepts disclosed herein.

What is claimed is:

1. A supercapacitor device comprising:
   an array of electrodes, wherein each electrode comprises
      a current collector; and
      an active material directly on a portion of a first surface of the current collector,
      wherein the active material comprises two or more expanded and interconnected carbon layers, wherein at least one of the carbon layers is corrugated and one atom thick, wherein a portion of the carbon layers is separated by a distance of about 25 nm to about 150 nm.

2. The supercapacitor device of claim 1, further comprising the active material directly on a portion of a second surface of the current collector.

3. The supercapacitor device of claim 1, wherein each electrode in the array of electrodes is separated from a subsequent electrode by a gap.

4. The supercapacitor device of claim 1, wherein the current collector comprises a metal film, a polymeric film, or any combination thereof, wherein the metal film comprises silver, copper, gold, aluminum, calcium, tungsten, zinc, brass, bronze, nickel, lithium, iron, platinum, tin, carbon steel, lead, titanium, stainless steel, mercury, chromium, gallium arsenide, or any combination thereof, and wherein the polymeric film comprises polyfluorene, polyphenylene, polypyrene, polyazulene, polynaphthalene, polyacetylene, poly p-phenylene vinylene, polypyrrole, polycarbazole, polyindole, polyazepinem, polyaniline, polythiophene, poly 3,4-ethylenedioxythiophene, poly p-phenylene sulfide, polyacetylene, or any combination thereof.

5. The supercapacitor device of claim 1, wherein the active material comprises carbon, activated carbon, graphene, polyaniline, polythiophene, an interconnected corrugated carbon-based network (ICCN), or any combination thereof.

6. The supercapacitor device of claim 1, wherein the active material has a specific surface area of from about 250 meters squared per gram to about 3,500 meters squared per gram.

7. The supercapacitor device of claim 1, wherein the active material has a conductivity of from about 750 siemens/meter to about 3,000 siemens/meter.

8. The supercapacitor device of claim 1, wherein the array of electrodes is a two-dimensional planar array of electrodes.

9. The supercapacitor device of claim 8, further comprising an aqueous electrolyte, wherein the number of electrodes is 5, provided that a produced voltage potential across the array of electrodes is from 2.5 V to 10 V.

10. The supercapacitor device of claim 8, further comprising an electrolyte comprising tetraethyl ammonium tetrafluoroborate (TEABF$_4$) in acetonitrile, wherein the number of electrodes is 5, provided that a voltage potential produced across the array of electrodes is from 6 V to 24 V.

11. The supercapacitor device of claim 8, further comprising an aqueous electrolyte, wherein the number of electrodes is 180, provided that a voltage potential produced across the array of electrodes is from 100 V to 360 V.

12. The supercapacitor device of claim 8, further comprising an electrolyte comprising tetraethyl ammonium tetrafluoroborate (TEABF$_4$) in acetonitrile, wherein the number of electrodes is 72, provided that a voltage potential produced across the array of electrodes is from 100 V to 360 V.

13. The supercapacitor device of claim 1, wherein the array of electrodes is a stacked array of electrodes.

14. The supercapacitor device of claim 13, further comprising at least one or more of a separator and a support between a pair of adjacent electrodes.

15. The supercapacitor device of claim 13, wherein the stacked array of electrodes comprises one or more single-sided electrodes and one or more double-sided electrodes.

16. The supercapacitor device of claim 1, further comprising an electrolyte, wherein the electrolyte is a liquid, a solid, a gel, or any combination thereof comprising a polymer, silica, fumed silica, fumed silica nano-powder, 1-butyl-3-methylimidazolium bis(trifluoromethylsulfonyl)imide, phosphoric acid, tetraethyl ammonium tetrafluoroborate (TEABF$_4$), acetonitrile, 1-ethyl-3-methylimidazoliumtetrafluoroborate, ethanolammonium nitrate, a dicarboxylate, a prostaglandin, adenosine monophosphate, guanosine monophosphate, a p-aminohippurate, polysiloxane, polyphosphazene, potassium hydroxide, polyvinyl alcohol or any combination thereof.

17. The supercapacitor device of claim 1, wherein the array of electrodes comprises a linear array of electrodes comprising at least one isobilateral electrode and at least two anisobilateral electrodes.

18. A method of fabricating an array of electrodes comprising:
    a) applying an active material directly onto a portion of a first surface of a current collector, wherein the active material comprises two or more expanded and interconnected carbon layers, wherein at least one of the carbon layers is corrugated and one atom thick, wherein a portion of the carbon layers is separated by a distance of about 25 nm to about 150 nm; and
    b) drying the active material on the current collector;
    provided that each electrode is separated from a subsequent electrode by a gap.

19. The method of claim 18, further comprising:
    c) applying the active material directly onto a portion of a second surface of the current collector; and
    d) drying the active material on the current collector.

20. The method of claim 19, wherein at least one or more of a tape and a mask shields a portion of the second surface of the current collector to thereby prevent application of the active material onto the shielded portion of the second surface of the current collector.

21. The method of claim 19, wherein the active material is applied in the form of a slurry.

22. The method of claim 21, wherein the slurry is applied to the second surface of the current collector by a doctor blade.

23. The method of claim 19, wherein the applying the active material directly onto the first surface of the current collector and the applying the active material directly onto the second surface of the current collector are performed simultaneously.

24. The method of claim 19, wherein the drying of the active material on the current collector occurs at a temperature of from about 40° C. to about 160° C.

25. The method of claim 19, wherein the drying of the active material on the current collector occurs over a period of time of from about 6 hours to about 24 hours.

26. The method of claim 18, wherein the array of electrodes comprises a planar array of electrodes.

27. The method of claim 26, wherein the planar array of electrodes is fabricated by etching or cutting the active material and the current collector.

28. The method of claim 18, wherein the array of electrodes comprises a stacked array of electrodes.

29. The method of claim 28, further comprising positioning at least one or more of a separator and a support, between a pair of consecutive electrodes.

30. The method of claim 19, further comprising:
    e) dispersing an electrolyte on the array of electrodes;
    f) encasing the array of electrodes in a sheath; and
    g) inserting the encased array of electrodes into a housing.

31. The method of claim 30, wherein the electrolyte is a liquid, a solid, a gel, or any combination thereof comprising a polymer, silica, fumed silica, fumed silica nano-powder, 1-butyl-3-methylimidazolium bis(trifluoromethylsulfonyl) imide, phosphoric acid, tetraethyl ammonium tetrafluoroborate (TEABF$_4$), acetonitrile, 1-ethyl-3-methylimidazoliumtetrafluoroborate, ethanolammonium nitrate, a dicarboxylate, a prostaglandin, adenosine monophosphate, guanosine monophosphate, a p-aminohippurate, polysiloxane, polyphosphazene, potassium hydroxide, polyvinyl alcohol or any combination thereof.

* * * * *